United States Patent
Lys et al.

(10) Patent No.: US 12,020,430 B2
(45) Date of Patent: Jun. 25, 2024

(54) MULTISENSORY IMAGING METHODS AND APPARATUS FOR CONTROLLED ENVIRONMENT HORTICULTURE USING IRRADIATORS AND CAMERAS AND/OR SENSORS

(71) Applicant: Agnetix, Inc., San Diego, CA (US)

(72) Inventors: Ihor Lys, La Jolla, CA (US); Nicholas Maderas, Richmond, CA (US)

(73) Assignee: Agnetix, Inc., San Diego, CA (US)

(*) Notice: Subject to any disclaimer, the term of this patent is extended or adjusted under 35 U.S.C. 154(b) by 199 days.

(21) Appl. No.: 17/356,429

(22) Filed: Jun. 23, 2021

(65) Prior Publication Data

US 2021/0398281 A1    Dec. 23, 2021

Related U.S. Application Data

(63) Continuation of application No. PCT/US2020/064382, filed on Dec. 10, 2020.
(Continued)

(51) Int. Cl.
*H04N 5/247* (2006.01)
*A01G 7/04* (2006.01)
(Continued)

(52) U.S. Cl.
CPC ............ *G06T 7/0012* (2013.01); *A01G 7/045* (2013.01); *A01G 9/14* (2013.01); *G06T 3/4038* (2013.01);
(Continued)

(58) Field of Classification Search
CPC ......... G06T 7/0012; G06T 7/80; G06T 7/521; G06T 3/4038; G06T 5/006; H04N 23/80;
(Continued)

(56) References Cited

U.S. PATENT DOCUMENTS

| | | |
|---|---|---|
| 3,869,605 A | 3/1975 | Davis |
| 4,300,623 A | 11/1981 | Meckler |

(Continued)

FOREIGN PATENT DOCUMENTS

| | | |
|---|---|---|
| CA | 2632307 A1 | 11/2009 |
| CN | 101636076 A | 1/2010 |

(Continued)

OTHER PUBLICATIONS

Notice of Allowance in U.S. Appl. No. 17/317,792 dated Sep. 16, 2021, 7 pages.
(Continued)

*Primary Examiner* — Jonathan R Messmore
(74) *Attorney, Agent, or Firm* — Smith Baluch LLP

(57) ABSTRACT

A multispectral imaging apparatus includes an irradiation source having multiple narrowband irradiators in a first range of wavelengths from the ultraviolet (UV) regime to the short wavelength infrared (SWIR) regime. A first camera acquires UV-SWIR imagery in a first field of view and in the first range of wavelengths. A second camera acquires LWIR imagery in the first field of view and in the long wavelength infrared (LWIR) regime. The second camera continually acquires the LWIR imagery while the first camera and the irradiation source are periodically activated to acquire the UV-SWIR imagery.

42 Claims, 38 Drawing Sheets

Related U.S. Application Data

(60) Provisional application No. 62/946,407, filed on Dec. 10, 2019.

(51) Int. Cl.
*A01G 9/14* (2006.01)
*G06T 3/4038* (2024.01)
*G06T 5/80* (2024.01)
*G06T 7/00* (2017.01)
*G06T 7/521* (2017.01)
*G06T 7/80* (2017.01)
*H04N 5/272* (2006.01)
*H04N 23/56* (2023.01)
*H04N 23/80* (2023.01)
*H04N 23/90* (2023.01)
*G01S 17/86* (2020.01)

(52) U.S. Cl.
CPC .............. *G06T 5/80* (2024.01); *G06T 7/521* (2017.01); *G06T 7/80* (2017.01); *H04N 5/272* (2013.01); *H04N 23/56* (2023.01); *H04N 23/80* (2023.01); *H04N 23/90* (2023.01); *G01S 17/86* (2020.01); *G06T 2207/10036* (2013.01); *G06T 2207/10048* (2013.01); *G06T 2207/10152* (2013.01); *G06T 2207/20212* (2013.01)

(58) Field of Classification Search
CPC ........ H04N 23/56; H04N 23/90; H04N 5/272; A01G 7/045; A01G 9/14
See application file for complete search history.

(56) References Cited

U.S. PATENT DOCUMENTS

| | | | |
|---|---|---|---|
| 4,947,291 A | 8/1990 | McDermott | |
| 5,012,609 A | 5/1991 | Ignatius et al. | |
| 6,431,723 B1 | 8/2002 | Schubert et al. | |
| 6,683,970 B1 | 1/2004 | Satake et al. | |
| 6,880,952 B2 | 4/2005 | Kiraly et al. | |
| 7,095,053 B2 | 8/2006 | Mazzochette et al. | |
| 7,252,408 B2 | 8/2007 | Mazzochette et al. | |
| 7,339,660 B1 | 3/2008 | Cohn et al. | |
| 7,456,733 B2 | 11/2008 | Joy et al. | |
| 7,635,205 B2 | 12/2009 | Yu et al. | |
| 7,905,051 B2 | 3/2011 | Lysa | |
| 7,933,060 B2 | 4/2011 | Ishii et al. | |
| 8,033,688 B2 | 10/2011 | Warton et al. | |
| 8,177,388 B2 | 5/2012 | Yen | |
| 8,192,053 B2 | 6/2012 | Owen et al. | |
| 8,297,782 B2 | 10/2012 | Bafetti et al. | |
| 8,358,097 B2 | 1/2013 | Cartwright | |
| 8,373,361 B2 | 2/2013 | Smits et al. | |
| 8,390,454 B2 | 3/2013 | Lyon et al. | |
| 8,558,413 B1 | 10/2013 | Lepard | |
| 8,651,704 B1 | 2/2014 | Gordin et al. | |
| 8,668,350 B2 | 3/2014 | Wells et al. | |
| 8,752,978 B2 | 6/2014 | Bloom et al. | |
| 8,757,832 B2 | 6/2014 | Kim | |
| 8,764,221 B2 | 7/2014 | Chiang et al. | |
| 8,850,742 B2 | 10/2014 | Dube | |
| 8,920,001 B2 | 12/2014 | Part | |
| 8,967,825 B2 | 3/2015 | Fukui | |
| 9,137,874 B2 | 9/2015 | Maxik et al. | |
| 9,310,027 B2 | 4/2016 | Wells | |
| 9,310,049 B2 | 4/2016 | Wells | |
| 9,392,753 B2 | 7/2016 | Krijn et al. | |
| 9,404,648 B2 | 8/2016 | Druchinin | |
| D768,901 S | 10/2016 | Hillberg et al. | |
| 9,516,822 B2 | 12/2016 | Gonyer et al. | |
| 9,644,828 B1 | 5/2017 | May | |
| 9,688,951 B2 | 6/2017 | Krenbrink et al. | |
| 9,693,512 B2 | 7/2017 | Chen et al. | |
| 9,857,068 B2 | 1/2018 | Nguyen et al. | |
| 10,021,838 B1 | 7/2018 | Gustafik | |
| 10,034,435 B2 | 7/2018 | Helene et al. | |
| 10,161,568 B2 | 12/2018 | Amrine, Jr. et al. | |
| 10,175,215 B2 | 1/2019 | Ozcan et al. | |
| 10,188,046 B2 | 1/2019 | Wik et al. | |
| 10,261,493 B2 | 4/2019 | Hillberg et al. | |
| 10,339,380 B2 | 7/2019 | Greenberg et al. | |
| 10,426,099 B2 | 10/2019 | Clendinning et al. | |
| 10,512,221 B2 | 12/2019 | Wells | |
| 10,517,226 B2 | 12/2019 | Lee | |
| 10,555,466 B2 | 2/2020 | Gonyer et al. | |
| 10,627,785 B2 | 4/2020 | King et al. | |
| 10,635,274 B2 | 4/2020 | Greenberg et al. | |
| 10,660,170 B2 | 5/2020 | Wells | |
| 10,674,677 B2 | 6/2020 | Pohjanvouri et al. | |
| 10,750,671 B2 | 8/2020 | Wik et al. | |
| 10,842,082 B1 | 11/2020 | Genga, Jr. et al. | |
| 10,856,470 B2 | 12/2020 | Lys et al. | |
| 10,881,051 B2 | 1/2021 | Lys et al. | |
| 10,925,219 B2 | 2/2021 | Nguyen et al. | |
| 10,949,974 B2 | 3/2021 | King et al. | |
| 10,959,383 B2 | 3/2021 | Lys | |
| 10,999,976 B2 | 5/2021 | Lys et al. | |
| 11,013,078 B2 | 5/2021 | Lys et al. | |
| 11,044,854 B2 | 6/2021 | Lys et al. | |
| 11,076,536 B2 | 8/2021 | Lys et al. | |
| 11,193,653 B1 | 12/2021 | Dijkstra et al. | |
| 11,266,081 B2 | 3/2022 | Lys et al. | |
| 11,272,589 B2 | 3/2022 | Lys et al. | |
| 11,310,885 B2 | 4/2022 | Lys et al. | |
| 11,678,422 B2 | 6/2023 | Lys et al. | |
| 2003/0216837 A1 | 11/2003 | Reich et al. | |
| 2004/0120156 A1 | 6/2004 | Ryan | |
| 2005/0103473 A1 | 5/2005 | Todd et al. | |
| 2005/0152143 A1 | 7/2005 | Lee et al. | |
| 2005/0162850 A1 | 7/2005 | Luk et al. | |
| 2007/0033999 A1* | 2/2007 | Bothe | G06T 7/80 250/252.1 |
| 2007/0147045 A1 | 6/2007 | Kimura et al. | |
| 2008/0061717 A1 | 3/2008 | Bogner et al. | |
| 2008/0205030 A1 | 8/2008 | Hargreaves | |
| 2009/0027888 A1 | 1/2009 | Yu et al. | |
| 2009/0040759 A1 | 2/2009 | Zhang et al. | |
| 2010/0102729 A1 | 4/2010 | Katzir et al. | |
| 2010/0201239 A1 | 8/2010 | Mostoller et al. | |
| 2010/0321950 A1 | 12/2010 | Wong | |
| 2011/0037369 A1 | 2/2011 | Van Elmpt | |
| 2011/0075416 A1 | 3/2011 | Chou et al. | |
| 2011/0153093 A1 | 6/2011 | Aidun | |
| 2012/0033431 A1 | 2/2012 | Martinez et al. | |
| 2012/0162976 A1 | 6/2012 | Claeys | |
| 2012/0211201 A1 | 8/2012 | Kunstwadl et al. | |
| 2012/0250302 A1 | 10/2012 | Edwards et al. | |
| 2012/0257375 A1 | 10/2012 | Tickner et al. | |
| 2013/0000185 A1 | 1/2013 | Tanase et al. | |
| 2013/0003382 A1 | 1/2013 | Ohura et al. | |
| 2013/0006401 A1 | 1/2013 | Shan | |
| 2013/0048879 A1 | 2/2013 | Clark | |
| 2013/0057247 A1 | 3/2013 | Russell et al. | |
| 2013/0293156 A1 | 11/2013 | Wells | |
| 2014/0009926 A1 | 1/2014 | Simon et al. | |
| 2014/0042915 A1 | 2/2014 | Ono et al. | |
| 2014/0092255 A1* | 4/2014 | Choiniere | G06T 7/337 348/164 |
| 2014/0259920 A1 | 9/2014 | Wilson | |
| 2014/0301067 A1 | 10/2014 | Morgan | |
| 2015/0003070 A1 | 1/2015 | Medendorp, Jr. et al. | |
| 2015/0092404 A1 | 4/2015 | Kim et al. | |
| 2015/0250106 A1 | 9/2015 | Wik et al. | |
| 2015/0254738 A1 | 9/2015 | Wright, III et al. | |
| 2015/0313092 A1 | 11/2015 | Pocock et al. | |
| 2015/0356894 A1 | 12/2015 | Petrocy et al. | |
| 2015/0377427 A1 | 12/2015 | Richert et al. | |
| 2016/0007424 A1 | 1/2016 | Maxik et al. | |
| 2016/0081178 A1 | 3/2016 | D'Onofrio | |
| 2016/0113211 A1 | 4/2016 | MacKenzie | |
| 2016/0113213 A1 | 4/2016 | Berinsky | |
| 2016/0183351 A1 | 6/2016 | Snyder et al. | |

(56) References Cited

U.S. PATENT DOCUMENTS

| | | |
|---|---|---|
| 2016/0209020 A1 | 7/2016 | Sprankle et al. |
| 2016/0217562 A1 | 7/2016 | Ulman |
| 2016/0235013 A1 | 8/2016 | Pohjanvouri et al. |
| 2016/0262313 A1 | 9/2016 | Szeto et al. |
| 2016/0269715 A1* | 9/2016 | Evans ............... H04N 23/45 |
| 2016/0278300 A1 | 9/2016 | Clendinning et al. |
| 2016/0286747 A1 | 10/2016 | Matsumoto et al. |
| 2016/0320951 A1* | 11/2016 | Ernst ............... H04N 23/90 |
| 2016/0360712 A1 | 12/2016 | Yorio et al. |
| 2016/0366833 A1 | 12/2016 | Pohjanvouri et al. |
| 2017/0023193 A1 | 1/2017 | Thosteson et al. |
| 2017/0055474 A1 | 3/2017 | Storey |
| 2017/0074471 A1 | 3/2017 | Panek et al. |
| 2017/0074474 A1 | 3/2017 | Bailey |
| 2017/0095639 A1 | 4/2017 | Trzecieski |
| 2017/0134623 A1 | 5/2017 | Lee |
| 2017/0142813 A1 | 5/2017 | Sahni et al. |
| 2017/0146226 A1 | 5/2017 | Storey et al. |
| 2017/0208262 A1* | 7/2017 | Sheridan ............ H04N 23/90 |
| 2017/0215252 A1 | 7/2017 | Wells |
| 2017/0219711 A1 | 8/2017 | Redden et al. |
| 2017/0231169 A1 | 8/2017 | Gillard et al. |
| 2017/0241632 A1 | 8/2017 | Nguyen et al. |
| 2017/0244934 A1 | 8/2017 | Chien |
| 2017/0303478 A1 | 10/2017 | Smith et al. |
| 2017/0311414 A1 | 10/2017 | Kido et al. |
| 2017/0339839 A1 | 11/2017 | Carstensen et al. |
| 2018/0007845 A1 | 1/2018 | Martin |
| 2018/0014485 A1 | 1/2018 | Whitcher et al. |
| 2018/0042192 A1* | 2/2018 | Volpe ............... A01G 31/04 |
| 2018/0054985 A1 | 3/2018 | Li |
| 2018/0089843 A1* | 3/2018 | Miecznik ............ G06T 7/207 |
| 2018/0116025 A1 | 4/2018 | Adams et al. |
| 2018/0122099 A1* | 5/2018 | Lee ............... H04N 17/002 |
| 2018/0128472 A1 | 5/2018 | Nguyen et al. |
| 2018/0177008 A1 | 6/2018 | Jiang et al. |
| 2018/0213735 A1 | 8/2018 | Vail et al. |
| 2018/0242539 A1* | 8/2018 | Bhattacharya ........ A01G 7/045 |
| 2018/0259550 A1 | 9/2018 | Nakamura et al. |
| 2018/0295783 A1* | 10/2018 | Alexander .......... B25J 9/1679 |
| 2018/0309941 A1 | 10/2018 | Lopez et al. |
| 2018/0313760 A1 | 11/2018 | Kramer et al. |
| 2018/0363886 A1 | 12/2018 | Narayanaswamy et al. |
| 2019/0008096 A1 | 1/2019 | Lee |
| 2019/0364743 A1 | 1/2019 | Lys et al. |
| 2019/0116739 A1 | 4/2019 | Lys et al. |
| 2019/0141911 A1 | 5/2019 | Nguyen et al. |
| 2019/0221044 A1 | 7/2019 | Motta et al. |
| 2019/0234603 A1 | 8/2019 | Treible, Jr. et al. |
| 2019/0234797 A1 | 8/2019 | Ramer et al. |
| 2019/0244417 A1 | 8/2019 | Ashdown et al. |
| 2019/0244428 A1 | 8/2019 | Greenberg et al. |
| 2019/0246278 A1 | 8/2019 | Dorfman et al. |
| 2019/0259108 A1 | 8/2019 | Bongartz et al. |
| 2019/0303164 A1 | 10/2019 | King |
| 2019/0338934 A1 | 11/2019 | Ray et al. |
| 2019/0353341 A1 | 11/2019 | Spiro |
| 2019/0360941 A1* | 11/2019 | Ziltz ............... G01N 21/8806 |
| 2020/0012852 A1* | 1/2020 | Ding ............... G06V 20/00 |
| 2020/0068810 A1 | 3/2020 | Pahlevaninezhad et al. |
| 2020/0077598 A1 | 3/2020 | Wells |
| 2020/0134741 A1 | 4/2020 | Bongartz et al. |
| 2020/0163183 A1 | 5/2020 | Lys et al. |
| 2020/0236862 A1 | 7/2020 | Lys et al. |
| 2020/0236870 A1 | 7/2020 | Lys et al. |
| 2021/0000097 A1 | 1/2021 | Marchesini et al. |
| 2021/0059123 A1 | 3/2021 | Lys et al. |
| 2021/0120748 A1 | 4/2021 | Lys et al. |
| 2021/0278072 A1 | 9/2021 | Lys et al. |
| 2021/0321573 A1 | 10/2021 | Lys et al. |
| 2022/0053706 A1 | 2/2022 | Lys et al. |
| 2023/0048725 A1* | 2/2023 | Barbour ............ G06F 18/214 |

FOREIGN PATENT DOCUMENTS

| | | | |
|---|---|---|---|
| CN | 101737694 A | 6/2010 | |
| CN | 102016407 A | 4/2011 | |
| CN | 201811100 U | 4/2011 | |
| CN | 102287711 A | 12/2011 | |
| CN | 102421281 A | 4/2012 | |
| CN | 102811606 A | 12/2012 | |
| CN | 103091296 A | 5/2013 | |
| CN | 202955670 U | 5/2013 | |
| CN | 203628582 U | 6/2014 | |
| CN | 203656872 U | 6/2014 | |
| CN | 203686764 U | 7/2014 | |
| CN | 203872684 U | 10/2014 | |
| CN | 104520636 A | 4/2015 | |
| CN | 104981147 A | 10/2015 | |
| CN | 105180018 A | 12/2015 | |
| CN | 204929810 U | 1/2016 | |
| CN | 105423198 A | 3/2016 | |
| CN | 105717115 A | 6/2016 | |
| CN | 105975777 A * | 9/2016 | ............ G16Z 99/00 |
| CN | 106151982 A | 11/2016 | |
| CN | 205896799 U | 1/2017 | |
| CN | 106402746 A | 2/2017 | |
| CN | 106596412 A | 4/2017 | |
| CN | 206132218 U | 4/2017 | |
| CN | 206181943 U | 5/2017 | |
| CN | 107091467 A | 8/2017 | |
| CN | 107208871 A | 9/2017 | |
| CN | 107807125 A | 3/2018 | |
| CN | 107942955 A | 4/2018 | |
| CN | 207369705 U | 5/2018 | |
| DE | 202014105523 U1 | 2/2016 | |
| DK | 2129212 T3 | 3/2016 | |
| EP | 3123823 A1 | 2/2017 | |
| EP | 3269231 A1 | 1/2018 | |
| EP | 3281514 A1 | 2/2018 | |
| EP | 3324099 A1 | 5/2018 | |
| EP | 3326452 A1 | 5/2018 | |
| EP | 3065535 B1 | 7/2020 | |
| FR | 2173912 A1 | 10/1973 | |
| JP | 2000207933 A | 7/2000 | |
| JP | 2010192152 A | 9/2010 | |
| JP | 2011054529 A | 3/2011 | |
| JP | 2012217352 A | 11/2012 | |
| JP | 2014209850 | 11/2014 | |
| JP | 2015526104 | 9/2015 | |
| JP | 2016504030 A | 2/2016 | |
| JP | 2016214153 A | 12/2016 | |
| KR | 10-0941000 B1 | 2/2010 | |
| KR | 101020063 B1 | 3/2011 | |
| KR | 101068315 B1 | 9/2011 | |
| KR | 201125871 A | 9/2011 | |
| KR | 1020120100897 A | 12/2012 | |
| KR | 101234587 B1 | 2/2013 | |
| KR | 20150033363 A | 4/2015 | |
| KR | 20150035102 A | 4/2015 | |
| KR | 20170021662 A | 2/2017 | |
| KR | 10-1730069 B1 | 4/2017 | |
| KR | 20170085194 A | 7/2017 | |
| KR | 20170115987 A | 10/2017 | |
| KR | 20170127406 A | 11/2017 | |
| RU | 2010150292 A | 6/2012 | |
| TW | 200926883 A | 6/2009 | |
| TW | M 471005 U | 1/2014 | |
| TW | 201501570 A | 1/2015 | |
| WO | WO 2008/112822 | 9/2008 | |
| WO | WO 2009/074602 A3 | 6/2009 | |
| WO | WO 2012/067499 A1 | 5/2012 | |
| WO | WO-2014/011444 A3 | 3/2014 | |
| WO | WO-2014/064893 A1 | 5/2014 | |
| WO | WO 2014/098735 A1 | 6/2014 | |
| WO | WO 2015/004179 A1 | 1/2015 | |
| WO | WO 2015/144660 A1 | 10/2015 | |
| WO | WO-2016/115314 A1 | 7/2016 | |
| WO | WO-2016/166311 | 10/2016 | |
| WO | WO-2017015664 A1 | 1/2017 | |
| WO | WO-2017/024079 A2 | 2/2017 | |
| WO | WO-2017/044177 A1 | 3/2017 | |

(56) References Cited

FOREIGN PATENT DOCUMENTS

| WO | WO-2017087644 A1 | 5/2017 |
|---|---|---|
| WO | WO-2017/134623 A1 | 8/2017 |
| WO | WO 2017/184448 A1 | 10/2017 |
| WO | WO-2017/192566 A1 | 11/2017 |
| WO | WO 2018/010946 A1 | 1/2018 |
| WO | WO 2018/013161 A1 | 1/2018 |
| WO | WO 2018/017451 A1 | 1/2018 |
| WO | WO 2018/091560 A1 | 5/2018 |
| WO | WO 2019/014703 A1 | 1/2019 |
| WO | WO 2019/040944 A2 | 2/2019 |
| WO | WO 2019/204805 A1 | 10/2019 |
| WO | WO 2019/213652 A1 | 11/2019 |
| WO | WO 2020/030825 | 2/2020 |
| WO | WO 2020/144269 | 7/2020 |
| WO | WO 2020/167934 | 8/2020 |
| WO | WO 2020/219832 | 10/2020 |
| WO | WO 2021/119363 | 6/2021 |

OTHER PUBLICATIONS

Non Final Office Action in U.S. Appl. No. 17/238,044 dated Sep. 30, 2021, 17 pages.

Final Office Action in U.S. Appl. No. 17/323,822 dated Nov. 3, 2021, 10 pages.

Notice of Allowance in U.S. Appl. No. 17/216,291 dated Nov. 16, 2021, 8 pages.

Notice of Allowance in U.S. Appl. No. 17/317,792 dated Nov. 26, 2021, 8 pages.

Notice of Allowance in U.S. Appl. No. 17/323,822 dated Dec. 1, 2021, 8 pages.

Japanese Office Action and English Translation Thereof in Japanese Application No. 2021-525751 dated Nov. 30, 2021, 14 pages.

Chinese Office Action and English Translation Thereof in Chinese Application No. 201980044374.4 dated Dec. 3, 2021, 21 pages.

Chinese Office Action and English Translation Thereof in Chinese Application No. 201880069341.0 dated Dec. 24, 2021, 21 pages.

Extended European Search Report in European Patent Application No. 19796862.1 dated Jan. 3, 2022, 9 pages.

Corrected Notice of Allowance in U.S. Appl. No. 17/323,822 dated Jan. 25, 2022, 2 pages.

Corrected Notice of Allowance in U.S. Appl. No. 17/323,822 dated Feb. 4, 2022, 2 pages.

Non-Final Office Action in U.S. Appl. No. 17/362,938 dated Feb. 10, 2022, 9 pages.

Chinese Office action and English Translation thereof in Chinese App. No. 201980074643.1 dated Apr. 7, 2022 54 pages.

LED Application. Odtech 2014. Accessed at http://www.od-tech.com/eng/sub1/s42.php?PHPSESSID=64d5029f1b80d6df54ab87468d7f9172 on Apr. 23, 2018, 1 page.

PFLi Water-cooled LED Bar. NewLux Horticultural LED Lighting. Accessed at http://newlux.com/product/pfli-water-cooled-led-bar/ on Apr. 23, 2018, 8 pages.

Our Grow Light Models. GS Thermal Solutions 2018. Accessed at http://gsgrow.com/technology/liquid-cooled-led-models/ on Apr. 23, 2018.

GC-Plus Control System. Agrowtek Inc. Accessed at http://agrowtek.com/component/page,shop.product_details/flypage,flypage.tpl/product_id,53/category_id,14/option,com_virtuemart/Itemid,26/ on May 25, 2018, 4 pages.

Cooking Hacks. Accessed at https://www.cooking-hacks.com/documentation/tutorials/open-garden-hydroponics-irrigation-system-sensors-plant-monitoring on May 25, 2018, 11 pages.

LED Lighting for Horticulture, Aquabar LED Grow System brochure. Genesis Scientific. Accessed at www.gs.horti.com on Oct. 31, 2017, 4 pages.

Intravision Spectra R&D, Water-cooled 7-LED band Plant Research Rig., Accessed at <www.intravisiongroup.com> on Apr. 7, 2016, 1 page.

LED Grow World, Liquid Cooled LED Grow Light brochure, Model BLE-GL9015, 2017. Accessed at www.ledgrowworld.co, 3 pages.

JPFA Plant Factory Association. Accessed at http://npoplantfactory.org/english.html on May 18, 2018, 6 pages.

Harper, 2017: The OpenAG Ecosystem Expands Research, Non-Profit Ventrures. The Medium, Jan. 27, 2017. Accessed at https://medium.com/@calebgrowsfood/2017-the-openag-ecosystem-expands-research-non-profit-ventures-b5762beed64b, 10 pages.

Fenome. Vimeo. Accessed at https://vimeo.com/219601049, 3 pages, 2018.

Agnetix—The A3 Product Brochure, 2 pages, Aug. 24, 2017.

Agnetix—A3 Cables, 5 pages, Feb. 26, 2018.

Agnetix—Liquid-cooled, intelligent LED horticultural platform, 5 pages, Jan. 31, 2018.

Agnetix—A3 Horticulture LED, 6 pages, Jan. 31, 2018.

Agnetix—4' x 1 A3 Light Assembly, 1 page, Jan. 24, 2018.

Agnetix—8' x 2 A3 Light Assembly, 1 page, Jan. 24, 2018.

Agnetix—12' x 3 A3 Light Assembly, 1 page, Jan. 24, 2018.

Agnetix—16' x 3 A3 Light Assembly, 1 page, Jan. 23, 2018.

Agnetix—20' x 4 A3 Light Assembly, 1 page, Jan. 23, 2018.

Agnetix—20' x 5 A3 Light Assembly, 1 page, Mar. 8, 2018.

Agnetix—24' x 5 A3 Light Assembly, 1 page, Apr. 3, 2018.

Agnetix—24' x 6 A3 Light Assembly, 1 page, Jan. 16, 2018.

Agnetix—36' x 9 A3 Light Assembly, 1 page, Dec. 5, 2017.

Agnetix—32' x 8 A3 Light Assembly, 1 page, Feb. 12, 2017.

Agnetix—24'x12'x8' Growth Chamber, 1 page, Mar. 1, 2018.

Agnetix—42'x180'x12' Greenhouse, 1 page, Jan. 29, 2018.

Agnetix—20'x8'x9.5' 3-Light Isopod, 1 page, Mar. 17, 2018.

Agnetix—Hydronics Loop Diagram, 1 page, Mar. 9, 2018.

Bah, A. et al., "Sensor Technologies for Precision Soil Nutrient Management and Monitoring," American Journal of Agriculture and Biological Sciences 7(1): pp. 43-49, 2012.

Chandra, S. et al., "Photosynthetic response of Cannabis sativa L. to variations in Photosynthetic photon flux densities, temperature and $CO_2$ conditions," Physiol. Mol. Biol. Plants, vol. 14, No. 4, pp. 299-306, 2008.

Hamza, B. et al., "Distributed Polymer Optical Fibre Sensing of Moisture and pH in Soils: Feasibility for E-Agriculture," retrieved from https://www.research.manchester.ac.ukportal/files/38209074/FULL_TEXT.pdf, 7 pages, Nov. 3, 2017.

Nakano, A., "Plant Factories in Japan—An Integrated Approach," NARO Institute of Vegetable and Floriculture Science, National Agriculture and Food Research Organization (NARO), Tsukuba, Ibaraki, Japan, 11 pages. Sep. 11, 2017.

Nelson, J. A. et al., "Economic Analysis of Greenhouse Lighting: Light Emitting Diodes vs. High Intensity Discharge Features," PLoS One, vol. 9, Issue 6, e99010, 10 pages, 2014.

Photosynthetically Active Radiation (PAR) Units, 1 page, Aug. 16, 2000.

Sihombing, P. et al., "Automated hydroponics nutrition plants systems using arduino uno microcontroller based on android," 2nd International Conference on Computing and Applied Informatics, IPO Conf. Series: Journal of Physics 978 012014, 6 pages, 2018.

Vellidis, G., "The University of Georgia Smart Sensor Array," <http://scienceinhydroponics.com/2017/03/automating-a-hydroponic-system-sensors-and-monitoring.html>, 11 pages, 2018.

Vellidis, G. et al., "A real-time wireless smart sensor array for scheduling irrigation," Computers and Electronics in Agriculture 61, pp. 44-50, 2008.

Vijay, N., "Application of sensor networks in agriculture," https://ieeexplore.ieee.org/document/6719103/, Third International Conference on Sustainable Energy and Intelligent System, Dec. 27-29, 2012.

AgNetix Liquid Cooled Horitcultural Lighting and Agnetix Water-Cooled LED & Sensory Platform, Jan. 31, 2018, 25 pages.

Products—Thrive Agritech. Accessed at http://www.thriveagritech.com/products/on May 16, 2019. 9 pages.

Intravision Products. Accessed at https://www.intravisiongroup.com/products on May 16, 2019. 2 pages.

Smart LED Grow Lights with Wireless Control LumiGrow. Accessed at https://www.lumigrow.com/ accessed on May 16, 2019. 8 pages.

(56) References Cited

OTHER PUBLICATIONS

PlantLab. Accessed at https://www.plantlab.com/ on May 16, 2019. 8 pages.
Aquabar. Genesis Scientific. Accessed at https://gs-horti.com/products/led-grow-lights/aquabar.html on May 16, 2019. 7 pages.
Viparspectra. Accessed at http://www.viparspectra.com/ on May 16, 2019. 10 pages.
Which regions of the electromagnetic spectrum do plants use to drive photosynthesis? Heliospectra. Accessed at www.heliospectra.com, Oct. 5, 2012.
International Search Report and Written Opinion in International Patent Application No. PCT/US2018/048190 dated Feb. 8, 2019, 100 pages.
Guidelines for Measuring and Reporting Environmental Parameters for Experiments in Greenhouses. International Committee for Controlled Environment Guidelines, Feb. 2016, 37 pages.
2JCIE-BU Environment Sensor (USB Type). Omron Electronic Components. Accessed at https://www.components.omron.com/product-detail?partNumber=2JCIE-BU on Apr. 13, 2019, 5 pages.
Environment Sensor Integrating various sensing capabilities into one single IoT sensor. Accessed at https://www.components.omron.com/solutions/mems-sensors/environment-sensor on Apr. 13, 2019, 6 pages.
Environment Sensor 2JCIE Series Catalog. Omron Electronic Components. Accessed at https://www.components.omron.com/solutions/mems-sensors/environment-sensor on May 16, 2019, 16 pages.
Schriber, Smart Agriculture Sensors: Helping Small Farmers and Positively Impacting Global Issues, Too. Mouser Electronics. Accessed at https://www.mouser.com/applications/smart-agriculture-sensors/ on Apr. 13, 2019, 4 pages.
Lakhiar et al., "Monitoring and Control Systems in Agriculture Using Intelligent Sensor Techniques: A Review of the Aeroponic System." Journal of Sensors 2018 (2018), 19 pages.
Hwang et al., "Study on an agricultural environment monitoring server system using wireless sensor networks." Sensors 10.12 (2010): 11189-11211.
Kerns et al., "Automated aeroponics system using IoT for smart farming." European Scientific Journal, ESJ 13.10 (2017), 7 pages.
Tsitsimpelis et al., "Development of a grow-cell test facility for research into sustainable controlled-environment agriculture." Biosystems Engineering 150 (2016): 40-53.
Keshtgary et al., "An efficient wireless sensor network for precision agriculture." Canadian Journal on Multimedia and Wireless Networks 3.1 (2012): 1-5.
Jawad et al., "Energy-efficient wireless sensor networks for precision agriculture: A review." Sensors 17.8 (2017): 1781, 45 pages.
Shamshiri et al., "Advances in greenhouse automation and controlled environment agriculture: A transition to plant factories and urban agriculture." (2018), 22 pages.
Ruiz-Garcia et al., "A review of wireless sensor technologies and applications in agriculture and food industry: state of the art and current trends." sensors 9.6 (2009): 4728-4750.
Dener et al., "Smart technologies with wireless sensor networks." Procedia-Social and Behavioral Sciences 195 (2015): 1915-1921.
Pahuja et al., "A wireless sensor network for greenhouse climate control." IEEE Pervasive Computing 12.2 (2013): 49-58.
Balendonck et al., "Monitoring spatial and temporal distribution of temperature and relative humidity in greenhouses based on wireless sensor technology." International Conference on Agricultural Engineering—AgEng. 2010, 10 pages.
Chaudhary et al., "Application of wireless sensor networks for greenhouse parameter control in precision agriculture." International Journal of Wireless & Mobile Networks (IJWMN) 3.1 (2011): 140-149.
Ferentinos et al., "Wireless sensor networks for greenhouse climate and plant condition assessment." Biosystems engineering 153 (2017): 70-81.
Vox et al., "A wireless telecommunications network for real-time monitoring of greenhouse microclimate." Journal of Agricultural Engineering 45.2 (2014): 70-79.

Sánchez-Álvarez et al., "A Framework to Design the Computational Load Distribution of Wireless Sensor Networks in Power Consumption Constrained Environments." Sensors 18.4 (2018): 954, 20 pages.
Laamrani et al., "Using a Mobile Device "App" and Proximal Remote Sensing Technologies to Assess Soil Cover Fractions on Agricultural Fields." Sensors 18.3 (2018): 708, 16 pages.
Peng et al., "Comparative study of the detection of chromium content in rice leaves by 532 nm and 1064 nm laser-induced breakdown spectroscopy." Sensors 18.2 (2018): 621, 18 pages.
Pichorim et al., "Two solutions of soil moisture sensing with RFID for landslide monitoring." Sensors 18.2 (2018): 452, 11 pages.
Behmann et al., "Specim IQ: evaluation of a new, miniaturized handheld hyperspectral camera and its application for plant phenotyping and disease detection." Sensors 18.2 (2018): 441, 20 pages.
Nie et al., "Research on the effects of drying temperature on nitrogen detection of different soil types by near infrared sensors." Sensors 18.2 (2018): 391, 22 pages.
Cui et al., "Plant pest detection using an artificial nose system: a review." Sensors 18.2 (2018): 378, 18 pages.
Kafarski et al., "Evaluation of apple maturity with two types of dielectric probes." Sensors 18.1 (2018): 121, 13 pages.
Lim et al., "Application of near infrared reflectance spectroscopy for rapid and non-destructive discrimination of hulled barley, naked barley, and wheat contaminated with Fusarium." Sensors 18.1 (2018): 113, 16 pages.
Barriuso et al., "Combination of multi-agent systems and wireless sensor networks for the monitoring of cattle." Sensors 18.1 (2018): 108, 27 pages.
Meng et al., "A Compound Sensor for Simultaneous Measurement of Packing Density and Moisture Content of Silage." Sensors 18.1 (2018): 73, 10 pages.
Brinkhoff et al., "Multisensor capacitance probes for simultaneously monitoring rice field soil-water-crop-ambient conditions." Sensors 18.1 (2018): 53, 14 pages.
Bengochea-Guevara et al., "A low-cost approach to automatically obtain accurate 3D models of woody crops." Sensors 18.1 (2018): 30, 17 pages.
Skovsen et al., "Estimation of the Botanical Composition of Clover-Grass Leys from RGB Images Using Data Simulation and Fully Convolutional Neural Networks." Sensors 17.12 (2017): 2930, 18 pages.
Ravichandran et al., "In vivo non-destructive monitoring of capsicum annuum seed growth with diverse nacl concentrations using optical detection technique." Sensors 17.12 (2017): 2887, 12 pages.
Mao et al., "Contamination Event Detection with Multivariate Time-Series Data in Agricultural Water Monitoring." Sensors 17.12 (2017): 2806, 19 pages.
Castrignanò et al., "A combined approach of sensor data fusion and multivariate geostatistics for delineation of homogeneous zones in an agricultural field." Sensors 17.12 (2017): 2794, 20 pages.
Al-Saddik et al., "Development of spectral disease indices for 'Flavescence Dorée' grapevine disease identification." Sensors 17.12 (2017): 2772, 25 pages.
Wojnowski et al., "Portable electronic nose based on electrochemical sensors for food quality assessment." Sensors 17.12 (2017): 2715, 14 pages.
Dong et al., "Estimating crop area at county level on the North China Plain with an indirect sampling of segments and an adapted regression estimator." Sensors 17.11 (2017): 2638, 9 pages.
Kragh et al., "Fieldsafe: dataset for obstacle detection in agriculture." Sensors 17.11 (2017): 2579, 11 pages.
Zou et al., "A Real-Time Smooth Weighted Data Fusion Algorithm for Greenhouse Sensing Based on Wireless Sensor Networks." Sensors 17.11 (2017): 2555, 14 pages.
Fan et al., "Fast detection of striped stem-borer (Chilo suppressalis Walker) infested rice seedling based on visible/near-infrared hyperspectral imaging system." Sensors 17.11 (2017): 2470, 13 pages.
Nawar et al., "Comparison between random forests, artificial neural networks and gradient boosted machines methods of on-line Vis-NIR spectroscopy measurements of soil total nitrogen and total carbon." Sensors 17.10 (2017): 2428, 22 pages.

(56) References Cited

OTHER PUBLICATIONS

Moorhead et al., "Evaluation of sensible heat flux and evapotranspiration estimates using a surface layer scintillometer and a large weighing lysimeter." Sensors 17.10 (2017): 2350, 23 pages.
Corwin et al., "Evaluating Oilseed Biofuel Production Feasibility in California's San Joaquin Valley Using Geophysical and Remote Sensing Techniques." Sensors 17.10 (2017): 2343, 25 pages.
Nader et al., "Assessing white wine viscosity variation using polarized laser speckle: A promising alternative to wine sensory analysis." Sensors 17.10 (2017): 2340, 12 pages.
Tamouridou et al., "Application of multilayer perceptron with automatic relevance determination on weed mapping using UAV multispectral imagery." Sensors 17.10 (2017): 2307, 9 pages.
Lim et al., "Classification of Fusarium-Infected Korean Hulled Barley Using Near-Infrared Reflectance Spectroscopy and Partial Least Squares Discriminant Analysis." Sensors 17.10 (2017): 2258, 15 pages.
Jia et al., "Hyperspectral imaging analysis for the classification of soil types and the determination of soil total nitrogen." Sensors 17.10 (2017): 2252, 14 pages.
Fuentes et al., "A robust deep-learning-based detector for real-time tomato plant diseases and pests recognition." Sensors 17.9 (2017): 2022, 21 pages.
Alexandridis et al., "Novelty detection classifiers in weed mapping: Silybum marianum detection on UAV multispectral images." Sensors 17.9 (2017): 2007, 12 pages.
Feng et al., "Discrimination of transgenic maize kernel using NIR hyperspectral imaging and multivariate data analysis." Sensors 17.8 (2017): 1894, 14 pages.
Schmittmann et al., "A True-Color Sensor and Suitable Evaluation Algorithm for Plant Recognition." Sensors 17.8 (2017): 1823, 16 pages.
Villarrubia et al., "Combining multi-agent systems and wireless sensor networks for monitoring crop irrigation." Sensors 17.8 (2017): 1775, 23 pages.
Kicherer et al., "Phenoliner: A new field phenotyping platform for grapevine research." Sensors 17.7 (2017): 1625, 18 pages.
Wei et al., "Leaf area index estimation using Chinese GF-1 wide field view data in an agriculture region." Sensors 17.7 (2017): 1593, 14 pages.
Martínez-Guanter et al., "Optical sensing to determine tomato plant spacing for precise agrochemical application: Two scenarios." Sensors 17.5 (2017): 1096, 19 pages.
Shi et al., "Spectroscopic diagnosis of arsenic contamination in agricultural soils." Sensors 17.5 (2017): 1036, 15 pages.
Kameoka et al., "A wireless sensor network for growth environment measurement and multi-band optical sensing to diagnose tree vigor." Sensors 17.5 (2017): 966, 21 pages.
Shiffler, Smart Sensors in Farming: 10 Startups to Watch in 2018. Mar. 7, 2018. Accessed at https://www.disruptordaily.com/smart-sensors-farming-10-startups-watch-2018/ on May 17, 2019, 10 pages.
Danckwerts, A decentralized future for food: Indoor Farming, the Internet of Things and Blockchain Technology. Medium. Jun. 11, 2017. Accessed at https://medium.com/@forbesdanckwerts/a-decentralized-future-for-food-indoor-farming-the-internet-of-things-and-blockchain-technology-8d905b6dcb27 on May 17, 2019, 10 pages.
Agriculture Market 2018-2023: Focus on Systems (Sensing, Communication, Cloud Computing, Data), Applications (Precision Crop, Indoor, Livestock Monitoring, Aquaculture). Research and Markets Nov. 23, 2018. Accessed at https://www.prnewswire.com/news-releases/global-iot-in-agriculture-market-2018-2023-focus-on-systems-sensing-communication-cloud-computing-data-applications-precision-crop-indoor-livestock-monitoring-aquaculture-300754772.html on May 17, 2019, 8 pages.
Global IoT in Agriculture Market: Focus on Systems (Sensing, Communication, Cloud Computing, Data Management), Applications (Precision Crop Farming, Indoor Farming, Livestock Monitoring, Aquaculture)—Analysis and Forecast (2018-2023) Description. Nov. 2018 Research and Markets. Accessed at https://www.researchandmarkets.com/research/w5t7j8/global_iot_in?w=5 on May 21, 2019. 14 pages.
Environmental Monitoring & Aiflow for Climate Uniformity. The University of Arizona Controlled Environment Agriculture Center. Accessed at http://ceac.arizona.edu/environmental-monitoring on May 17, 2019, 6 pages.
Multi-Sensor Modules Ease Indoor Agriculture Design Challenges. Techmezine Feb. 19, 2019. Accessed at https://www.techmezine.com/internet-of-things/multi-sensor-modules-ease-indoor-agriculture-design-challenges/ on May 17, 2019, 8 pages.
Indoor Precision Farming in American medical marijuana plantations. Libelium Dec. 13, 2016. Accessed at http://www.libelium.com/indoor-precision-farming-in-american-medical-marijuana-plantations/ on May 17, 2019, 7 pages.
<https://sensorinsight.io/> Accessed on May 17, 2019, 7 pages.
Internet of Things Hardware Distributor. Accessed at https://sensorinsight.io/hardware/ on May 17, 2019, 4 pages.
Modular Farming Systems. Cityblooms. Accessed at https://cityblooms.com/modular-farms/ on May 17, 2019, 6 pages.
The Orchestra Conductor for Your Farm. The Cityblooms Commander. Accessed at https://cityblooms.com/commander/ on May 17, 2019, 12 pages.
New controlled-environment agriculture solution in Chile enables up to 50% energy saving. Advanticsys Feb. 3, 2018. Accessed at https://www.advanticsys.com/new-controlled-environment-agriculture-solution-in-chile-enables-up-to-50-energy-saving/ on May 17, 2019, 3 pages.
4-in-1 Sensor. Growlink. Accessed at https://growlink.com/shop/4-in-1-sensor/ on May 17, 2019, 7 pages.
Growlink Climate Sensor. Growlink. Accessed at https://growlink.com/shop/environment-sensor-module/ on May 17, 2019, 7 pages.
Smart Sense Wireless Module. Growlink. Accessed at https://growlink.com/shop/remotesense/ on May 17, 2019, 7 pages.
Blink XP Plant Vision Cameras. Growlink. Accessed at https://growlink.com/shop/plant-vision-camera-system/ on May 17, 2019, 6 pages.
Advanced Soil Moisture Sensing. Growlink. Accessed at https://growlink.com/shop/terros12/ on May 17, 2019, 6 pages.
Small Soil Moisture Sensor. Growlink. Accessed at https://growlink.com/shop/ec-5-small-soil-moisture-sensor/ on May 17, 2019, 7 pages.
TE Connectivity AmbiMate Sensor Module MS4 Series. Mouser Electronics. Accessed at https://www.mouser.com/new/TE-Connectivity/te-connectivity-ambimate-sensor-module/ on May 17, 2019, 2 pages.
LED Grow Lights. Heliospectra. Accessed at https://www.heliospectra.com/led-grow-lights/ on May 17, 2019, 9 pages.
Oreon Grow Light 2.1 (GL 600 2.1 XXX) Installation Manual. Oreon. Jan. 22, 2018. Accessed at https://www.oreon-led.com/cache/InstallationManual20180122USCA.107/InstallationManual20180122USCA.pdf, 18 pages.
Oreon Grow Light 2.1. Oreon 2016. Accessed at https://hortinext.com/wp-content/uploads/2016/08/Lemnis-Oreon-Brochure_EN.pdf, 2 pages.
International Search Report and Written Opinion in International Patent Application No. PCT/US19/28493 dated Jul. 25, 2019, 15 pages.
Purwar, "In-situ Real-time Field Imaging and Monitoring of Leaf Stomata by High-resolution Portable Microscope." bioRxiv (2019): 677450. 24 pages.
Roots Corporate Presentation. Roots Sustainable Agricultural Technologies Ltd. Oct. 2018. 28 pages.
Model-W LED Grow Light. ThinkGrow 2019. Accessed at https://www.thinkgrowled.com/First/IndexW on Mar. 11, 2020. 3 pages.
Rosenthal, Light Dep vs Outdoor: Why Light Deprivation Greenhouses Are A Good Investment. Ed Rosenthal.com May 3, 2019. Accessed at https://www.edrosenthal.com/the-guru-of-ganja-blog/light-dep-vs-outdoor on Mar. 11, 2020. 10 pages.
YellowScan Forestry. Accessed at https://www.yellowscan-lidar.com/applications/forestry/ on Mar. 16, 2020. 9 pages.
Bowen, Green Thumb IO Platform. GreenThumb.IO. Feb. 16, 2019. Accessed at https://medium.com/greenthumbio/greenthumb-io-platform-d6d09ca7fafb on Mar. 16, 2020. 4 pages.

(56) References Cited

OTHER PUBLICATIONS

Smarter Farming. TortugaAgTech. Accessed at https://www.tortugaagtech.com/ on Mar. 24, 2020. 10 pages.
PlantEye F500 multispectral 3D scanner for plants. Phenospec Smart Plant Analysis. Accessed at https://phenospex.com/products/plant-phenotyping/planteye-f500-multispectral-3d-laser-scanner/?gclid=Cj0KCQjwmdzzBRC7ARIsANdqRRn6QO5qmh0wwGnlkROEuysd8CaRKe94_kmoBIPuJzwlvcQGzgWGksMaAmt_EALw_wcB on Mar. 24, 2020.
Russo, "The case for the entourage effect and conventional breeding of clinical cannabis: no "strain," no gain." Frontiers in plant science 9 (2019): 1969. 8 pages.
US Energy Use Intensity by Property Type. Energy Star PortfolioManager Technical Reference. Aug. 2018. 6 pages.
International Search Report and Written Opinion in International Patent Application No. PCT/US2019/030889 dated Sep. 26, 2019, 22 pages.
Rodrigues, Agnetix—Most Powerful and Efficient LED Horticulture Lighting Platform. YouTube Jan. 8, 2018. Accessed at https://www.youtube.com/watch?v=y6rZeJ6V8Ug. 7 pages.
International Search Report and Written Opinion in International Patent Application No. PCT/US2019/061324 dated Mar. 18, 2020, 92 pages.
The Greencube. Youtube Nov. 5, 2015. Accessed at https://www.youtube.com/watch?v=IqoENjkruMc on Apr. 17, 2020. 3 pages.
Executive Summary EDEN ISS. Apr. 2019. Accessed at https://eden-iss.net/wp-content/uploads/EDEN-ISS-Complete-Brochure_ONLINE_small.pdf on Apr. 17, 2020.
Non Final Office Action in U.S. Appl. No. 16/824,495 dated May 22, 2020, 47 pages.
Non Final Office Action in U.S. Appl. No. 16/114,088 dated May 5, 2020, 38 pages.
Notice of Allowance in U.S. Appl. No. 16/114,088 dated Jul. 24, 2020, 20 pages.
Non Final Office Action in U.S. Appl. No. 16/828,521 dated Jul. 28, 2020, 30 pages.
Notice of Allowance in U.S. Appl. No. 16/824,495 dated Jul. 29, 2020, 21 pages.
Notice of Allowance in U.S. Appl. No. 16/390,501 dated Aug. 24, 2020, 10 pages.
Lai—theory and practice. Accessed at https://www.metergroup.com/environment/articles/lai-theory-practice/ on Sep. 2, 2020. 35 pages.
Nynomic—The Photonics Group. Company Presentation Nynomic AG Dec. 10, 2019. Accessed at https://www.nynomic.com/wp-content/uploads/2019/12/Nynomic_28.MKK_2019.pdf. 34 pages.
Apogee Instruments. Accessed at https://www.apogeeinstruments.com/ on Sep. 2, 2020. 6 pages.
OCO-3 Instrument. NASA Jet Propulsion Laboratory California Institute of Technology. Accessed at https://ocov3.jpl.nasa.gov/instrument/ on Sep. 2, 2020. 3 pages.
Sensors, Sonars, and Cameras. BlueRobotics. Accessed at https://bluerobotics.com/product-category/sensors-sonars-cameras/ on Sep. 2, 2020. 6 pages.
Aidukas et al., "Low-cost, sub-micron resolution, wide-field computational microscopy using opensource hardware." Scientific reports 9.1 (2019): 1-12.
Koyama et al., "High-image quality, high-resolution camera with high sensitivity up to 1,100 nm." Ultra-High-Definition Imaging Systems. vol. 10557. International Society for Optics and Photonics, 2018. 32 pages.
About LCI. Bliportal. Accessed at https://www.bli.eu/about-multi-light/about-lci/ on Sep. 2, 2020. 5 pages.
Prairie et al., "An accurate, precise, and affordable light emitting diode spectrophotometer for drinking water and other testing with limited resources." Plos one 15.1 (2020): e0226761. 32 pages.
Spectral Indices. L3Harris Geospatial. Accessed at https://www.harrisgeospatial.com/docs/spectralindices.html on Sep. 2, 2020. 12 pages.
Wünsch et al., "Fluorescence quantum yields of natural organic matter and organic compounds: Implications for the fluorescence-based interpretation of organic matter composition." Frontiers in Marine Science 2 (2015): 98. 15 pages.
Terra Mepp. Accessed at https://terra-mepp.illinois.edu/ on Sep. 2, 2020. 9 pages.
Valle et al., "PYM: a new, affordable, image-based method using a Raspberry Pi to phenotype plant leaf area in a wide diversity of environments." Plant methods 13.1 (2017): 98. 17 pages.
Mudhar, Using near IR to look for photosynthesis and plant health with NDVI. Richard Mudhar Blog. Jul. 21, 2015. Accessed at https://www.richardmudhar.com/blog/2015/07/using-near-ir-to-look-for-photosynthesis-and-plant-health-with-ndvi/. 7 pages.
Lapa, Raspberry + NoIR cam + Sensors to detect water stress of the plants during their growing. Public Lab Mar. 31, 2016. Accessed at https://publiclab.org/notes/LaPa/03-31-2016/raspberry-noir-cam-sensors-to-detect-water-stress-of-the-plants-during-their-growing. 11 pages.
Blonquist, Using Infrared Thermometers for Plant Science Research. Apogee Insturments Inc. Youtube Jul. 31, 2017. Accessed at https://www.youtube.com/watch?time_continue=120&v=U_azOSSvBW8&feature=emb_logo. 3 pages.
Notice of Allowance in U.S. Appl. No. 16/114,088 dated Sep. 30, 2020, 5 pages.
Notice of Allowance in U.S. Appl. No. 16/390,501 dated Oct. 15, 2020, 7 pages.
Notice of Allowance in U.S. Appl. No. 16/824,495 dated Oct. 23, 2020, 5 pages.
Notice of Allowance in U.S. Appl. No. 16/828,521 dated Nov. 9, 2020, 5 pages.
Goossens et al., "Broadband image sensor array based on graphene-CMOS integration." Nature Photonics 11.6 (2017): 366. 6 pages.
Tokarz et al., "Carotenoid based bio-compatible labels for third harmonic generation microscopy." Physical Chemistry Chemical Physics 14.30 (2012): 10653-10661.
Lichtenthaler et al., "Chlorophylls and carotenoids: Measurement and characterization by UV-VIS spectroscopy." Current protocols in food analytical chemistry 1.1 (2001): F4-3. 8 pages.
Lopez-Ruiz et al., "Portable multispectral imaging system based on Raspberry Pi." Sensor Review (2017). 9 pages.
Osroosh et al., "Using the power of IoT to improve irrigation water management." Irrigation Today (Apr. 2018). 2 pages.
Campbell, "Can Canopy Measurements Determine Soil Moisture?" (Part 1) Environmental Biophysics Aug. 29, 2016. 4 pages.
Campbell, "Can Canopy Measurements Determine Soil Moisture?" (Part 2) Environmental Biophysics Sep. 5, 2016. 3 pages.
Osroosh et al., "Automatic irrigation scheduling of apple trees using theoretical crop water stress index with an innovative dynamic threshold." Computers and Electronics in Agriculture 118 (2015): 193-203.
Osroosh et al., "Daylight crop water stress index for continuous monitoring of water status in apple trees." Irrigation science 34.3 (2016): 209-219.
Osroosh et al., "Comparison of irrigation automation algorithms for drip-irrigated apple trees." Computers and Electronics in Agriculture 128 (2016): 87-99.
Osroosh et al., "Economical thermal-RGB imaging system for monitoring agricultural crops." Computers and Electronics in Agriculture 147 (2018): 34-43.
Osroosh et al., "Detecting fruit surface wetness using a custom-built low-resolution thermal-RGB imager." Computers and Electronics in Agriculture 157 (2019): 509-517.
Osroosh et al., "Estimating potential transpiration of apple trees using theoretical non-water-stressed baselines." Journal of Irrigation and Drainage Engineering 141.9 (2015): 04015009. 13 pages.
Osroosh et al., "Estimating actual transpiration of apple trees based on infrared thermometry." Journal of Irrigation and Drainage Engineering 141.8 (2015): 04014084. 13 pages.
Notice of Allowance in U.S. Appl. No. 16/390,501 dated Feb. 10, 2021, 10 pages.
Notice of Allowance in U.S. Appl. No. 17/083,461 dated Feb. 26, 2021, 9 pages.
Extended European Search Report in European Patent Application No. 18848610.4 dated Mar. 2, 2021, 11 pages.

(56) References Cited

OTHER PUBLICATIONS

Notice of Allowance in U.S. Appl. No. 16/404,192 dated Mar. 30, 2021, 9 pages.
Notice of Allowance in U.S. Appl. No. 17/141,173 dated Mar. 30, 2021, 24 pages.
International Search Report and Written Opinion in International Patent Application No. PCT/US2020/064837 dated Mar. 31, 2021, 13 pages.
Corrected Notice of Allowance in U.S. Appl. No. 16/390,501 dated Apr. 8, 2021, 2 pages.
First Office Action in Chinese Patent Application 201880069341.0 and English Translation Thereof dated Mar. 31, 2021, 17 pages.
Notice of Allowance in U.S. Appl. No. 17/083,461 dated May 3, 2021, 8 pages.
Corrected Notice of Allowance in U.S. Appl. No. 17/141,173 dated May 25, 2021, 2 pages.
Yang et al., Application of Integrated Sensing and Automation Technology, and Preventive Bio-Control Agent for Greenhouse Precision Cultivation. Mardi Regionsl Workshop FFTC Sep. 21, 2017, 67 pages.
Non Final Office Action in U.S. Appl. No. 17/216,291 dated Jul. 9, 2021, 7 pages.
U.S. Appl. No. 16/114,088, filed Aug. 27, 2018, Lys et al.
U.S. Appl. No. 16/390,501, filed Apr. 22, 2019, Lys et al.
U.S. Appl. No. 16/404,192, filed May 6, 2019, Lys et al.
U.S. Appl. No. 16/824,495, filed Mar. 19, 2020, Lys et al.
U.S. Appl. No. 16/828,521, filed Mar. 24, 2020, Lys et al.
U.S. Appl. No. 17/141,173, filed Jan. 4, 2021, Lys et al.
U.S. Appl. No. 17/083,461, filed Oct. 29, 2020, Lys et al.
U.S. Appl. No. 17/216,291, filed Mar. 29, 2021, Lys et al.
U.S. Appl. No. 17/317,792, filed May 11, 2021, Lys et al.
U.S. Appl. No. 17/238,044, filed Apr. 22, 2021, Lys et al.
Spectranomics. Carnegie Airborne Observatory as of Dec. 5, 2019. Accessed at https://web.archive.org/web/20191205203624/https://cao.carnegiescience.edu/spectranomics on Apr. 17, 2020. 2 pages.
TerrAvion Product Info. Accessed at https://www.terravion.com/product-info/ on Apr. 17, 2020. 3 pages.
Story et al., "Design and implementation of a computer vision-guided greenhouse crop diagnostics system." Machine vision and applications 26.4 (2015): 495-506.
Canopy Scanalyzer. LemnaTec. Accessed at https://www.lemnatec.com/products/canopy-scanalyzer/ on Apr. 17, 2020. 2 pages.
PAM Chlorophyll Fluorescence Imaging. LemnaTec. Accessed at https://www.lemnatec.com/pam-chlorophyll-fluorescence-imaging/ on Apr. 17, 2020. 2 pages.
Cerna® Modular Microscopes. Thorlabs May 10, 2018. Accessed at https://www.thorlabs.com/images/Brochures/Thorlabs_Cerna_Brochure.pdf on Apr. 17, 2020. 6 pages.
Murphy et al., "OpenFluor—an online spectral library of autofluorescence by organic compounds in the environment." Analytical Methods 6.3 (2014): 658-661.
Ubbens et al., "Deep plant phenomics: a deep learning platform for complex plant phenotyping tasks." Frontiers in plant science 8 (2017): 1190. 11 pages.
YellowScan Reliable UAV LiDAR Mapping. Accessed at https://www.yellowscan-lidar.com/ on Apr. 17, 2020. 3 pages.
Earles et al., "Beyond porosity: 3D leaf intercellular airspace traits that impact mesophyll conductance." Plant physiology 178.1 (2018): 148-162.
LI-6400XT Portable Photosynthesis System. Li-Cor . Accessed at https://www.licor.com/env/products/photosynthesis/ on Apr. 17, 2020. 1 page.
Controlled Environment Agriculture. Cornell University college of Agriculture and Life Sciences Sep. 2, 2019. Accessed at https://web.archive.org/web/20190902094759/http://cea.cals.cornell.edu/bestPractices/lightControl.html on Apr. 17, 2020. 2 pages.
Sentera. Accessed at https://sentera.com/sensors/ on Apr. 17, 2020. 4 pages.
AGRASMG-1. DJI. Acessed at https://www.dji.com/mg-1 on Apr. 17, 2020. 6 pages.
Semi-Autonomous Vineyard Spraying Agricultural Robot (SAVSAR)—Hellenic Open University Experiments. Youtube Nov. 27, 2016. Accessed at https://www.youtube.com/watch?v=-zdN8b806b0 on Apr. 17, 2020. 1 page.
Accesssories: UV & NIR Illuminators, Filter Modules. Eigen Imaging. Accessed at https://www.eigenimaging.com/collections/uv-nir-illuminator on Apr. 17, 2020. 5 pages.
360 Soilscan. 360yieldcenter.com. Dec. 24, 2014. Accessed at http://nebula.wsimg.com/45a21444c39dcfb4b9ca43dedf13076e?AccessKeyId=42F03180740870DBA0EF&disposition=0&alloworigin=1 on Apr. 17, 2020. 2 pages.
Agricultureal Robotics. Harvest Croo Robotics. Accessed at https://harvestcroo.com/ on Apr. 17, 2020. 3 pages.
TerrAvion + FluroSense: nitrogen management. TerrAvion Jun. 3, 2019. Accessed at https://blog.terravion.com/blog/terravion-flurosat-nitrogen-management on Apr. 17, 2020. 4 pages.
Osburn et al., "Predicting sources of dissolved organic nitrogen to an estuary from an agro-urban coastal watershed." Environmental science & technology 50.16 (2016): 8473-8484.
Excitation-Emission Matrix (EEM) Fluorescence Spectroscopy for Analysis of Dissolved Organic Matter (DOM) in Natural Water and Wastewaters. Application News No. AD-0133 Shimadzu Nov. 15, 2016. Accessed at https://solutions.shimadzu.co.jp/an/n/en/rf/apa417010.pdf?_ga=2.70350806.735204626.1575945001-871956823.1575945001 on Apr. 16, 2020.
Abramowitz et al., Overview of Fluorescence Excitation and Emission Fundamentals. Olympus. Accessed at https://www.olympus-lifescience.com/en/microscope-resource/primer/lightandcolor/fluoroexcitation/ on Apr. 17, 2020. 4 pages.
Fluorescence Imaging Filters. ThorLabs. Accessed at https://www.thorlabs.com/newgrouppage9.cfm?objectgroup_id=2990 on Apr. 17, 2020. 4 pages.
Shortwave Infrared Camera Core Tau™ SWIR. FLIR. Accessed at https://www.flir.com/products/tau-swir/?model=Tau-Vis-SWIR on Apr. 17, 2020. 2 pages.
Natali et al., "Light-harvesting complexes (LHCs) cluster spontaneously in membrane environment leading to shortening of their excited state lifetimes." Journal of Biological Chemistry 291.32 (2016): 16730-16739.
Ghassemi et al., "Evaluation of mobile phone performance for near-infrared fluorescence imaging." IEEE Transactions on Biomedical Engineering 64.7 (2016): 1650-1653.
310nm UV LED Fluorescence using iPhone 6s. Youtube Jul. 15, 2018. Accessed at https://www.youtube.com/watch?v=hA6VPmJWE_8 on Apr. 17, 2020. 3 pages.
Tran et al., Smartphone Multi-Spectral Imaging. Eigen Imaging Inc., Apr. 2013. Accessed at https://sites.google.com/a/eigenimaging.com/eigen/learn-more/smartphone-multi-spectral-imaging on Apr. 17, 2020. 5 pages.
International Search Report and Written Opinion in International Patent Application No. PCT/US2020/064382 dated May 27, 2021, 15 pages.
U.S. Appl. No. 17/362,938, filed Jun. 29, 2021, Lys et al.
Non Final Office Action in U.S. Appl. No. 17/323,822 dated Jul. 14, 2021, 8 pages.
Extended European Search Report in European App. No. EP 19883460.8 dated Jul. 25, 2022 14 pages.
International Search Report and Written Opinion in International App. No. PCT/US2022/013755 dated Jul. 20, 2022 21 pages.
Third Office Action and English translation thereof in Chinese Application No. 2018806934.1 dated Aug. 10, 2022, 8 pages.
Second Office Action and English Translation thereof in Chinese Application No. CN Appl.No. 201980044374.4 dated Aug. 16, 2022, 16 pages.
Korean Office Action and English Translation thereof in Korean Application No. 10-2020-7034729 dated Sep. 19, 2022, 7 pages.
International Search Report and Written Opinion in International Patent Application No. PCT/US2022/032392 dated Nov. 18, 2022, 15 pages.
Korean Notice of Allowance and English Translation thereof in Korean Application No. 10-2020-7034729 dated Jan. 20, 2023, 8 pages.

(56) References Cited

OTHER PUBLICATIONS

Third Office Action and English Translation thereof in Chinese Application No. 201980044374.4 dated Feb. 8, 2023, 12 pages.
Official Action in European Application No. 19796862.1 dated Feb. 28, 2023, 4 pages.
Office Action and English Translation thereof in Korean Application No. 10-2021-7017428 dated Mar. 28, 2023, 13 pages.
Chinese Office Action and English Translation Thereof in Chinese Application No. 201980044374.4 dated Jun. 20, 2023, 8 pages.
Israeli Office Action with Translation Thereof in Israeli Application No. 278388 dated Sep. 21, 2023, 6 pages.
Korean Notice of Allowance and English Translation thereof in Korean Application No. 10-2021-70017428 dated Nov. 6, 2023, 7 pages.
Notice of Allowance in U.S. Appl. No. 17/392,152 dated Aug. 26, 2022, 9 pages.
Ex Parte Quayle Action in U.S. Appl. No. 17/362,938 mailed Aug. 26, 2022 5 pages.
Corrected Notice of Allowance in U.S. Appl. No. 17/392,152 dated Sep. 6, 2022, 3 pages.
Non-Final Office Action in U.S. Appl. No. 17/238,044 dated Oct. 20, 2022, 43 pages.
Notice of Allowance in U.S. Appl. No. 17/392,152 dated Dec. 16, 2022, 9 pages.
Notice of Allowance in U.S. Appl. No. 17/723,366 dated Jan. 26, 2023, 7 pages.
Corrected Notice of Allowance in U.S. Appl. No. 17/392,152 dated Feb. 15, 2023, 2 pages.
Notice of Allowance in U.S. Appl. No. 17/362,938 dated Feb. 21, 2023, 8 pages.
Final Office Action in U.S. Appl. No. 17/238,044 dated May 26, 2023, 46 pages.
Notice of Allowance in U.S. Appl. No. 17/362,938 dated Jun. 16, 2023, 8 pages.
Notice of Allowance in U.S. Appl. No. 17/362,938, dated Sep. 26, 2023, 8 pages.

\* cited by examiner $$[x,y] = [\lambda 1, \lambda 2, \lambda 3, ... \lambda N, \text{LWIR temp}]$$

FIG. 14

| Reference Condition Library | | |
|---|---|---|
| Feature Set 1<br>[λ1,1; λ2,1; λ3,1;...λN,1; LWIR1] | Label 1<br>(for Condition 1) | |
| Feature Set 2<br>[λ1,2; λ2,2; λ3,2;...λN,2; LWIR2] | Label 2<br>(for Condition 2) | |
| Feature Set 3<br>[λ1,1; λ2,1; λ3,1;...λN,1; LWIR1] | Label 3<br>(for Condition 3) | |
| • | • | |
| • | • | |
| • | • | |
| • | • | |
| • | • | |
| • | • | |
| Feature Set M<br>[λ1,M; λ2,M; λ3,M;...λN,M; LWIRM] | Label M<br>(for Condition M) | |

$[x,y] = [\lambda 1, \lambda 2, ... \lambda N, NDSI, LWIR\ temp]$

FIG. 18

[x,y] = [VIS, NIR, IR, AT, RH, CO2, TOF]

FIG. 29

| Reference Condition Library | | | | | | | | | |
|---|---|---|---|---|---|---|---|---|---|
| Label 1 (for Condition 1) | Label 2 (for Condition 2) | Label 3 (for Condition 3) | • | • | • | • | • | • | Label M (for Condition M) |
| Feature Set 1 [VIS$_{1,1}$; NIR$_{2,1}$; IR$_{3,1}$;...TOF$_{N,1}$] | Feature Set 2 [VIS$_{1,2}$; NIR$_{2,2}$; IR$_{3,2}$;...TOF$_{N,2}$] | Feature Set 3 [VIS$_{1,3}$; NIR$_{2,3}$; IR$_{3,3}$;...TOF$_{N,3}$] | • | • | • | • | • | • | Feature Set M [VIS$_{1,M}$; NIR$_{2,M}$; IR$_{3,M}$;...TOF$_{N,M}$] |

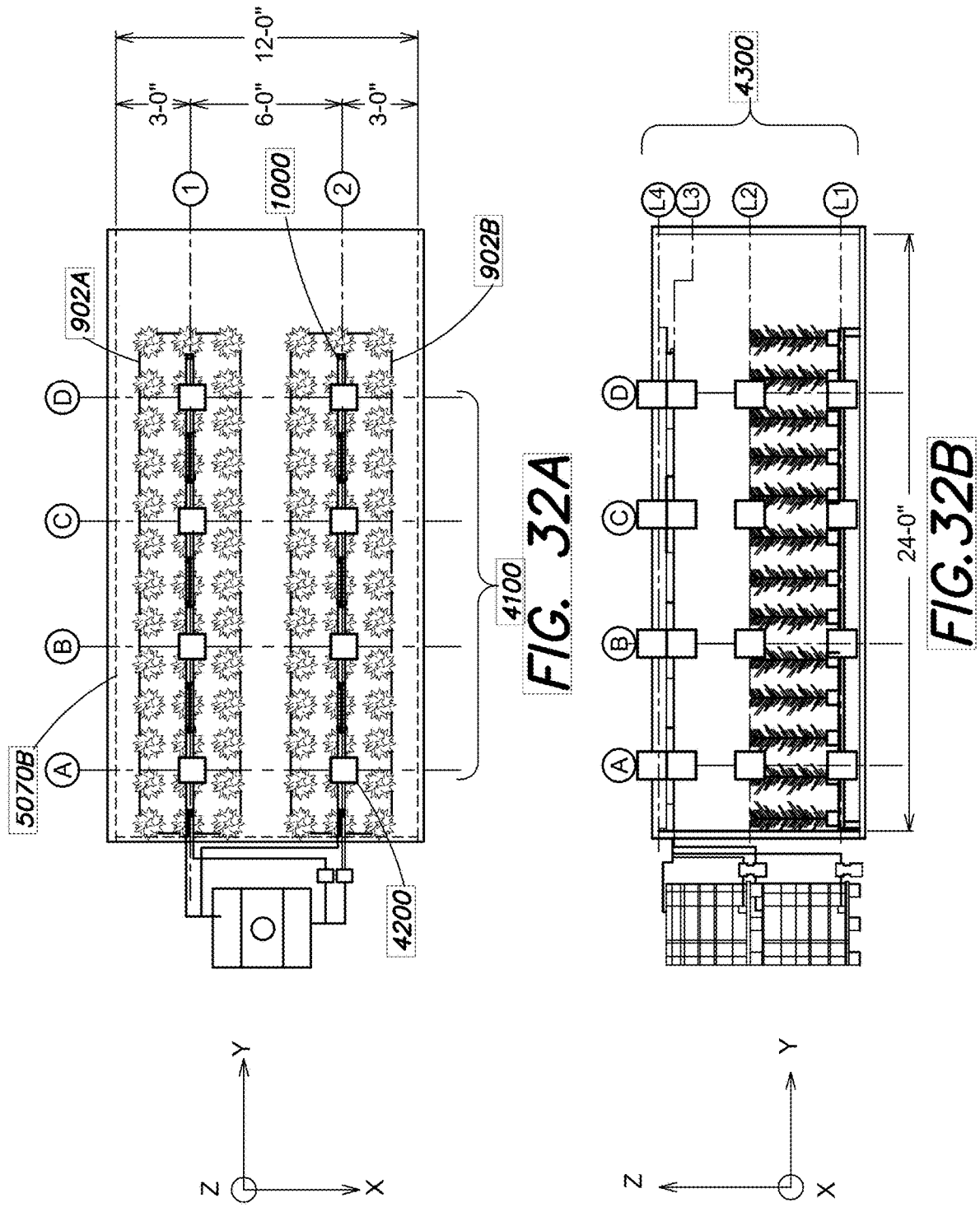

$[x,y,z] = [\text{VIS, NIR, IR, AT, RH, CO2, TOF}]$

FIG. 33

MULTISENSORY IMAGING METHODS AND APPARATUS FOR CONTROLLED ENVIRONMENT HORTICULTURE USING IRRADIATORS AND CAMERAS AND/OR SENSORS

CROSS-REFERENCE TO RELATED PATENT APPLICATION(S)

The present application is a bypass continuation of international application No. PCT/US2020/064382, filed on Dec. 10, 2020, entitled "MULTISENSORY IMAGING METHODS AND APPARATUS FOR CONTROLLED ENVIRONMENT HORTICULTURE USING IRRADIATORS AND CAMERAS AND/OR SENSORS," which claims priority to U.S. provisional application No. 62/946,407, filed on Dec. 10, 2019, entitled "MULTISPECTRAL IMAGING METHODS AND APPARATUS FOR CONTROLLED ENVIRONMENT HORTICULTURE USING ILLUMINATORS AND CAMERAS AND/OR SENSORS," each of which is incorporated herein by reference in its entirety.

BACKGROUND

Farmers are increasingly using agricultural imaging of outdoor crops in an effort to improve crop yields. Conventional agricultural imaging techniques can facilitate easier inspection of outdoor crops, greater precision of crop monitoring, and earlier detection of crop problems, such as certain nutrient deficiencies, insect infestations, and diseases. Satellites, aircraft, or unmanned aerial vehicles (UAVs) are used to capture hyperspectral or multispectral aerial images of the crops. These aerial images can be processed using vegetation indices (VIs) to determine certain crop features.

A VI is a spectral transformation of two or more spectral reflectance measurement bands that takes advantage of differences in light reflectance from vegetation in different spectral bands. VIs may facilitate indicating an amount of vegetation, distinguishing between soil and vegetation, or reducing atmospheric and topographic effects in images of vegetation. VIs can be correlated with various crop characteristics, such as leaf area index (LAI), percent green cover, chlorophyll content, green biomass, and absorbed photosynthetically active radiation (APAR). The Normalized Difference Vegetation Index (NDVI) is a common VI that compares visible red and near-infrared (NIR) spectral reflectance bands. Other common VIs include the Photochemical Reflectance Index (PRI), the Difference Vegetation Index (DVI), the Ratio Vegetation Index (RVI), and the Crop Water Stress Index (CWSI). Images that are generated and/or processed based on one or more VIs can show changes in crops weeks before the changes are visible to the naked eye. Such insights from images can be used to improve resource use efficiency; protect crops from certain diseases, pests, and water stress; and improve crop yield.

In conventional agricultural imaging techniques, multiple parameters effect the efficacy and utility of images of crops; examples of such parameters include pixel resolution (size of the pixels), image bandwidth (spectral range of wavelengths being imaged), radiometry resolution (range of relative radiation reflectance values per pixel), and positional accuracy. All of these parameters impact the usefulness of the image for crop monitoring. In particular, agricultural imaging equipment that provides sufficient imaging resolution and accuracy generally translates to increased costs to the farmer. In some instances, the cost of effective agricultural imaging for a given farmer can offset any increased profits due to better yields, leaving the potential agricultural advantages of such imaging out of reach for some farmers.

Controlled Environment Horticulture (CEH) (also referred to more generally as controlled environment agriculture or CEA) is the process of growing plants in a controlled environment where various environmental parameters are monitored and adjusted to improve the quality and yield of the plants grown. Compared to conventional approaches of plant cultivation, CEH may enable year-round production of plants, insensitivity to variable weather conditions, reduce pests and diseases, and reduce the number of resources consumed on a per plant basis. A controlled horticultural environment is typically enclosed, at least in part, by a building structure such as a greenhouse, a grow room, or a cover for a portion of a field in order to provide some degree of control over environmental conditions. Additional control systems may be deployed in CEH to adjust various environmental parameters including lighting, temperature, humidity, nutrient levels, and carbon dioxide ($CO_2$) concentrations. For example, one or more artificial lighting systems are often used in such controlled horticultural environments to supplement and/or replace natural sunlight that may be obstructed by the building structure or insufficient during certain periods of the year (e.g., winter months).

There have been multiple attempts to adapt agricultural imaging systems for CEH. For example, in the article by Story and Kacira, "Design and Implementation of a Computer Vision-Guided Greenhouse Crop Diagnostics System," Machine Vision and Applications, Vol. 26 (2015), pp. 495-506, the authors describe a canopy imaging system with robotic positioning to move the imaging system around a CEH growth environment. The imaging system determined crop features, such as color, texture, morphology, and temperature under greenhouse field lighting conditions, using three cameras for visible, near infrared (NIR), and thermal imaging, respectively. Robotic positioning moved the three-camera housing within an xy-coordinate system above the crop canopy.

As another example, international patent publication WO 2017/192566 describes a horticultural lighting system with one or more modular devices, such as a hyperspectral, stereoscopic, or infrared camera, installed into a receptacle in a lighting device. The modular devices can be used to validate light levels and spectrum delivered to growth environments in order to identify light intensity decay and spectrum shift over time.

As a third example, U.S. Pat. No. 8,850,742 describes a lighting system used to modulate and control growth and attributes of greenhouse crops. The system includes arrays of high power LEDS having different ranges of wavelengths to irradiate one or more plants in the CEH, as well as sensors or cameras with specific color filters to sense reflected or emitted light from the crops. This system uses the data collected from the sensors or cameras to predict response and performance of plants to various growing conditions and modulates the lighting produced by the lighting system based on the data.

In addition to imaging, more generally a variety of environmental sensing equipment available from multiple manufacturers has been conventionally employed to monitor different conditions and aspects of crops and their environs. Like agricultural imaging, incorporating multiple sensing modalities in CEH may provide greater insight and control on environmental parameters pertinent to plant development, crop yield, and crop quality. Various types of conventional sensors deployed in CEH, however, often are installed, connected, and controlled individually and/or in an uncoordinated manner (e.g., particularly if each sensor type from a given manufacturer has a proprietary connection mechanism). This in turn may outweigh the potential benefits of increased monitoring of crops via diverse sensing; in particular, increasing the number of diverse sensors unduly increases the complexity of the sensing system and thereby may pose a greater time, cost and/or other resource burden on farmers.

SUMMARY

As noted above, aerial agricultural imaging is limited to outdoor agricultural environments. Accordingly, there are multiple considerations for adapting agricultural imaging to Controlled Environment Horticulture (CEH), given that crops are not accessible for aerial imaging (e.g., using satellites, planes, or UAVs). Additionally, one or more artificial lighting systems often are used in CEH to supplement and/or replace natural sunlight that may be obstructed by the building structure or insufficient during certain periods of the year (e.g., winter months).

The Inventors have recognized and appreciated that previous efforts to adapt conventional agricultural imaging techniques to CEH have had some shortcomings. For example, some previous efforts, such as those disclosed in WO 2017/192566 and Story and Kacira, relied on illumination from the growing environment (e.g., either artificial growing lights or the sun) to provide sufficient light for imaging. However, the Inventors have recognized and appreciated the benefits of augmenting an artificial lighting system for CEH with an imaging system that includes its own irradiation devices; such an imaging system allows crops to be irradiated with specific narrow spectral bands to sense and image crop conditions that may be particularly represented in one or more of these narrow spectral bands. The Inventors have also recognized the importance of measuring spectral characteristics of crops in situ without necessarily affecting morphological changes in the crops due to irradiation from an imaging system.

To this end, the Inventors have appreciated some of the limitations of imaging techniques such as those disclosed techniques in U.S. Pat. No. 8,850,742, which employed simultaneous irradiation of plants using several high power narrow spectral band irradiators. However, by simultaneously irradiating plants with several relatively high power and narrow spectral bands, the techniques employed in this patent mask or make it difficult to isolate a particular characteristic of the irradiated crops at any one narrow spectral band. When considered together with the relatively low-resolution cameras employed, the disclosed techniques in U.S. Pat. No. 8,850,742 compromise accuracy and reliability. Additionally, the disclosed high-power irradiating techniques intentionally modified biochemical attributes of the plants, and hence were not oriented to measuring various aspects of plants in situ in the nominal conditions of the controlled environment.

In view of the foregoing, the present disclosure is directed generally to multisensory imaging methods and apparatus that involve one or both of multispectral imaging and integrated sensing to provide a fuller compliment of information regarding crops in CEH, from an entire grow space, to some smaller portion of a grow space, down to individual plants, leaves, buds, or other plant constituents. In example implementations discussed herein, comprehensive multisensory imaging may be realized in relatively large "fields of view" in a given grow space, (in which the resolution of data captured in a given image may be on the scale of multiple plants or groups of plants or a larger portion of a grow space), as well as relatively smaller fields of view (in which the resolution of data captured by a given image may be on the scale of a single plant or portion of a plant). In one salient aspect, various data constituting an image, acquired from virtually any size field of view or any image resolution, is indexed as respective pixels representing points in a one-dimensional (1D), two-dimensional (2D) or three-dimensional (3D) arrangement of sensing nodes in some portion (or all of) a grow space.

The various concepts disclosed herein constitute significant improvements in horticultural imaging that reduce cost, improve access of agricultural imaging to farmers, and improve image quality and the quantum of information that can be derived from the images. These concepts also constitute significant improvements in horticultural sensing more generally that reduce cost, improve access to farmers, and enhance the quantum of information that can be derived from sensors deployed in CED. Furthermore, in some example implementations, the disclosed concepts integrate agricultural sensing and imaging together for CEH, and further integrate sensing and imaging concepts with artificial lighting and environmental conditioning (e.g., HVAC) for CEH to provide holistic control and monitoring solutions.

For example, one implementation disclosed herein relates to a multispectral imaging system that is deployed in combination with a fluid-cooled light emitting diode (LED)-based lighting fixture (also referred to hereafter as a "lighting fixture" or "illuminator"). The multispectral imaging system may provide finite spectra sensing to measure narrowband spectra (e.g., about 2 nm to about 40 nm). The finite spectra sensing capabilities provided by the multispectral imaging system may enable the characterization of various aspects of CEH crops including, but not limited to deep plant phenotyping, plant-environment interactions, genotype-phenotype relations, growth rate correlations, imaging, and analysis of plants in pots, containers, and/or ground soil. Furthermore, the multispectral imaging system is sufficiently compact for deployment and use at length scales less than 100 meters (unlike previous imaging systems deployed on aircraft, i.e., at length scales greater than 1000 meters).

In one aspect, the multispectral imaging system may be integrated with a lighting fixture or a separate module (or accessory) connected to the lighting fixture via a wired or wireless connection. The multispectral imaging system may include imagers/sensors to acquire imagery and spectra on the agricultural environment. The imagers/sensors may be configured to acquire imagery and/or spectra over a broad wavelength range (e.g., ultraviolet to long wavelength infrared). In some implementations, the multispectral imaging system may include a first imager/camera to acquire imagery from the UV to short wavelength infrared (SWIR) regimes and a second imager/camera to acquire imagery in the long wavelength infrared (LWIR) regime. In some implementations, the second imager/camera may continually acquire LWIR imagery while the first imager/camera is periodically activated in combination with an illumination source (e.g., the onboard LED elements) to acquire UV-SWIR imagery.

In some implementations, the multispectral imaging system may include one or more irradiation sources (e.g., LED elements) to illuminate the agricultural environment with radiation at different wavelengths. In this manner, the imagers/sensors may acquire imagery corresponding to the radiation at each respective wavelength, which may then be overlaid to form a multispectral image. In some implementations, the multispectral imaging system may instead use LED light sources integrated into the lighting fixture to illuminate the environment at one or more wavelengths. The multispectral imaging system may also include one or more filters (e.g., a filter wheel) to selectively acquire imagery/spectra data at a particular wavelength if the illuminator (e.g., the LED light sources, the onboard LED elements) illuminate the environment with radiation at multiple wavelengths.

In one exemplary method, the multispectral imaging system may acquire imagery/spectra of the agricultural environment using the following steps: (1) turning on a first LED element in the multispectral imaging system to irradiate the agricultural environment with radiation at a first wavelength, (2) acquiring imagery/spectra of the environment using the imagers/sensors in the multispectral imaging system, and (3) turning off the first LED element. This method may be repeated for additional LED elements in the multispectral imaging system using, for example, the following steps: (4) turning on a second LED element in the multispectral imaging system to irradiate the agricultural environment with radiation at a second wavelength, (5) acquiring imagery/spectra of the environment using the imagers/sensors in the multispectral imaging system, and (6) turning off the second LED element.

In some implementations, the multispectral imaging system may acquire imagery/spectra of the environment while no other illumination sources are active. For example, the lighting fixture may include LED light sources that provide photosynthetically active radiation (PAR). The LED light sources may be turned off when the multispectral imaging system acquires imagery/spectra of the environment. Said in another way, the multispectral imaging system may be configured to irradiate a dark environment with a series of flashes (e.g., brief pulses of radiation) to acquire imagery/spectra at several wavelengths.

The multispectral imaging system may also include supplementary LED elements. In some implementations, the supplementary LED elements may be used to modify the plants and/or their surroundings. For example, one or more of the supplementary LED elements may emit UV radiation with sufficient brightness (and/or intensity) to repel pests or to reduce the growth of mildew (e.g., using 275 nm wavelength radiation). In another example, one or more of the supplementary LED elements may alter the morphology and/or the photoperiod of the plants (e.g., using 730 nm wavelength radiation). It should be appreciated that the light treatment functionality provided by the supplementary LED elements may also be provided by the LED light sources that illuminate the plants with PAR.

In some implementations, the multispectral imaging system may be paired with another irradiator that provides radiation to the environment. The irradiator may provide radiation that covers the UV, visible, near infrared (NIR), and/or SWIR regimes. In some implementations, the lighting fixture may be paired with another imager/sensor. The imager/sensor may be configured to acquire imagery/spectra covering the UV, visible, NIR, SWIR, and/or LWIR regimes. In general, the imager/sensor may acquire 2D imagery and/or 3D imagery (e.g., Lidar, a pan-tilt-zoom (PTZ) camera) of the environment. The imager/sensor may also have a field of view that ranges between a portion of the environment that includes one or more plants to an entire room of the environment. Note the environment may contain multiple rooms.

In some implementations, the multispectral imaging system may be calibrated using various calibration sources disposed in the environment. In one example, a phantom may be used to calibrate imagery/spectra acquired between the UV and SWIR regimes. The phantom may be an object with known optical properties (e.g., emissivity, absorptivity, reflectivity) with various shapes (e.g., a sphere, a polyhedron, a plant, an animal). One or more phantoms may be placed within the field of view of the imager/sensors to calibrate the magnitude and wavelength of radiation detected by the imager/sensors. In another example, a blackbody reference may be used to calibrate thermal imagery/spectra acquired in the LWIR regime. The blackbody reference may be an object that includes a heater and a temperature sensor. The blackbody reference may be used to calibrate the temperature value in a heatmap acquire by a LWIR imager/sensor.

In various implementations, the imaging system disclosed herein may include one or more communication and/or auxiliary power ports, for example, to provide auxiliary DC power to one or more auxiliary devices coupled to the port(s). Example of such ports include, but are not limited to, one or more Power over Ethernet (PoE) ports and/or one or more Universal Serial Bus (USB) ports to communicatively couple multiple lighting fixtures together and/or support operation of one or more auxiliary devices (e.g., sensors, actuators, or other external electronic devices). Examples of various sensors that may be coupled to one or more imaging systems via one or more of the PoE or USB ports include, but is not limited to, air temperature sensors, near-infrared (NIR) leaf moisture sensors, hyperspectral cameras, finite spectral cameras, IR leaf temperature sensors, relative humidity sensors, and carbon dioxide sensors. Other examples of auxiliary devices that may be coupled to one or more imaging systems via PoE or USB ports include, but are not limited to, one or more fans, security cameras, smart phones, and multi-spectral cameras (e.g., to analyze soil moisture, nutrient content, leaves of the plants). In this manner, various auxiliary devices may be particularly distributed in the controlled agricultural environment due to the flexible placement of communication ports on the imaging system.

In some implementations, the processor of the imaging system may be used to control one or more auxiliary devices and/or process data from the auxiliary devices. The processor may then utilize the data to adjust and control operation of one or more lighting fixtures (e.g., adjusting the PAR output from the lighting fixture) one or more coolant circuits (e.g., adjusting the fluid flow through the coolant circuit including the lighting loop, hydronics loop, and cooling loops), one or more fans, one or more dehumidifiers, or one or more air conditioners in the controlled agricultural environment. In some implementations, various environmental conditions are measured and controlled to provide target vapor pressure deficits in the environment.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 14 is a vector of values used as a feature set, according to some implementations of the disclosure.

FIG. 15 shows a reference condition library, according to some implementations of the disclosure.

FIG. 18 is a vector of values used as a feature set, according to some implementations of the disclosure.

FIG. 29 is a vector of values used as a feature set, according to some implementations of the disclosure.

FIG. 30 shows a reference condition library, according to some implementations of the disclosure.

FIG. 32A shows a top view of the multisensory imaging system of FIG. 31.

FIG. 32B shows a side view of the multisensory imaging system of FIG. 31.

FIG. 33 is a vector of values used as a feature set, according to some implementations of the disclosure.

DETAILED DESCRIPTION

Figure 1:
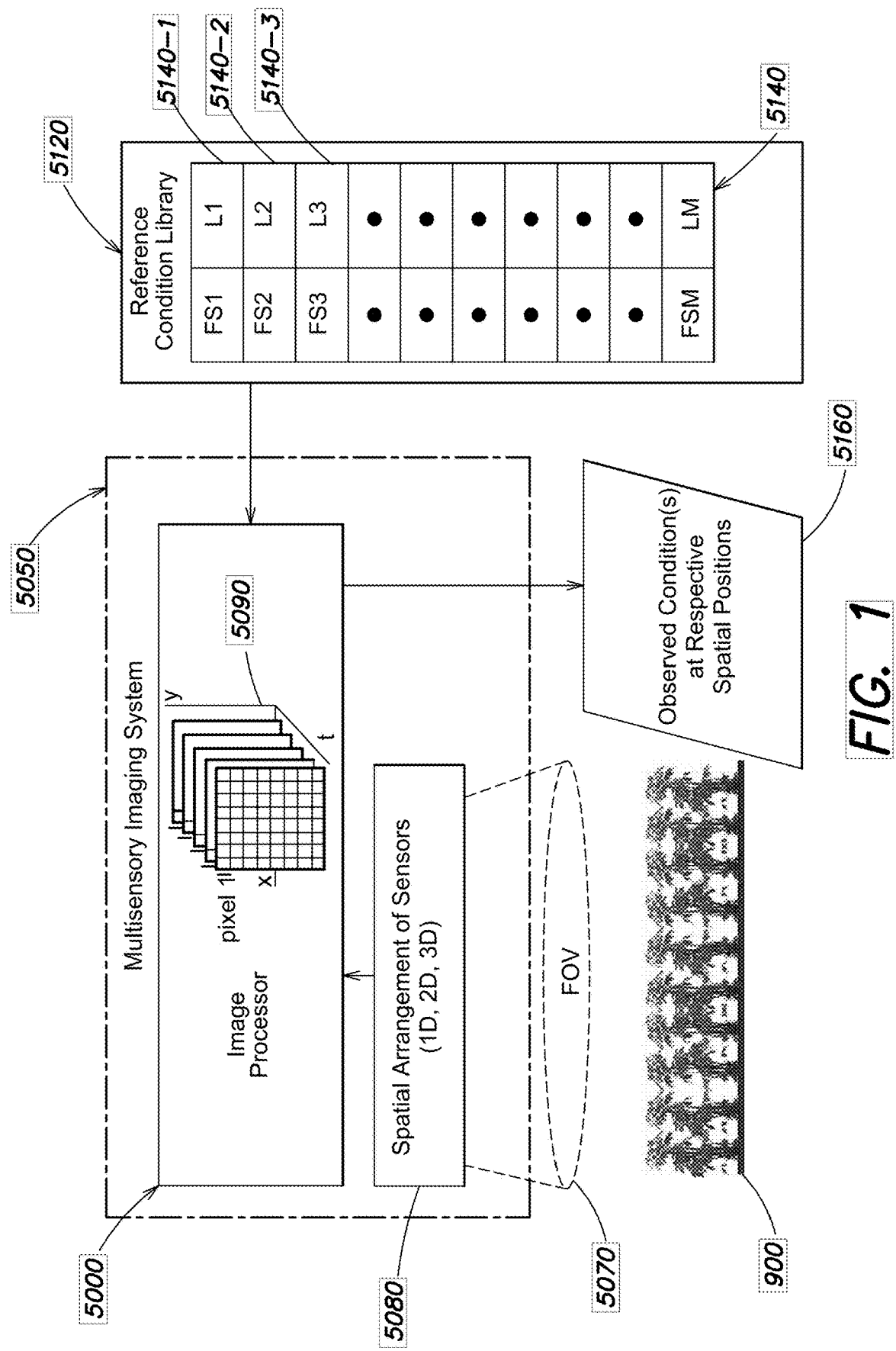
FIG. 1 illustrates a multisensory imaging system according to one inventive implementation.

Following below are a glossary of terms and more detailed descriptions of various concepts related to, and implementations of, methods, apparatus, and systems for multisensory imaging for controlled environment horticulture. It should be appreciated that various concepts introduced above and discussed in greater detail below may be implemented in numerous ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of multisensory imaging systems, methods of acquiring, processing, and quantifying multisensory imagery, and inventive lighting systems integrated with multisensory imaging systems are provided, wherein a given example showcases one or more particular features in a given context. It should be appreciated that one or more features discussed in connection with a given example of a multisensory imaging system may be employed in other examples according to the present disclosure, such that the various features disclosed herein may be readily combined in a given system according to the present disclosure (provided that respective features are not mutually inconsistent).

Glossary

Albedo: The term "albedo" refers to the ratio of radiosity from an object to the irradiance (flux per unit area) of an object. Thus, it is a measure of reflection of radiation out of the total radiation impinging on an object, measured on a scale from 0 (corresponding to a black body that absorbs all incident radiation) to 1 (corresponding to a body that reflects all incident radiation). The albedo of an object at a certain wavelength band or spectral region may be measured. For example, UV albedo refers to UV radiation reflected from an object out of the total UV radiation impinging on the object. As another example, narrowband albedo refers to narrowband radiation reflected from an object out of the total narrowband radiation impinging on the object.

Controlled Environment Horticulture: Controlled Environment Horticulture (CEH) (also referred to as controlled environment agriculture or CEA) is the process of growing plants in a controlled environment where various environmental parameters, such as lighting, temperature, humidity, nutrient levels, and carbon dioxide ($CO_2$) concentrations are monitored and adjusted to improve the quality and yield of the plants. Compared to conventional approaches of plant cultivation, CEH may enable year-round production of plants, insensitivity to variable weather conditions, reduce pests and diseases, and reduce the number of resources consumed on a per plant basis. Additionally, CEH may support various types of growing systems including, but not limited to soil-based systems and hydroponics systems.

A controlled agricultural environment is typically enclosed, at least in part, by a building structure such as a greenhouse, a grow room, or a covered portion of a field in order to provide some degree of control over environmental conditions. One or more artificial lighting systems are often used in such controlled agricultural environments to supplement and/or replace natural sunlight that may be obstructed by the building structure or insufficient during certain periods of the year (e.g., winter months). The use of an artificial lighting system may also provide yet another measure of control where the intensity and spectral characteristics of the lighting system may be tailored to improve the photosynthetic rates of plants. Various types of artificial lighting systems may be used including, but not limited to, a high intensity discharge lamp, a light emitting diode (LED), and a fluorescent lamp.

Emissivity: "emissivity" is a measure of an object's ability to emit infrared energy. Emitted energy indicates the temperature of the object. Emissivity can have a value from 0 (shiny mirror) to 1 (blackbody).

Feature/Labeled Feature Set: a "feature" is a structured mathematical representation of a discrete measured value that is suitable for input into a machine learning system. Features determine what information a machine learning algorithm has access to regarding the measurement. A plurality of different discrete measurements may be used to develop a "labeled feature set" for a reference condition.

Field of View: a "field of view" refers to an area or footprint of inspection in which a measurement of some measurable property may be captured by one or more sensors/cameras.

Hyperspectral Imaging: "hyperspectral imaging" is an imaging technique that collects and processes a wide spectrum of radiation (either continuous or many discrete measurements) for each pixel in the plurality of pixels in the resulting image. Unlike multispectral imaging, which measures finite, non-continuous narrowbands, hyperspectral imaging measures continuous ranges of wavelengths over a wide spectrum.

Illuminator: an "illuminator" is a radiation source, such as an LED, that is not primarily used to provide radiation for sensing, in contrast to an irradiator. An illuminator may, for example, provide ambient lighting in an enclosed structure, or provide photosynthetically active radiation (PAR) in a CEH system.

Irradiator: an "irradiator" is a radiation source, such as an LED, that primarily provides light for sensing. For example, a series of narrowband irradiators may be used to irradiate an object to collect multispectral images of the object.

Multisensory Imaging: "multisensory imaging" is an imaging technique that collects and processes a plurality of imagery and sensory data to create a multisensory image, where each pixel in the plurality of pixels in the resulting image contains finite narrowband spectral data as well as sensory data. Each pixel in the resulting image may be close or far apart in any dimension.

Multispectral Imaging: "multispectral imaging" is an imaging technique that collects and processes a plurality of finite, non-continuous narrowband images, where each pixel in the plurality of pixels in the resulting image contains finite narrowband spectral data.

Narrowband/Narrowband Image: a "narrowband" is a narrow wavelength band of radiation with a bandwidth of about 2 nm and 40 nm. A narrowband image is an image captured using one or more narrowbands.

Normalize/Normalization: The terms "normalize", or "normalization" refer to a process of modifying one or more disparate pieces of data relating to a same or similar thing, such that all of the pieces of data relating to the same or similar thing are homogenized in some manner (e.g., according to a predetermined standard or format).

Pixel: a "pixel" is the smallest element of an image that can be individually processed in an image. An image includes at least one pixel. Generally, each pixel in an image represents a radiation value at a spatial position in the field of view. Each pixel in an image may be close (neighboring) or far apart (with unmeasured space in between) in any dimension.

Radiation Value: a "radiation value" represents an amount of sensed radiation at a particular wavelength or spectral band. Each pixel in an image may be digitally represented by a radiation value. For example, a radiation value may be an amplitude of radiation at a particular narrowband reflected from an object within a camera's field of view. As another example, a radiation value may be an amplitude of fluorescence from an object within a camera's field of view.

Reference Condition/Reference Condition Library: a "reference condition" is a known condition for which a labeled feature set exists in a reference condition library. Examples of reference conditions for crops may include particular types of nutrient deficiency, insect infestation, fungal infection, or water stress. Other examples of reference conditions for crops may include stage of development, prospective crop yield, appearance, nutritional composition, structural integrity, flowering, and pollination. Reference conditions are not limited to crops and may describe known conditions of other objects in different environments. A reference condition library includes more than one labeled feature sets for various reference conditions. A machine learning algorithm may be used to compare experimental results to the reference condition library to determine if one or more reference conditions are present.

Overview of Multisensory Imaging Systems and Methods

FIG. 1 illustrates a block diagram of a multisensory imaging system 5050 according to one inventive implementation. As shown in FIG. 1, the multisensory imaging system 5050 includes a spatial arrangement of sensors 5080 having a collective field of view 5070 (FOV). For purposes of the present discussion, a "field of view" refers to an area or volume of inspection in which one or more conditions or properties may be sensed (e.g., acquired or captured by one or more sensors) to provide a representative value for each sensed condition/property. Thus, within the field of view 5070, multiple measurable conditions may be sensed by respective sensors of the spatial arrangement of sensors 5080.

In the depiction of FIG. 1, the field of view 5070 of the spatial arrangement of sensors 5080 includes one or more plants 900. As noted above and discussed further below, the plants 900 may be within a building structure (e.g., a greenhouse, an enclosed grow room or container, a cover for at least a portion of a field) that provides a controlled horticultural environment. Alternatively, the field of view 5070 of the spatial arrangement of sensors may include one or more plants or other vegetation in an open grow space or field (e.g., exposed to natural ambient light), or other object(s) of interest for which various conditions may be measured. In view of the foregoing, it should be appreciated the multisensory imaging system 5050 not only has utility and advantages in the context of CEH, but more generally may be employed to generate and process images of a wide variety of objects/environments of interest based on one or more measurable conditions, according to the concepts disclosed herein.

As discussed in greater detail below in connection with different implementation examples, the spatial arrangement of sensors 5080 may comprise a one-dimensional (1D), two-dimensional (2D), or three-dimensional (3D) array of sensor nodes. In one aspect, a given sensor node may be considered to be a picture element or "pixel" of an image of the field of view 5070, e.g., an element that is indexed (or "addressable") in the 1D, 2D, or 3D array of sensor nodes. With the foregoing in mind, it should be appreciated that, generally speaking, the spatial arrangement of sensors thus may include a number of discrete sensors (or integrated sensor assemblies) positioned at respective indexed/addressable positions (pixels) in a 1D, 2D, or 3D spatial arrangement. Some examples of a 2D spatial arrangement of sensors that may constitute the spatial arrangement of sensors 5080 include a CCD, CMOS or microbolometer sensor array (the "imaging chip") of a digital camera, as discussed in greater detail below.

With reference again to FIG. 1, at a given sensor node (or pixel) of a 1D, 2D or 3D array constituting the spatial arrangement of sensors 5080, one or more sensors may be positioned so as to measure at least two different measurable conditions at the given sensor node. Thus, each measurable condition that is sensed at a given sensor node can be represented as a pixel value of a pixel in an image of the field of view 5070. Accordingly, since at least two different measurable conditions may be sensed at a given sensor node, a given pixel of an image of the field of view 5070 may have at least two pixel values respectively representing the at least two different measurable conditions.

As shown in FIG. 1, the multisensory imaging system 5050 also comprises an image processor (5000), coupled to the spatial arrangement of sensors 5080, to process sensed conditions at respective sensor nodes (e.g., represented by one or more pixel values at respective pixels of one or more images of the field of view 5070). In one example implementation, the image processor 5000 is configured to process sensed conditions and generate multiple "mono-sensory" images 5090 respectively corresponding to the two or more different sensed conditions in the field of view 5070.

More specifically, as readily observed in FIG. 1, each mono-sensory image of the multiple mono-sensory images 5090 is depicted as a 2D array of pixels arranged along an x-axis and a y-axis and representing a different condition of the two or more sensed conditions in the field of view 5070. Thus, each pixel in a given mono-sensory image is digitally indexed (or "addressed") by pixel coordinates representing a spatial position in the field of view where a particular condition was sensed. Each pixel of the mono-sensory image also has a pixel value (a "measurement value") representing the sensed condition at that spatial position.

In the example of FIG. 1, the image processor 5000 is configured to process the plurality of mono-sensory images 5090, based at least in part on respective pixel values in the plurality of images 5090 and a reference condition library 5120, to estimate or determine (e.g., with significant confidence or sufficient probability) one or more environmental conditions of interest 5160 observed at respective spatial positions in the field of view 5070. The estimated or determined environmental condition(s) of interest 5160 may relate to one or more states or conditions of one or more objects at a given spatial position (e.g., multiple plants, a single plant, or a particular part of a plant), identification of substances or compounds present in one or more objects at a given spatial position, and/or one or more ambient conditions at a given spatial position (e.g., ambient conditions proximate to one or more plants or other objects in field of view).

To this end, in one implementation the image processor 5000 processes the plurality of mono-sensory images 5090 to generate a multisensory image, wherein respective pixels of the multisensory image may have multiple pixel values (measurement values) respectively representing the two or more measurable conditions that were sensed at a given spatial position. For example, considering for the moment a 2D array of sensor nodes and corresponding 2D array of pixels in an image of the field of view 5070, the notation below represents a first pixel $P_1$ $(x_1, y_1)$, in which a first measurable condition $C_1$ that may be sensed in the field of view has a first measurement value $M_1$ at the first pixel $P_1$, and in which a second measurable condition $C_2$ that may be sensed in the field of view has a measurement value $M_2$ at the first pixel $P_1$:

$P1(x1,y1)=[M1,M2]$.

With the foregoing in mind, the reference condition library 5120 may include multiple labeled feature sets 5140 (a "collection" of labeled feature sets) respectively corresponding to various reference conditions of prospective interest in the field of view 5070 (some of which reference conditions may relate to an object or objects and others of which reference conditions may relate to states of the ambient) which depend, at least in part, on the two or more measurable conditions at respective spatial positions in the field of view. For example, the reference condition library 5120 may include a first labeled feature set 5140-1 representing a first reference condition and including a first feature set $FS_1$ having a first label $L_1$. Similarly, the reference condition library 5120 may include a second labeled feature set 5140-2 representing a second reference condition and including a second feature set $FS_2$ having a second label $L_2$, and may further include a third labeled feature set 5140-3 representing a third reference condition and including a third feature set $FS_3$ having a third label $L_3$, and so on (in FIG. 1, the reference condition library 5120 is shown as containing a collection 5140 of M labeled feature sets, where M is virtually any number of prospectively useful reference conditions of interest).

Each feature set $FS_1$, $FS_2$, $FS_3$ ... $FS_M$ in the collection 5140 of labeled feature sets represents a set of "features," in which at least some respective features in the set correspond to respective measurable conditions that may be sensed by the spatial arrangement of sensors 5080. For each such feature, the feature set includes a reference value corresponding to one measurable condition of the respective measurable conditions. Thus, if as discussed above, a first measurable condition $C_1$ may be sensed at a given spatial position in the field of view 5070 and a second measurable condition $C_2$ also may be sensed at the given spatial position in the field of view 5070, respective feature sets $FS_1$, $FS_2$, $FS_3$ ... $FS_M$ in the collection 5140 of labeled feature sets include particular (and unique) combinations of reference values for the features $C_1$ and $C_2$ that, as a feature set, together represent the reference condition serving as the label for the feature set. Table 1 below provides some illustrative examples of a collection 5140 of labeled feature sets based at least in part on the measurable conditions $C_1$ and $C_2$, and corresponding example labels for reference conditions of prospective interest:

| | |
|---|---|
| $FS_1 = [C1_{,1}; C2_{,1}]$ | $L_1$ = nitrogen deficiency |
| $FS_2 = [C1_{,2}; C2_{,2}]$ | $L_2$ = aphid infestation |
| $FS_3 = [C1_{,3}; C2_{,3}]$ | $L_3$ = bud break |
| . | . |
| . | . |
| . | . |
| $FS_M = [C1_{,M}; C2_{,M}]$ | $L_M$ = leaf curl |

In one implementation, the image processor 5000 employs a variety of image processing and machine learning (ML) techniques to process a multisensory image to estimate or determine one or more environmental conditions of interest 5160 observed at respective spatial positions in the field of view 5070, based on the collection 5140 of labeled feature sets in the reference condition library 5120. In some implementations, various models are trained and utilized by the image processor 5000 to process multisensory images and "find" in those images one or more conditions that match, with a certain level of confidence, one or more corresponding reference conditions represented by the collection 5140 of labeled feature sets in the reference condition library 5120.

As would be appreciated by those of skill in the relevant arts, Machine learning (ML) is a branch of artificial intelligence based on the idea that systems (e.g., intelligent agents, like the image processor 5000) can learn from data, identify patterns, and make decisions with minimal human intervention. Thus, ML relates to algorithms and statistical models that intelligent agents (e.g., the image processor 5000) use to progressively improve their performance on a specific task. In more formal terms, an intelligent agent based on an ML model learns from experience E with respect to some class of tasks T and performance measure P if its performance at tasks in T, as measured by P, improves with experience E. Deep learning is a subset of AI using layered structures of algorithms called an artificial neural network (ANN).

Machine learning tasks conventionally are classified into multiple categories. In "supervised learning," an ML algorithm builds a mathematical model of a set of "training data" that contains both the inputs and the desired outputs from performing a certain task. For example, if the task were determining whether an image contained a certain object having a condition that corresponded to a reference condition of interest, the training data for a supervised learning algorithm may include a first image or images of the object having the particular condition of interest and a second image or images of the object not having the condition of interest (the input), and each image would have a label (the output) designating whether or not the object had the condition of interest. "Semi-supervised learning" algorithms develop mathematical models from incomplete training data, where a portion of the sample inputs are missing the desired output. "Classification" algorithms and "regression" algorithms are types of supervised learning. Classification algorithms are used when the outputs are restricted to a limited set of values (e.g., represented by the Boolean values one and zero), whereas regression algorithms have continuous outputs (e.g., any value within a range of values).

In "unsupervised learning," an ML algorithm builds a mathematical model of a set of data which contains only inputs and no desired outputs. Unsupervised learning algorithms are used to find structure in the data, like grouping or clustering of data points. Unsupervised learning can discover patterns in the data, and can group the inputs into categories, as in "feature learning." "Dimensionality reduction" is the process of reducing the number of "features" (e.g., inputs) in a set of data. "Active learning" algorithms access the desired outputs (training labels) for a limited set of inputs based on a budget and optimize the choice of inputs for which it will acquire training labels. When used interactively, these inputs can be presented to a human user for labeling ("annotation").

Examples of various ML models known in the relevant arts include, but are not limited to, Linear Regression, Logistic Regression, Decision Tree, Support Vector Machine, Naive Bayes, kNN, K-Means, Random Forest, Convolution Neural Network, Multilayer Perceptron, and Recurrent Neural Network.

Accordingly, it may be appreciated from the foregoing that a multisensory imaging system may be implemented for a variety of applications and, in particular, CEH. As discussed in different examples below, a multisensory imaging system according to the concepts disclosed herein may be implemented to cover various sizes (and shapes) of fields of view 5070, and differing degrees of resolution for a spatial arrangement of sensors—in these respects, it should be appreciated that the general concepts underlying multisensory imaging systems disclosed herein are agnostic to the size/scale of field of view and resolution of images and, as such, may be implemented so as to cover different sizes/scales of fields of view with various resolution. With respect to CEH, multi sensory imaging systems according to the present disclosure may be employed to observe groups of crops, individual plants, or parts of plants, over various periods of time, to provide a wealth of information about the evolution of crops and their growing environment.

An Exemplary Multispectral Imaging System

In one example implementation, a multisensory imaging system according to the present disclosure is implemented more specifically as a multispectral imaging system that provides finite spectra sensing. In this manner, the imaging system may detect the presence and/or quantify reference conditions. These reference conditions may have a time-dependence and/or a spatial distribution within an environment. In another implementation, the imaging system may be integrated with a CEH system. In this manner, the multisensory imaging system may detect the presence and/or quantify certain reference conditions present in the CEH system.

The imaging system may be used to characterize reference conditions of objects within an environment. These reference conditions may, for example, be related to the growth and/or health of plants in an environment as a function of time. This may be accomplished, in part, by using the imaging system by itself or in conjunction with one or more light sources and/or illuminators to irradiate plants and/or other subjects of interest with different wavelengths of radiation and measure the spectral optical properties of the plants and/or other subjects of interest in their surroundings over time, in response to irradiation at different wavelengths. The foregoing process may be referred to as "kinetic finite absorbance and reflectance spectroscopy," in which different finite narrowband spectral images and/or other information are collected for plants and/or other subjects of interest in response to irradiation at particular wavelengths, as a function of time, and then the acquired images/collected information are analyzed to determine reference conditions in the plants and/or other subjects of interest.

Figure 2:
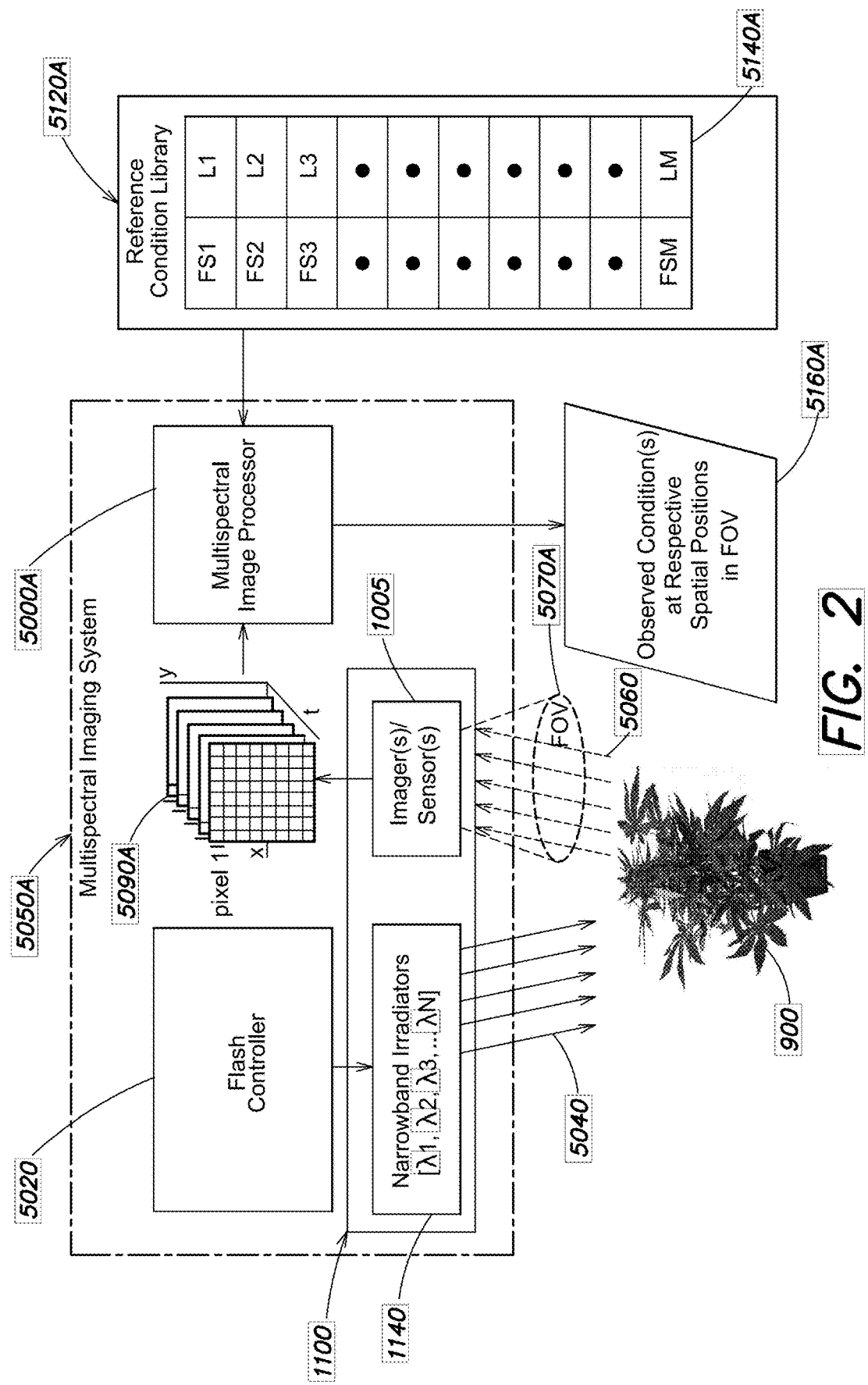
FIG. 2 illustrates a multispectral imaging system according to one inventive implementation.

FIG. 2 shows an exemplary implementation of a multispectral imaging system 5050A that can acquire imagery 5090A and/or sensory data at various wavelengths of interest. The system may generally include at least one flash controller 5020, at least one narrowband irradiator 1140 to emit narrowband radiation 5040, at least one imager/sensor 1005 to acquire imagery 5090A and/or collect measurements, at least one image processor 5000A to process the acquired imagery 5090A and/or collected measurements to determine the presence of an observable condition 5160A using a reference condition library 5120A. The narrowband irradiators 1140 and imager(s)/sensor(s) 1005 may be integrated into an imaging engine module 1100.

The flash controller 5020 (e.g., a microprocessor) may regulate the narrowband irradiators 1140 The flash controller 5020 may be configured so that each narrowband irradiator in the imaging system 5050A can be individually controlled. The flash controller 5020 may also be configured so that each narrowband irradiator can be activated for a brief period. In this manner, the flash controller 5020 may provide a means to sequentially flash or pulse each narrowband irradiator in the plurality of narrowband irradiators 1140.

The flash controller 5020 may be programmed to automatically activate one or more narrowband irradiators 1140 at set time intervals, or at certain times of day, for a set period of time. The flash controller 5020 may also be configured to receive communications from a remote device (e.g., a computer, a server, a tablet, or a smartphone) to determine narrowband irradiator control.

The flash controller 5020 or the image processor 5000A (e.g., a Raspberry Pi processor) may include one or more WiFi antennas and accompanying electric circuits (e.g., chipsets, processors) to facilitate wireless communication with the narrowband irradiators 1140 and other devices. In some implementations, the flash controller 5020 or the image processor 5000A may include a transmitter and/or a receiver to communicate with one or more lighting fixtures, environmental condition controllers, or remote devices (e.g., a computer, a server, a tablet, a smartphone, or lighting fixture controllers). In this manner, the flash controller 5020 or the image processor 5000A may control and/or coordinate with the lighting fixtures or other environmental condition controllers so that the imaging system 5050A can acquire images and/or collect information in a particular environmental setting. For example, the flash controller 5020 or the image processor 5000A may be configured to activate narrowband irradiators 1140 under dark conditions with the lighting fixtures turned off momentarily while measurements/images are acquired by the imaging system 5050A. As another example, the flash controller 5020 or the image processor 5000A may be configured to stop HVAC or fan operation during image acquisition so that objects are as still as possible.

In another example, the flash controller 5020 or the image processor 5000A may include a receiver to receive a signal from a remote device, which may include a command to adjust the operation of the narrowband irradiators 1140. Commands may include, but are not limited to, adjusting the time interval between images acquired and/or information sensed, the length of time of irradiation, the intensity of irradiation, the order of irradiation if more than one narrowband irradiator is to be flashed, and/or determining which irradiators are activated for a particular measurement/acquisition.

The flash controller 5020 may supply power to the irradiator. The flash controller 5020 may receive electrical power directly from an electrical power grid, or indirectly from another device. For example, the flash controller 5020 may receive electrical power from one or more lighting fixtures, or via a portable energy storage device, such as a rechargeable battery.

The flash controller 5020 may also regulate the one or more imagers/sensors 1005 so that the imagers/sensors acquire imagery and/or collect measurements at times relevant to irradiation. As an example, the flash controller 5020 may simultaneously activate a narrowband irradiator and an imager so that imagery is acquired while the narrowband irradiator is activated. In another example, the flash controller 5020 may activate the narrowband irradiator and the imager at different times. The imager may acquire imagery after the narrowband irradiator has been activated. In another implementation, the imagers/sensors 1005 may be controlled by another controller. In this case, the other controller may be coupled to the flash controller 5020 to coordinate the activation times of the irradiators 1140 and the imagers/sensors 1005.

The narrowband irradiators 1140, controlled by the flash controller 5020, provide radiation at wavelengths within a spectral range including UV, visible, NIR, SWIR, and LWIR regimes. Each narrowband irradiator may provide relatively narrowband radiation. For example, the spectral bandwidth may be about 2 nm to about 40 nm. In another implementation, each narrowband irradiator may provide substantially monochromatic radiation. The narrowband irradiators 1140 may be configured to turn on or off quickly and/or to respond quickly to signals from the flash controller 5020, so that each narrowband irradiator may provide a brief flash or pulse of radiation. Each brief flash may be up to 10 seconds in length.

In some implementations, the narrowband irradiators 1140 may be an array of LEDs elements. The spectral range of the LED array may include approximately 275 nm to approximately 2060 nm. In this manner, respective wavelengths of essentially monochromatic LED elements may include, but are not limited to, 275 nm, 365 nm, 440 nm, 450 nm, 475 nm, 500 nm, 530 nm, 620 nm, 630 nm, 660 nm, 696 nm, 730 nm, 760 nm, 850 nm, 860 nm, 940 nm, 950 nm, 1450 nm, 1610 nm, and 2060 nm. More than one LED element of a particular wavelength may be position around the imager/sensor 1005 to provide more uniform irradiation. For example, LED elements of a particular wavelength may be positioned on opposing sides of the imager/sensor 1005.

The irradiation profile for different narrowband irradiators may be substantially uniform. In some implementations, an optical element, such as a diffuser, or lens may be used to change the irradiation profile. In some implementations, each narrowband irradiator may provide radiation to substantially the same area. In this manner, the narrowband irradiators 1140 irradiating area may overlap with at least part of the overall field of view of the imagers/sensors 1005.

The narrowband irradiators 1140 may provide radiation to image and/or acquire information from one or more plants 900 or plant zones. In some implementations, it may be preferable for the narrowband irradiators 1140 to emit radiation with a sufficient intensity to acquire images/information at a desired quality (e.g., the signal-to-noise ratio of the image/information is above a pre-defined threshold) without causing chemical and/or morphological changes to the plant(s) (e.g., photomorphogenesis). In this manner, the various images/information acquired by the imager(s)/sensor(s) 1005 are representative of the plant(s) in their non-illuminated state. For example, LED irradiators 1140 may have a wattage rating less than about 6 Watts (the wattage rating may be correlated to the radiation output from the LED irradiators).

In some implementations, the narrowband irradiators 1140 may activate as a flash or brief pulse with a sufficient length to acquire images/information at a desired quality. This may be preferable in cases where it is desirable to reduce the time to acquire multiple images (e.g., ensuring the images are acquired at the same conditions). Short flashes may also prevent unwanted photochemical modifications to the plant, which may alter its optical properties.

The imaging system 5050A may generally include one or more imagers and/or one or more sensors 1005 to acquire imagery, video and/or spectra, respectively, of an object and/or an environment. In some implementations, the imagers/sensors 1005 may acquire imagery and/or sensory data from an object and/or an environment within a field of view 5070A of the imagers/sensors. In general, the imagers/sensors may acquire 2D imagery and/or 3D imagery (e.g., Lidar, a pan-tilt-zoom (PTZ) camera) of the environment. The camera/sensor may also have a field of view that ranges between a portion of the environment that includes one or more plants to an entire room of the environment. Note the environment may contain multiple rooms.

The imagers/sensors may acquire imagery and/or sensory data in response to irradiation of a plant zone 900 in a CEH system by the narrowband irradiators 1140. In some implementations, the imagers/sensors 1005 may acquire imagery and/or sensory data while one or more narrowband irradiators is activated. In some implementations, the imagers/sensors 1005 may acquire imagery and/or collect information immediately following irradiation by one or more narrowband irradiators 1140. In some implementations, the imagers/sensors 1005 may acquire imagery and/or sensory data from an object and/or an environment within a field of view 5070A without irradiation of the object and/or environment by the narrowband irradiators 1140.

The imager(s)/sensor(s) 1005 may generally acquire imagery/spectra at wavelengths in the UV, visible, NIR, SWIR, and LWIR regimes. For example, the imagers/sensors 1005 may include cameras that acquire imagery in various spectral bands including, but not limited to the ultraviolet band (e.g., wavelengths between 10 nm and 400 nm), the visible band (e.g., wavelengths between 400 nm and 700 nm), the near infrared (NIR) band (e.g., wavelengths between 700 nm and 1.4 µm), the mid infrared (MIR) band (e.g., wavelengths between 1.4 µm and 8 µm), and the far infrared (FIR) band (e.g., wavelengths greater than 8 µm). The imagers/sensors may preferably acquire imagery/spectra at wavelengths between approximately 275 nm to approximately 2060 nm and between approximately 8 µm to approximately 14 µm. In some implementations, the imaging system 5050A may include a first camera to acquire imagery from the UV to short wavelength infrared (SWIR) regimes and a second camera to acquire thermal imagery using the long wavelength infrared (LWIR) regime. In some implementations, the second camera may continually acquire LWIR thermal imagery while the first camera is periodically activated in combination with the narrowband irradiators 1140 to acquire UV-SWIR imagery.

The imaging system may acquire imagery/spectra under various lighting conditions. As described above, imagery may also be acquired while other radiation sources in the environment are deactivated. For example, light sources in a lighting fixture may be turned off while acquiring imagery/spectra with the imaging system. In some implementations, imagery may be acquired while other radiation sources are active. In some implementations, a background subtraction may be applied to remove the radiation emitted by the other radiation sources. For example, imagery/spectra may be acquired with and without radiation from the LED element in the LED array of the imaging system. If the radiation does not cause substantial changes to the plant's optical properties (e.g., alters the photochemistry of the plant), the portion of light reflected by the radiation from the LED element may be extracted by taking a difference between the two images/spectra. In another example, the LED source may have a known radiation spectrum based, in part, on the number and type of LED elements used. The spectra may be calibrated according to various standards and/or guidelines in plant research (e.g., the International Committee for Controlled Environment Guidelines). If the location and orientation of the LED source-relative to the plants and the imaging system are known, the radiation from the LED source may be subtracted directly from the imagery/spectra acquired when the LED element of the LED array and the LED source are both active.

In some implementations, one or more of the imagers may be cameras with sufficiently high pixel resolution (e.g., an 8-megapixel camera, imagery is acquired at 4K resolution). The imager(s)/sensor(s) may also have a spectral resolution between about 2 nm to about 40 nm. In other implementations, imagers/sensors with different spectral resolutions may be used.

The imager(s)/sensor(s) 1005 may acquire the spectral information from an object and/or an environment within the field of view 5070A at different wavelengths by adjusting the wavelength of light irradiating plants 900. For example, the narrowband irradiators 1140 may illuminate the plants 900 with substantially monochromatic radiation 5040, the imagers/sensors 1005 may acquire images and/or spectra corresponding to reflected light 5060 reflected from the plants 900, thus the imagery/spectra 5090A acquired may correspond to the particular wavelength of the radiation. This process may be repeated sequentially with radiation with several narrowband irradiators 1140. In this manner, the imaging system 5050A may acquire a series of narrowband images, each narrowband image corresponding to a particular narrowband irradiation 5040. Here, the imagers/sensors 1005 may acquire multisensory imagery without the use of spectral filters.

The imagery and/or sensory data collected by the imaging system 5050A may include at least one pixel, where a pixel is the smallest element that can be individually processed. A narrowband image may include a plurality of pixels, where each pixel in the narrowband image represents a radiation value at a spatial position in the field of view 5070. Data collected from a point sensor may represent a single pixel.

The imaging system 5050A may include one or more image processors 5000A. The image processor 5000A may be coupled to the imagers/sensors 1005 to receive imagery and sensory data 5090A acquired by the imagers/sensors 1005. In some implementations, the image processor 5000A may process several narrowband images 5090A to produce a multispectral image. In some implementations, the image processor 5000A may process imagery and/or sensory data to observe one or more conditions 5160A at respective spatial positions in the field of view 5070A. A reference condition library 5120A and/or an algorithm may be used to observe conditions 5160A in the imagery and/or sensory data. Image processing may extract morphological data from the acquired imagery and/or sensory data and integrate it for a wide range of applications. These concepts are described in greater detail below.

In some implementations, the camera(s)/sensor(s) 1005 may be configured to acquire sensory data proximate to the portion of the plants and/or other subjects of interest in the environment in the CEH system irradiated by the narrowband irradiators 1140. In some example implementations employing multiple imagers/sensors 1005, the multiple imagers/sensors 1005 may be co-located (e.g., in sufficient proximity to one another) such that the respective fields of view (FOV) of the cameras and/or sensors are substantially overlapping or substantially the same. In this manner, different types of sensory data may correspond to the same region of the environment, thus enabling a more comprehensive analysis of the environment. In some implementations, the portion of the plants and/or other subjects of interest irradiated by the narrowband irradiators 1140 may be further subdivided into subregions that are each characterized by corresponding sets of cameras/sensors 1005 disposed on/integrated with the imaging engine 1100.

The imaging system 5050A may be designed to be operated remotely or automatically. Narrowband irradiator elements 1142 of the same wavelength may switch on at the same time automatically at certain preprogrammed time intervals. Alternatively, narrowband irradiator elements 1142 of the same wavelength may be activated remotely. The flash controller 5020, either alone or in communication with a remote device, may control automatic and/or remote narrowband irradiator activation. An image may be acquired (and/or information may be collected) automatically using imager(s)/sensor(s) 1005 each time narrowband irradiators are activated. Supplemental illumination in the CEH may be turned off automatically when images are acquired. The imaging system may acquire an image at each available narrowband or combinations of narrowbands at each measurement interval. Alternatively, the imaging system may acquire a subset of images at only some of the available narrowbands or combinations of narrowbands at each measurement interval.

In some implementations, the LED elements 1142 respectively may be activated for a relatively short time period (i.e., turning on and off quickly) in succession (and optionally according to some pattern or order), thus exposing the plants to a brief "flash" of light when acquiring various information relating to reflected radiation using the camera(s)/sensor(s) 1005. For example, the LED elements 1142 may emit radiation for a duration of less than about 1 second. Activating the LED elements 1142 in this manner may have multiple benefits including, but not limited to (1) reducing the time delay between acquiring images/information at different wavelengths so that the multiple images/information acquired are representative of the same environmental conditions and (2) reducing the duration in which the plants and/or other imaging subjects are exposed to radiation. In some implementations, the camera(s)/sensor(s) 1005 may be synchronized with the LED elements 1142 such that the camera(s)/sensor(s) 1005 is/are triggered to acquire an image/information when the LED elements 1142 are activated. In this manner, a series of images/information may be collected by sequentially flashing the plants with radiation from different LED elements 1142 and capturing an image/information during each flash using the camera(s)/sensor(s) 1005. In yet other implementations, multiple LEDs having different spectral outputs may be activated together while one or more images and/or other information is acquired relating to radiation absorbed and/or reflected by the irradiated plants and/or other subjects.

Figure 3:
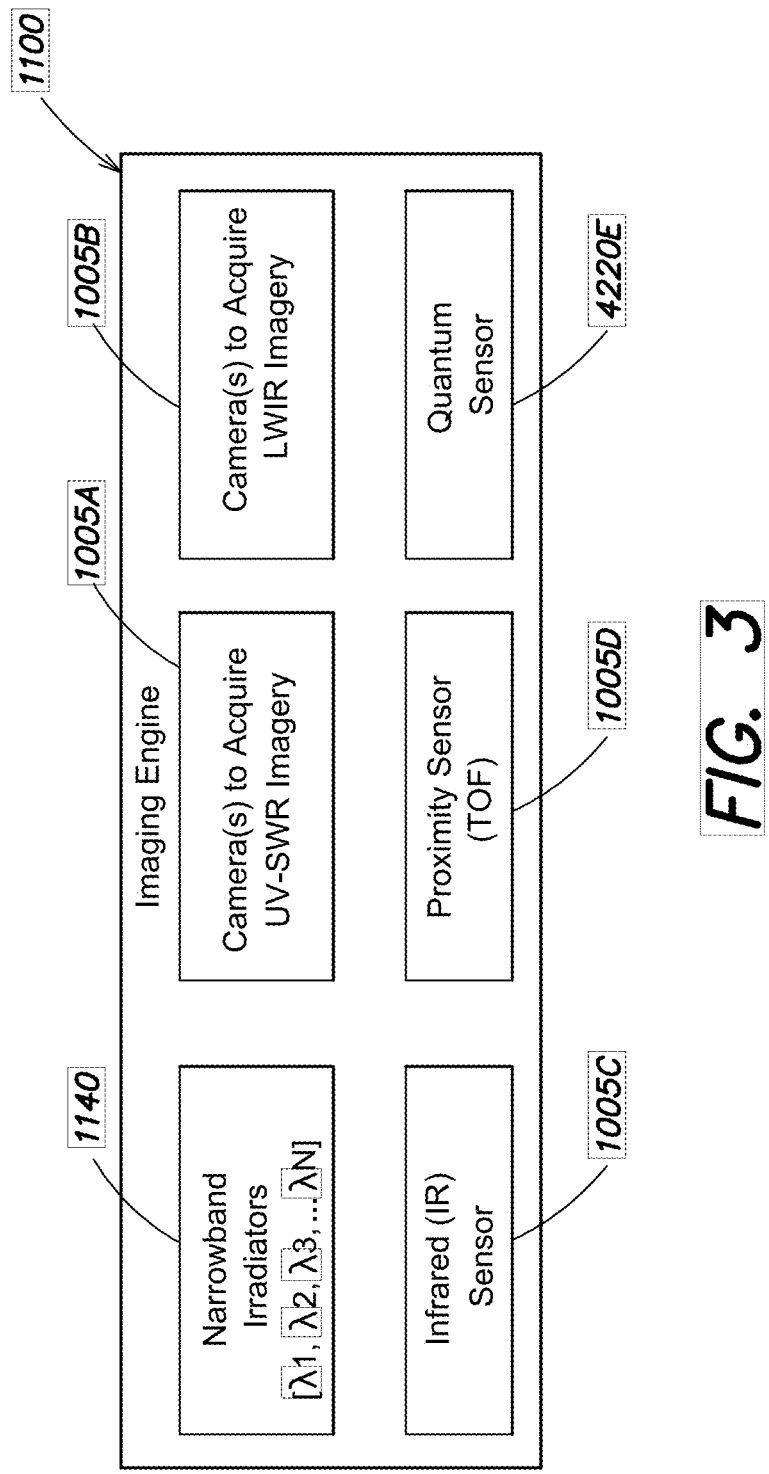
FIG. 3 is a block diagram of a multispectral imaging engine according to some implementations of the disclosure.

FIG. 3 shows a block diagram of a multispectral imaging engine 1100 according to an inventive implementation. The narrowband irradiators 1140 and imager(s)/sensor(s) 1005 may be integrated into an imaging engine module 1100. In some implementations, one or more of the components of the imaging engine 1100 are packaged together as a module for ease of assembly and/or installation. The module may also protect various components from exposure to water and/or moisture in the environment.

The imaging engine 1100 may include one or more cameras, other imaging devices (e.g., a thermal imager), or other sensors (collectively referred to with reference number 1005) disposed in or on (integrated with) the imaging engine 1100. The imager(s)/sensor(s) 1005 may be used to acquire various information about the agricultural environment including, but not limited to imagery (video imagery or still imagery, as well as thermal imagery) of the plants and/or other subjects of interest in the environment in the CEH. Examples of various types of sensors that may be included in the imager(s)/sensor(s) 1005 include, but are not limited to, one or more cameras responsive to radiation in a range of at least visible wavelengths and/or IR wavelengths, an air temperature sensor, a near infrared (NIR) leaf moisture sensor, a relative humidity sensor, a hyperspectral camera, a carbon dioxide sensor, an infrared (IR) leaf temperature sensor, an airflow sensor, and a root zone temperature sensor.

In some implementations, the imaging engine 1100 in FIG. 3 may include camera(s) to acquire UV-SWIR imagery 1005A, cameras to acquire LWIR thermal imagery 1005B, an infrared (IR) sensor 1005C, and a proximity sensor (TOF) 1005D. The imaging engine 1100 may additionally include a quantum sensor 4220E. The proximity sensor may be a laser range finder. The proximity sensor (TOF) is used to measure the distance from the imaging engine to the plants in the zone/FOV. The quantum sensor is used to measure PAR at various points within the CEH, including but not limited to at the canopy level, above the canopy and PAR light reflect at the lighting fixture level. The IR sensor is used to measure surface temperature at a point. Although FIG. 3 shows 5 imagers/sensors on an imaging engine 1100, it should be appreciated that different numbers of cameras/sensors 1005 may be included in imaging engine 1100 according to the inventive concepts described herein, and that one or more cameras/sensors may be disposed on or otherwise integrated with the multispectral imaging system 5050A at various locations and/or positions in the CEH.

One example of the camera/sensor 1005A includes, but is not limited to, the Raspberry Pi Camera Module v2. The v2 Camera Module has a Sony IMX2198-megapixel sensor and may be used to acquire high-definition video and/or still photographs. The sensor supports 1080p30, 720p60, and VGA90 video modes in addition to still capture. The sensor attaches to the camera serial interface (CSI) port on the Raspberry Pi via a 15 cm ribbon cable. The camera works with various Raspberry Pi models including, but not limited to the Raspberry Pi 1, 2, and 3. The camera 1005A may be accessed and controlled using the multimedia abstraction layer (MMAL) and video for Linux (V4L) API's. Additionally, numerous third-party software libraries may be used to control the camera 1005A in various software environments (e.g., Python using the Picamera Python library).

Another example of the camera/sensor 1005A includes, but is not limited to, the infrared Camera Module v2 (Pi NoIR). The v2 Pi NoIR has a Sony IMX219 8-megapixel sensor, which is the same as the camera used in the Raspberry Pi Camera Module v2. The difference is that the Pi NOIR does not include an infrared filter (NOIR=No Infrared) and is thus able to acquire imagery of at least a portion of the infrared spectrum (e.g., NIR). In some implementations, the Pi NoIR may be used together with a square of blue gel to monitor the health of green plants. Similar to the Pi Cam, the Pi NoIR may with various Raspberry Pi models including, but not limited to the Raspberry Pi 1, 2, and 3. Also, the Pi NoIR camera may also be accessed and controlled in software using the MMAL and V4L API's as well as third-party libraries (e.g., Python using the Picamera Python library).

The camera/sensor 1005B may be a longwave IR thermal imager responsive to wavelengths in a range of from approximately 8 micrometers to approximately 14 micrometers (LWIR). One example of such a thermal imager includes, but is not limited to, the FLIR Lepton 3.5 micro thermal imager, which provides 160×120 pixels of calibrated radiometric output.

One example of the IR single point sensor 1005C includes, but is not limited to, the Melexis MLX90614 infrared thermometer for non-contact temperature measurements. An IR sensitive thermopile detector chip and the signal conditioning application-specific integrated circuit (ASIC) are integrated in the same TO-39 can. The MLX90614 also includes a low noise amplifier, 17-bit analog-digital converter (ADC), and a powerful digital signal processor (DSP) unit to achieve a high accuracy and resolution for the thermometer. The thermometer may be factory calibrated with a digital SMBus output providing access to the measured temperature in the complete temperature range(s) with a resolution of 0.02° C. The digital output may be configured to use pulse width modulation (PWM). As a standard, the 10-bit PWM is configured to continuously transmit the measured temperature in range of −20° C. to 120° C., with an output resolution of 0.14° C.

One example of the proximity sensor 1005D includes, but is not limited to, the VL53L1X time-of-flight proximity sensor. This sensor is a single point laser rangefinder with a field of view of 27°. The proximity sensor has a 940 nm emitter and a single photon avalanche diode. It has a programmable region-of-interest (ROI) size on the receiving array, allowing the sensor field of view to be reduced. The programmable ROI position on the receiving array provides multizone operation.

One example of the quantum sensor 4220E includes, but is not limited to, an Apogee SQ-520 or LI-190R. The quantum sensor is used to measure photosynthetically active radiation (PAR) at various points in the CEH, including, but not limited to above the grow canopy, at the grow canopy and reflected PAR. The Apogee SQ-520 is a full spectrum PAR sensor. The SQ-500 series quantum sensors consist of a cast acrylic diffuser (filter), interference filter, photodiode, and signal processing circuitry mounted in an anodized aluminum housing, and a cable to connect the sensor to a measurement device. SQ-500 series quantum sensors are designed for continuous PPFD measurement in indoor or outdoor environments.

In one exemplary method, the imagery/spectra at different wavelengths may be acquired in a serial manner by utilizing the following steps: (1) activating an LED element in the LED array of the imaging system to irradiate the plants with radiation at a first wavelength, (2) acquiring imagery/spectra using the camera(s)/sensor(s) in the imaging system, and (3) deactivating the LED element. These steps may be performed in sequence to acquire imagery/spectra at different wavelengths. For example, the imaging system may acquire images for the following cases: (1) illumination under 275 nm and 365 nm radiation, (2) illumination under visible radiation corresponding to various photosynthetic and terpene compound peaks, (3) illumination under NIR at 940 nm and 1450 nm to assess water content, (4) illumination under SWIR for detection of gases and other compounds, and (5) a LWIR heat map, which may be a acquired without activation of a light source.

Figure 4:
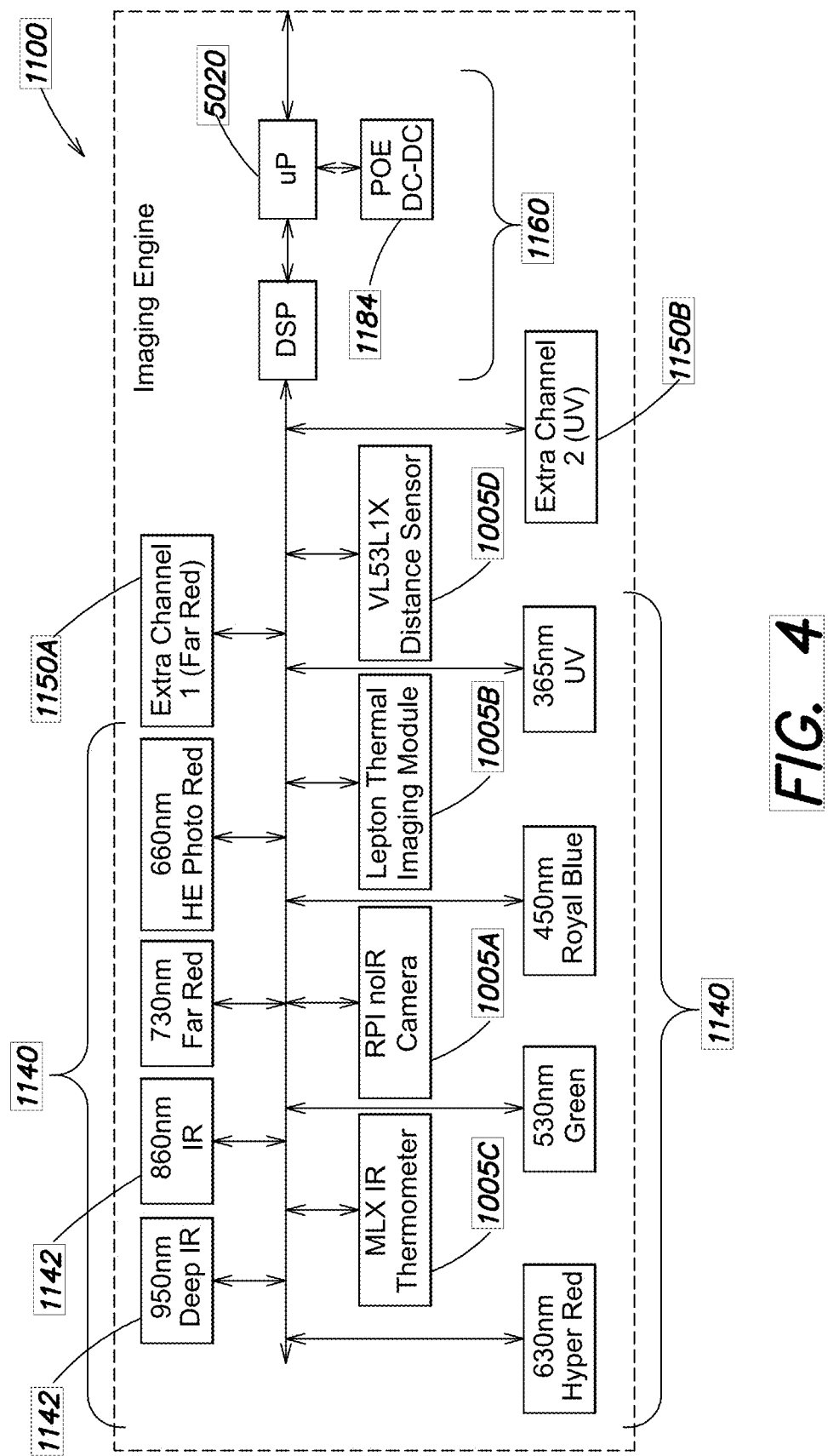
FIG. 4 is a block diagram of a multispectral imaging engine according to some implementations of the disclosure.

FIG. 4 shows a block diagram of a multispectral imaging engine 1100 according to an inventive implementation. In addition to the imagers/sensors 1005A-1005D, the imaging engine 1100 of FIG. 4 includes a plurality of narrowband irradiators 1140. The narrowband irradiators are LED arrays to irradiate the plants with radiation at various wavelengths to facilitate acquisition of one or more corresponding multispectral images (in which radiation reflected or otherwise emitted by the subject plant(s) is sensed/captured by one or more of the cameras/sensors upon exposure to one or more flashes from an LED/LEDs having particular wavelength(s) of radiation). The narrowband irradiators 1140 are provided with wavelengths of 365 (near UV), 450 (Blue), 530 (Green), 630 (Red), 660, 730, 860, and 950 nm (NIR). Thus, the imaging system 1100 provides both multispectral irradiation and sensing in a single, self-contained device.

The LED array 1140 may include one or more LED elements 1142. Each LED element 1142 of the array 1140 may emit radiation at a particular band of wavelengths or an essentially monochromatic wavelength and may be controlled independently from the other LED elements 1142. When one or more LED elements 1142 are operated to irradiate a desired portion of the environment (e.g., the plants below the lighting fixture 1000) with relatively narrow band or substantially monochromatic radiation, one or more of the cameras/sensors 1005 (e.g., camera 1005A) acquires a corresponding image that contains radiation reflected or otherwise emitted by the plant subjects in the field of view in response to exposure to radiation at the corresponding wavelength(s) of the operated LED element(s). Different LED elements 1142 may be activated to illuminate the desired portion of the environment with radiation at different wavelengths and the cameras/sensors 1005, in turn, may acquire corresponding images or other sensed information relating to reflected and/or emitted radiation resulting from the respective different wavelengths/wavelength bands of the activated LED elements. In some example implementations, after acquiring images and/or other information at multiple wavelengths/wavelength bands, a multispectral image may be formed by aligning and superimposing the respective acquired images onto each another. In this manner, the multispectral image may include spatial and spectral information regarding the desired portion of the environment (e.g., each pixel of the multispectral image contains corresponding spectra).

The imaging engine 1100 may also include supplementary LED arrays 1150A and 1150B (collectively referred to as supplementary LED array 1150) to augment the LED array 1140 and/or to alter the chemical/morphological properties of the plants. The imaging engine 1100 may also include power electronic circuitry 1160 to support the operation of the LED arrays 1140 and 1150 and cameras/sensors 1005. The imaging engine 1100 may also include a flash controlled 5020 (e.g., a Raspberry Pi processor) to control the LED arrays 1140 and 1150 and/or the cameras/sensors 1005. The imaging engine may also include one or more Power over Ethernet (PoE) ports 1184 and/or one or more Universal Serial Bus (USB) ports as communication and/or power ports.

FIGS. 5-8 show several views of the multispectral imaging engine 1100, according to example inventive implementations without and with a housing 1120, and with a network board, respectively. As shown, the imaging engine 1100 may include a circuit board 1110 that supports the cameras/sensors 1005A, 1005B and 1005C previously described. The imaging engine 1100 may also include LED arrays 1140A and 1140B (collectively referred to as LED array 1140) to irradiate the plants with radiation at various wavelengths to facilitate acquisition of one or more corresponding multispectral images (in which radiation reflected or otherwise emitted by the subject plant(s) is sensed/captured by one or more of the cameras/sensors upon exposure to one or more flashes from an LED/LEDs having particular wavelength(s) of radiation). The imaging engine may also include a proximity sensor 1005D (e.g., a single point laser rangefinder). The circuit board 1110 may include power electronic circuitry 1160 to support the operation of the LED arrays 1140 and 1150, cameras/sensors 1005, laser rangefinder 1005D, and other components of the imaging engine 1100. The imaging engine 1100 may include the housing 1120 to protect the cameras/sensors 1005A, 1005B, 1005C, and 1005D, the LED arrays 1140 and 1150, and other electronics from the surrounding environment.

Figure 5:
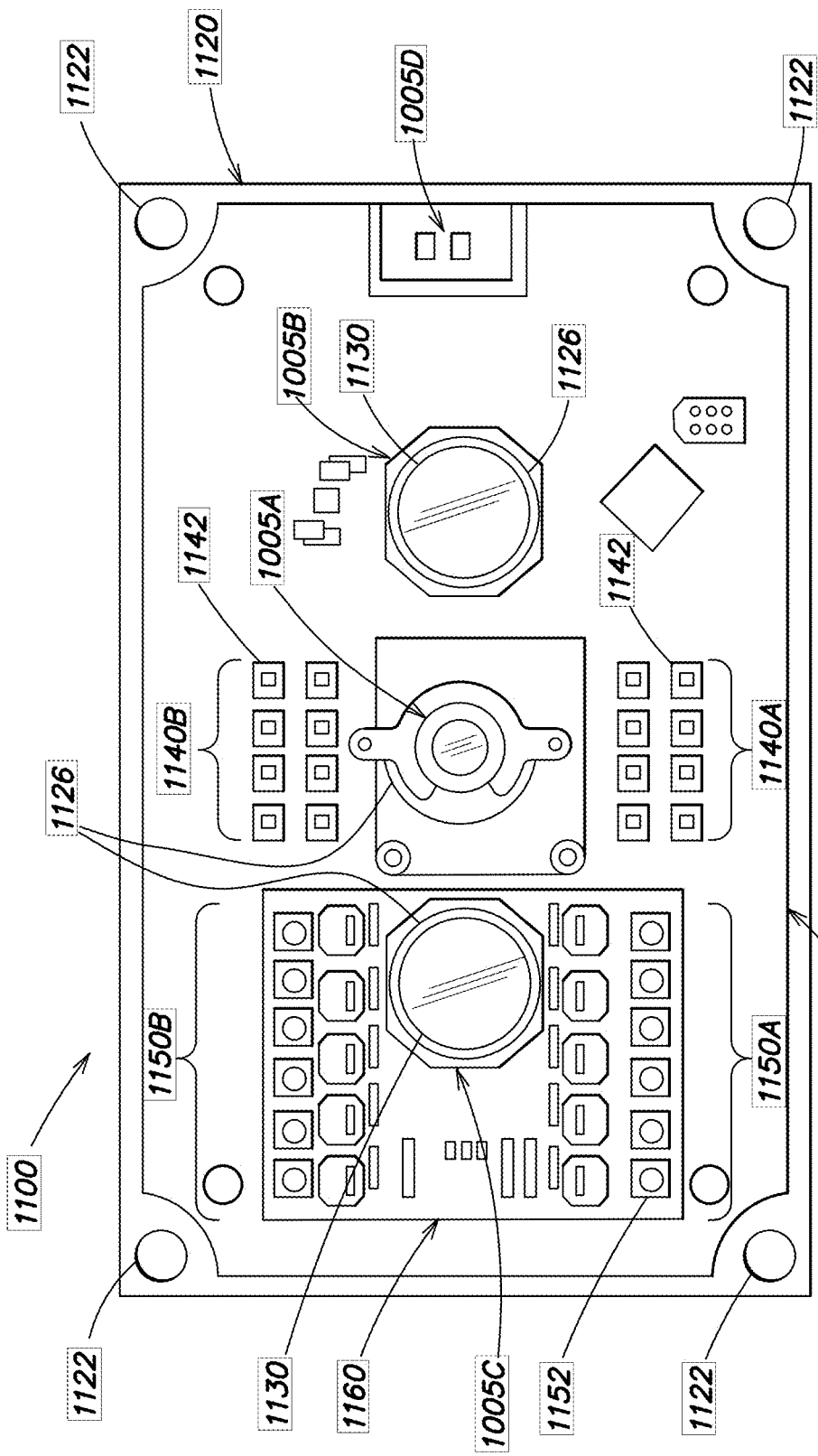
FIG. 5 illustrates a multispectral imaging engine, according to some implementations of the disclosure.

The imaging engine 1100 may generally include one or more LED arrays 1140. Each LED array 1140 may include one or more LED elements 1142. For instance, each LED array 1140 may include between about 1 to about 100 LED elements 1142. The LED elements 1142 in the LED array 1140 may be disposed proximate to each other on the circuit board 1110. The LED arrays 1140 may be arranged on the circuit board 1110 to provide a desired illumination profile. For example, the LED arrays 1140A and 1140B may include the same type of LED elements 1142, thus providing multiple radiation sources that emit radiation at the same wavelength. FIG. 5 shows the LED arrays 1140A and 1140B may be disposed on opposing sides of the camera 1005A. By irradiating the plants and/or their surroundings with radiation from opposing sides of the camera 1005A, the camera 1005A may acquire images under more uniform irradiation. Other illumination profiles may be achieved with different arrangements and/or using an optical element (e.g., shaping a portion of the housing 1120 in front of the LED array 1140, placing a separate diffuser or lens onto the LED array 1140).

The LED array 1140 may generally include LED elements 1142 that respectively emit radiation at different wavelengths. For example, the LED elements 1142 may emit radiation at wavelengths ranging between about 200 nm to about 2 μm. The number of LED elements 1142 and the wavelengths at which they emit light may be chosen, in part, based on known spectral absorption and/or reflection peaks of various chemical compounds associated with the plants (see FIGS. 19-21) and/or other subjects of interest in the CEH system. For example, the LED elements 1142 may be chosen to cover the absorption peaks of several different types of compounds from the UV to the NIR wavelength ranges. In some implementations, it may be preferable to use LED elements 1142 with a smaller spectral bandwidth (e.g., essentially monochromatic radiation) in order to provide greater spectral resolution when acquiring multispectral images of the plants and/or other subjects. For example, the spectral bandwidth of one or more of the LED elements 1142 considered to be essentially monochromatic may be less than about 50 nm. Other LED elements 1142 may emit radiation in a broader range of wavelengths; for example, one or more of the LED elements 1142 may be a white LED in which the generated radiation covers a band of wavelengths and may be specified as corresponding to a particular color temperature.

The respective wavelengths of the radiation emitted by the LED elements 1142 may cover UV, visible, NIR, and SWIR regimes. In one example implementation, respective wavelengths of essentially monochromatic LED elements 1142 of the LED array 1140 may include, but are not limited to, 275 nm, 365 nm, 440 nm, 450 nm, 475 nm, 500 nm, 530 nm, 620 nm, 630 nm, 660 nm, 696 nm, 730 nm, 760 nm, 850 nm, 860 nm, 940 nm, 950 nm, 1450 nm, 1610 nm, and 2060 nm. More generally, the LED elements 1142 of the LED array 1140 may have radiation wavelengths between approximately 275 nm to approximately 2060 nm.

The supplementary LED array 1150 may include additional LED elements 1152. The LED elements 1152 may have one or more of the same features as the LED elements 1142 described above. In one example, the LED elements 1152 may emit radiation at one or more of the same wavelengths as the LED elements 1142 in order to increase the overall intensity of radiation when acquiring images/information relating to the irradiated plants/other subjects (i.e., both LED elements 1142 and 1152 are activated). In some implementations, the LED elements 1152 may provide a radiation output greater than the LED elements 1142. For example, the LED elements 1152 may have a wattage rating greater than about 6 Watts. The higher radiation output provided by the LED elements 1152 may be used, in part, to intentionally induce chemical and/or morphological changes to plants in the environment. For example, the LED elements 1152 may provide a higher radiation output at 730 nm in order to alter the day/night cycle of the plants (e.g., changing when the plant blooms). In another example, the LED elements 1152 may provide UV light to ward off pests in the environment.

The housing 1120 may be used, in part, to enclose and protect the various components of the imaging engine 1100 and to facilitate installation of the imaging engine 1100 onto the frame a lighting fixture in the CEH. In some implementations, the housing 1120 may form a substantially sealed enclosure in order to prevent moisture and/or water from contacting the various electronics, cameras, and sensors on the circuit board 1110. The housing 1120 may include a groove along its periphery to support a gasket 1124 and through-mounting holes 1122 for ease of installation. When the housing 1120 is installed in the CEH system, the gasket 1124 may deform to form a seal. In some implementations, the housing 1120 may form a substantially watertight seal.

The housing 1120 may be formed from various plastic and/or ceramic materials. In some implementations, the housing 1120 may be formed from a material that is substantially transparent to light at wavelengths corresponding to at least the emission wavelengths of the LED elements 1142 and 1152. Thus, radiation emitted by the LED elements 1142 and 1152 may transmit through the housing 1120 when irradiating the plants and/or the surrounding environment. In some implementations, the housing 1120 may be shaped to redirect radiation emitted by the LED elements 1142 and 1152 along a desired direction. For example, the housing 1120 may be shaped to redirect radiation emitted at wider angles towards the plants disposed directly below the imaging engine 1100 in order to more efficiently use the radiation for imaging/information acquisition. In some implementations, the surface finish of the housing 1120 may be altered to disperse radiation (e.g., a substantially smooth finish to provide specular illumination or a substantially rough finish to provide diffuse illumination).

In some implementations, the housing 1120 may be formed from a material that is not sufficiently transparent across the wavelength range of interest. For example, the camera 1005A may acquire imagery/information from the UV to SWIR ranges while the camera 1005B may acquire imagery/information in the LWIR range. Materials are typically not transparent across such a large wavelength range. Furthermore, in some instances parasitic absorption by the housing 1120 may affect the data collected by the camera(s)/sensor(s) 1005. In view of the foregoing, the housing 1120 may include multiple openings 1126 disposed near the camera(s)/sensor(s) 1005 that are shaped to support various optical elements tailored for the appropriate wavelength ranges of each camera/sensor 1005.

Figure 6:
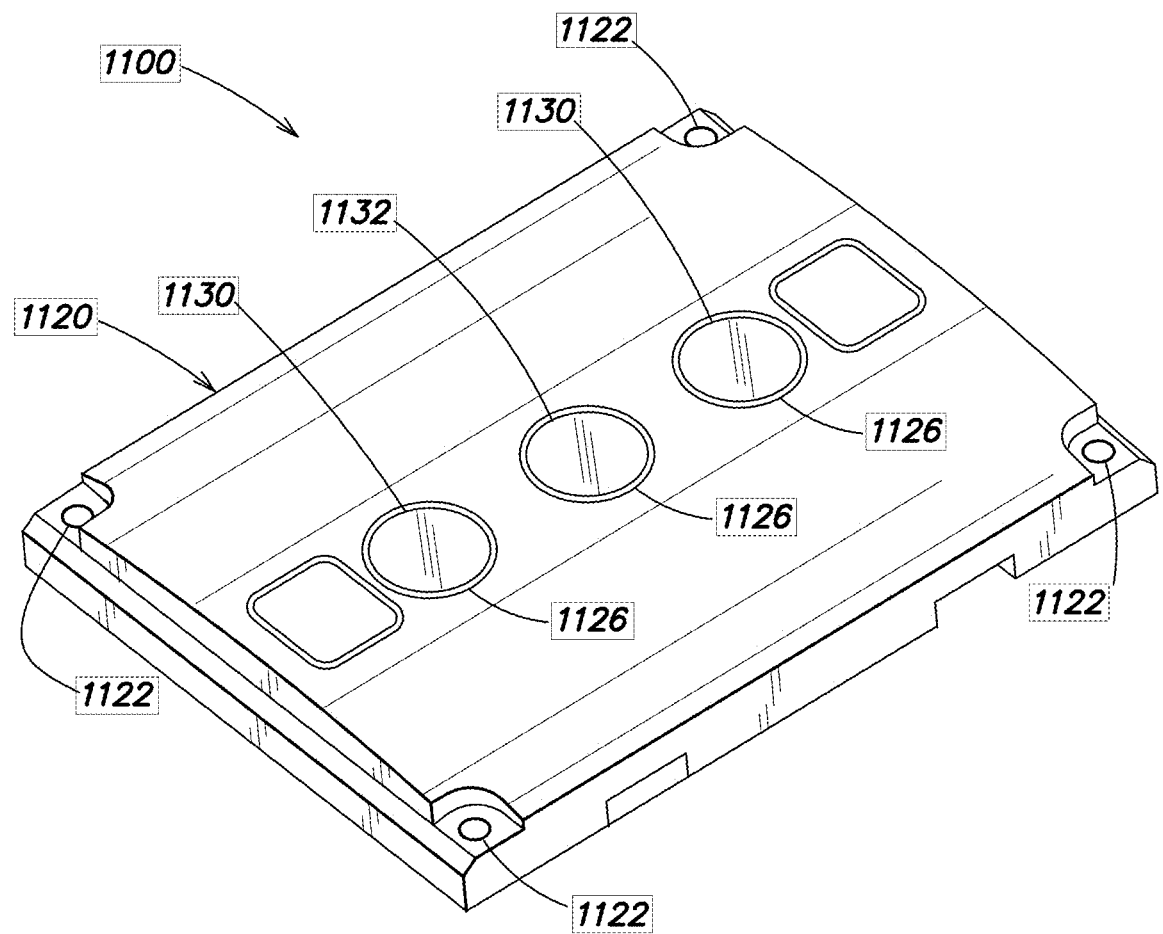
FIG. 6 shows a top, front, left perspective view of the imaging engine of FIG. 5.
Figure 7:
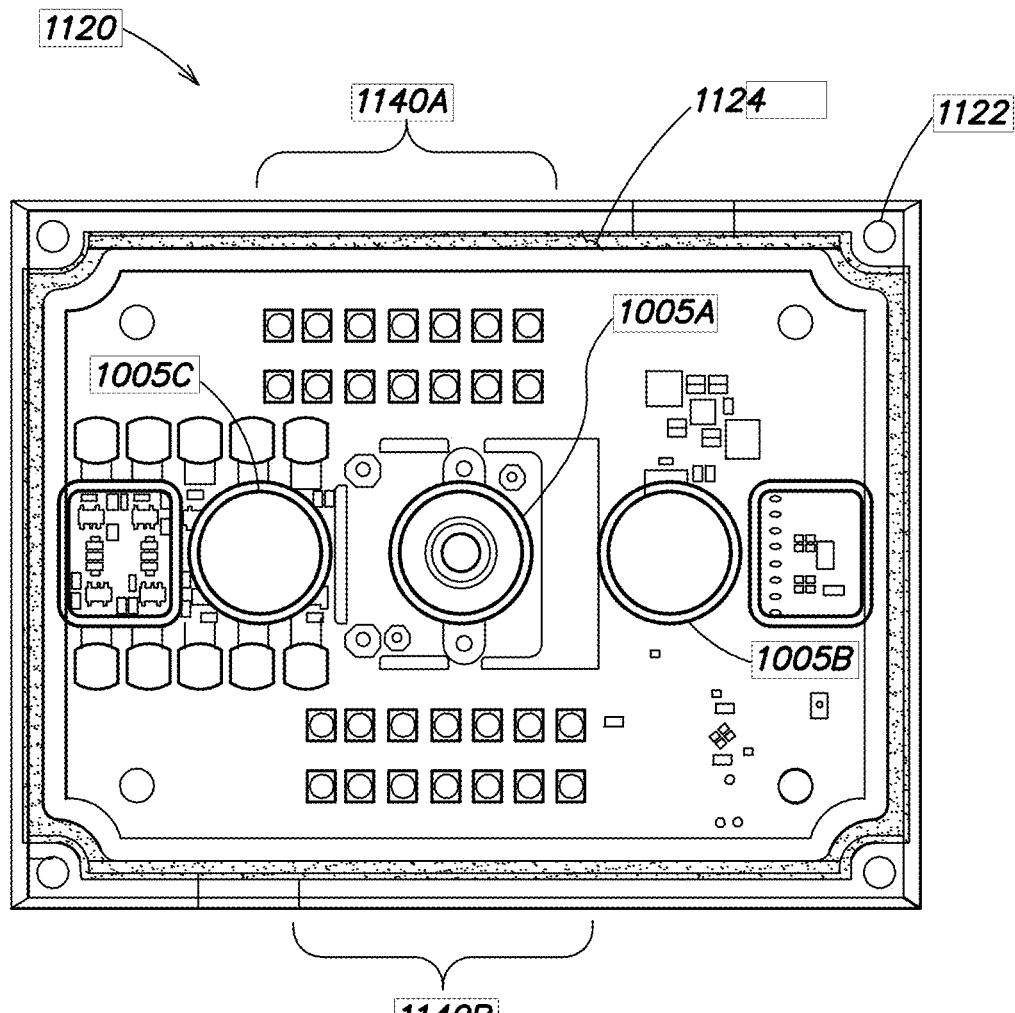
FIG. 7 illustrates a multispectral imaging engine, according to some implementations of the disclosure.

For example, FIG. 6 shows a germanium (Ge) window 1130 may be installed into the openings 1126 located directly above the camera 1005B and the sensor 1005C. The Ge window 1130 may be used, in part, as an infrared filter that substantially reduces (attenuates) the transmission of higher frequency (shorter wavelength) radiation, thus ensuring the camera 1005B and the sensor 1005C receive infrared light in the MIR and FIR ranges. Similarly, a glass window 1132 may be disposed in the opening 1126 located directly above the camera 1005A to transmit UV to NIR radiation. In some implementations, the Ge window 1130 and glass window 1132 may include an anti-reflection coating to increase the amount of light transmitted and detected by the respective camera(s)/sensor(s) 1005. It should be appreciated that the Ge window 1130 and glass window 1132 are two exemplary materials and may be substituted with other materials suitable for the respective wavelength range(s) of interest. For example, a zinc selenide (ZnSe) window may be used for the IR range. Magnesium fluoride ($MgF_2$), sapphire ($Al_2O_3$), and calcium fluoride ($CaF_2$) may be used for the UV and NIR ranges.

Figure 8:
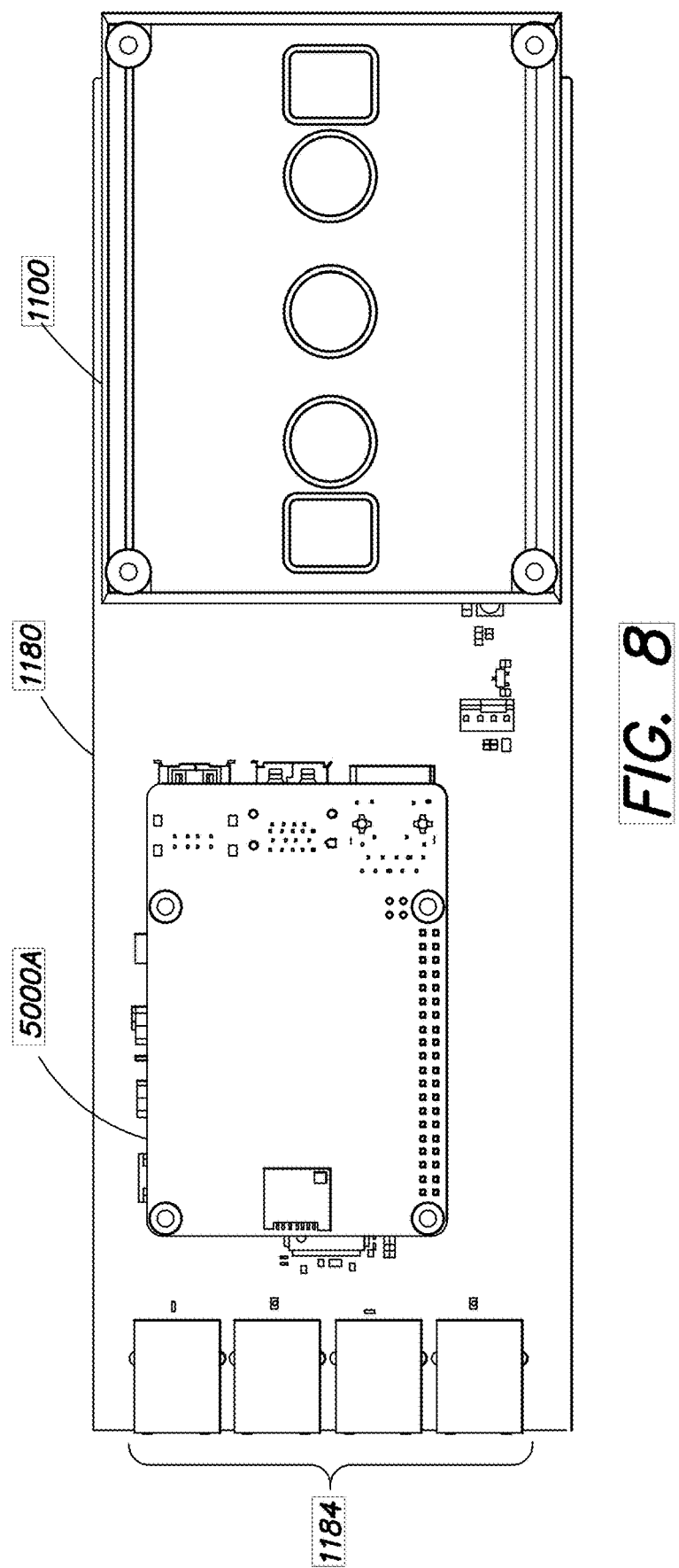
FIG. 8 illustrates the multispectral imaging engine of FIG. 7 with a carrier board and a processor.
Figure 9:
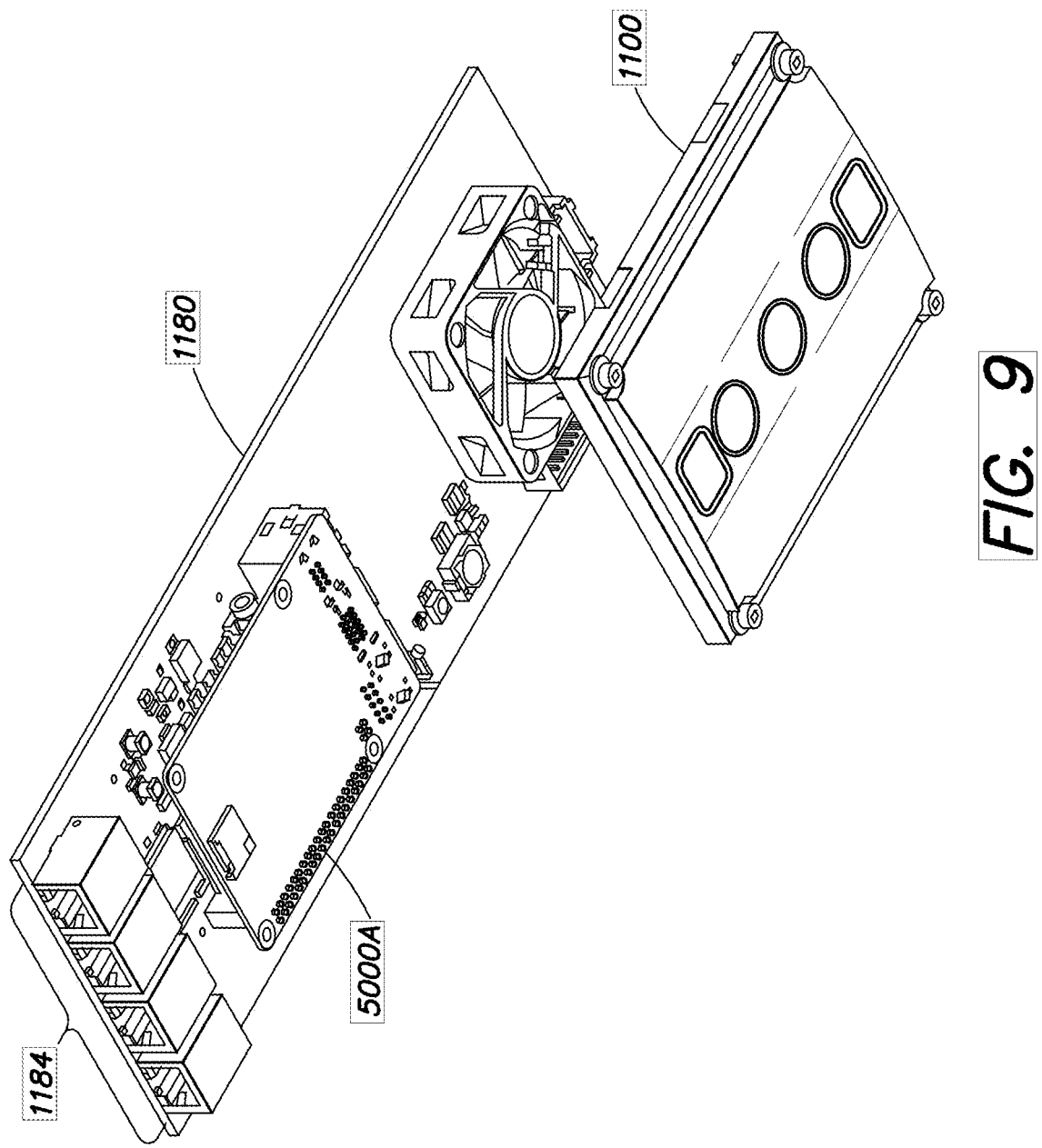
FIG. 9 illustrates another view of the multispectral imaging engine of FIG. 7 with a carrier board and a processor.

FIGS. 8 and 9 show an imaging engine 1100 including a carrier board 1180. The carrier board 1180 supports a processor 5000A (e.g., a Raspberry Pi processor). The carrier board also supports one or more Power over Ethernet (PoE) ports 1184 and/or one or more Universal Serial Bus (USB) ports as communication and/or power ports. In some implementations, the processor 5000A may also act as the flash controller 5020. In this implementation, the carrier board provides power conversion and mounting for the imaging engine and the Pi. It also provides data communications.

Figure 10:
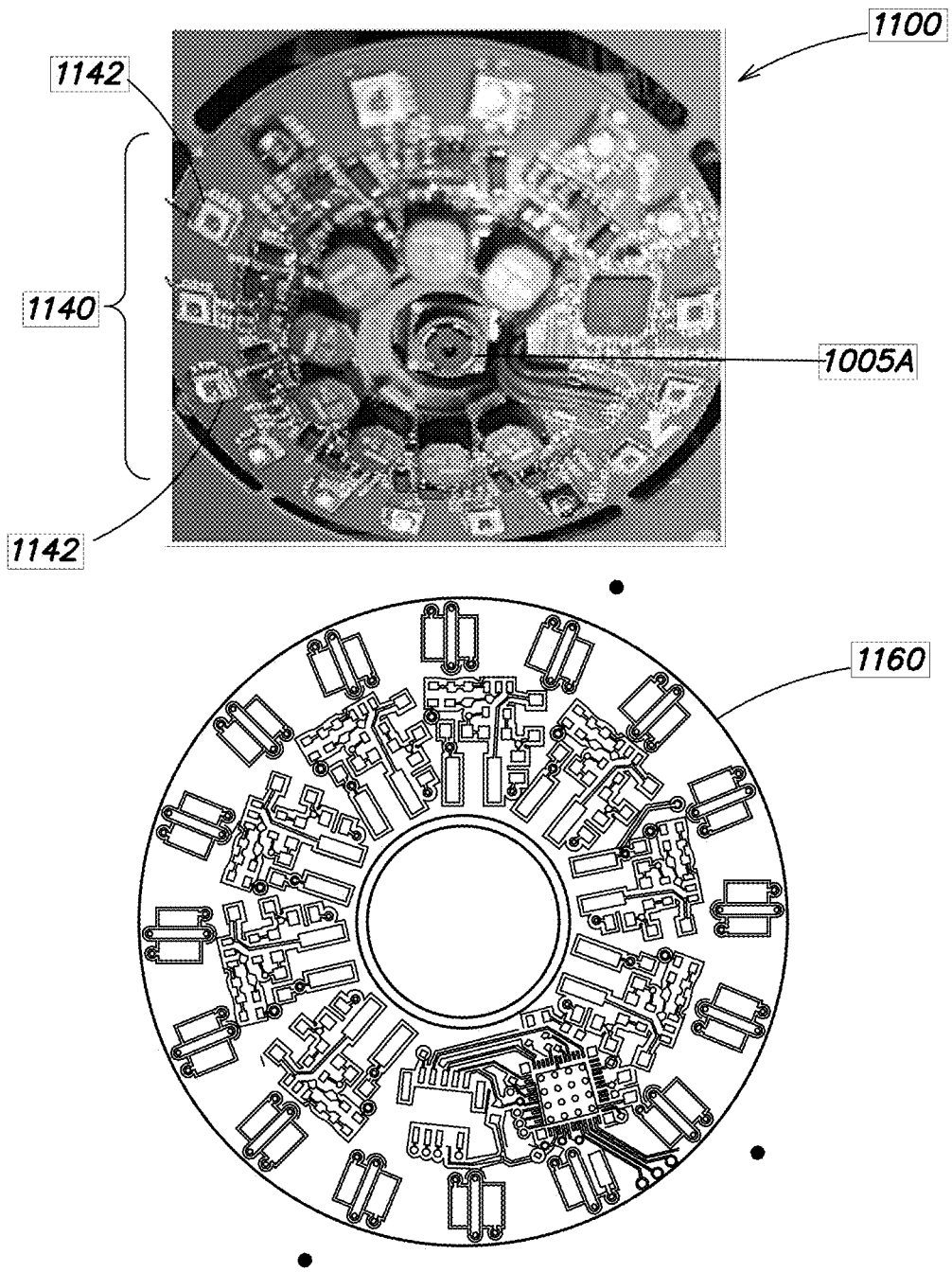
FIG. 10 illustrates a circular multispectral imaging engine, according to some implementations of the disclosure.

FIG. 10 shows a multispectral imaging engine 1100 according to one example implementation. The imaging engine 1100 includes a single camera 1005A to acquire UV-SWIR imagery and an LED arrays 1140 disposed in a circle around the camera 1005A. The arrangement of LED elements 1142 around the camera 1005A may provide more uniform irradiation. The imaging engine also includes electronic circuitry 1160 to support the operation of the LED arrays 1140 and the camera 1005A.

The image processor 5000A may perform one or more image processing steps. In some implementations, the imaging system 5050A may use one or more calibration references to facilitate calibration by the image processor 5000A of imagery and/or sensor data acquired by camera(s)/sensor(s) 1005. For example, a phantom may be used to calibrate imagery/spectra in the UV, visible, NIR, and SWIR regimes. The phantom may be an object with known optical properties including, but not limited to a known emissivity, absorptivity, and reflectivity at various wavelengths. In general, the phantom may have optical properties that vary as a function of wavelength or optical properties that remain substantially unchanged at different wavelengths. The phantom may have various shapes including, but not limited to a sphere, a polyhedron, a plant, a fungus, and an animal (e.g., a mammal, a fish). The phantom may also be dimensioned to have an overall size that is smaller, comparable, or larger than the plants being imaged.

By placing a phantom near the plants being imaged, the phantom can calibrate both the magnitude and wavelength of the imagery/spectra being measured. In some implementations, multiple phantoms may be deployed within the field of view of the camera(s)/sensor(s) to provide multiple references. For such cases, the multiple phantoms may be used to correct for image distortion (e.g., spherical aberration of the image) and/or the angle at which radiation is received by the camera(s)/sensor(s) (e.g., the camera/sensor may have a responsivity that varies as a function of the angle of incidence of the detected radiation).

Figure 11:
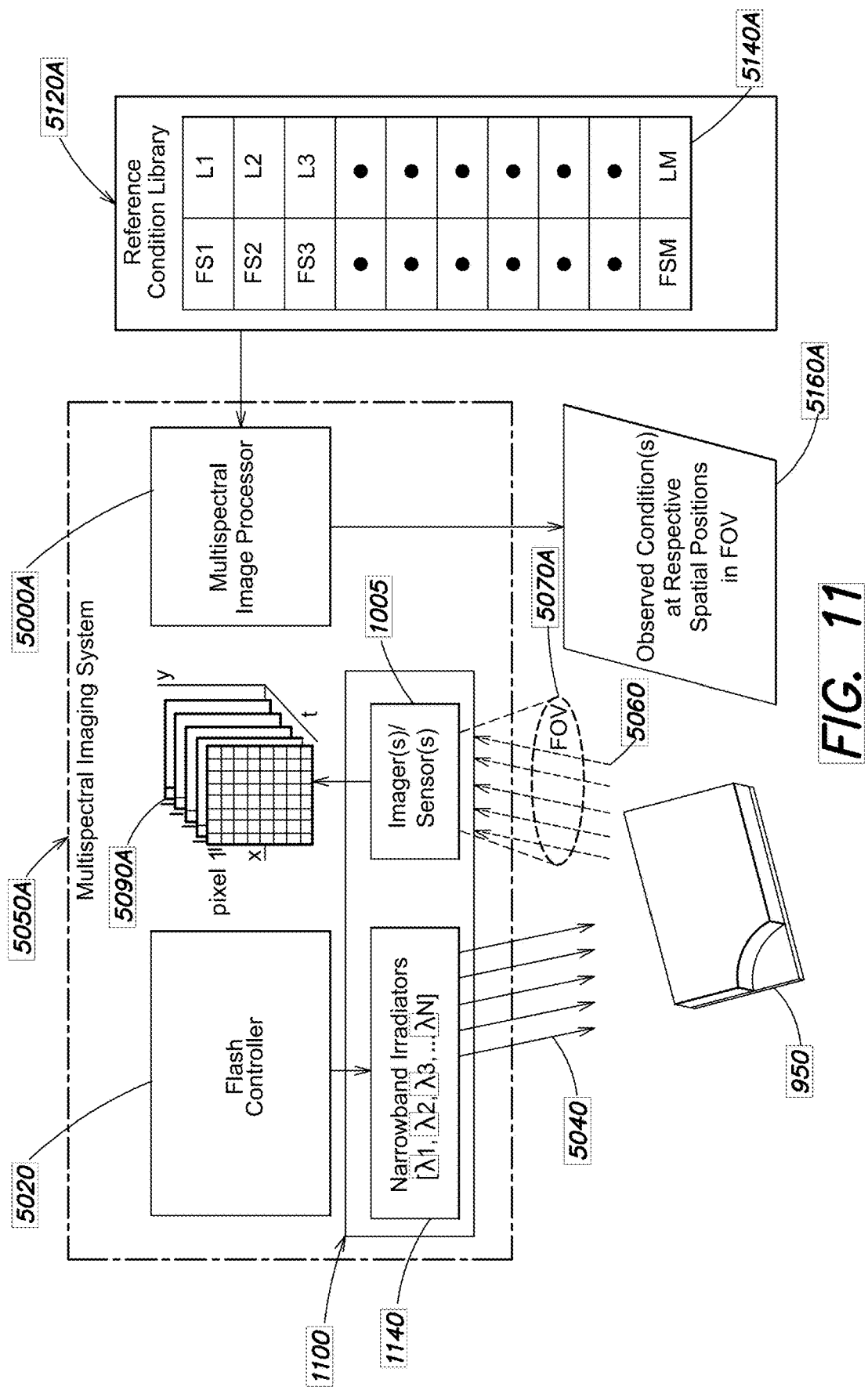
FIG. 11 illustrates narrowband image calibration of a multispectral imaging system using a reference reflectance target.

FIG. 11 illustrates calibration of the UV-SWIR camera(s) using a reference reflectance target 950 as a phantom. This calibration may be used to calibrate narrowband images 5090A acquired by the multispectral imaging system 5050A. Calibration in the form of radiometric correction may, for example, compensate for changing incident light conditions during imaging. Radiometric correction may provide absolute reflectance values and make it possible to compare reflectance information from several sources. The reference reflectance target 950 may reflect a known amount of incident light uniformly at every wavelength band. For example, the reference target 950 may reflect 99% of incident light. Narrowband reflectance values may be corrected using a correction factor determined using the reference reflectance target 950. The correction factor may be a ratio of the highest possible reflectance divided by the reflectance of the reference target 950.

Figure 12:
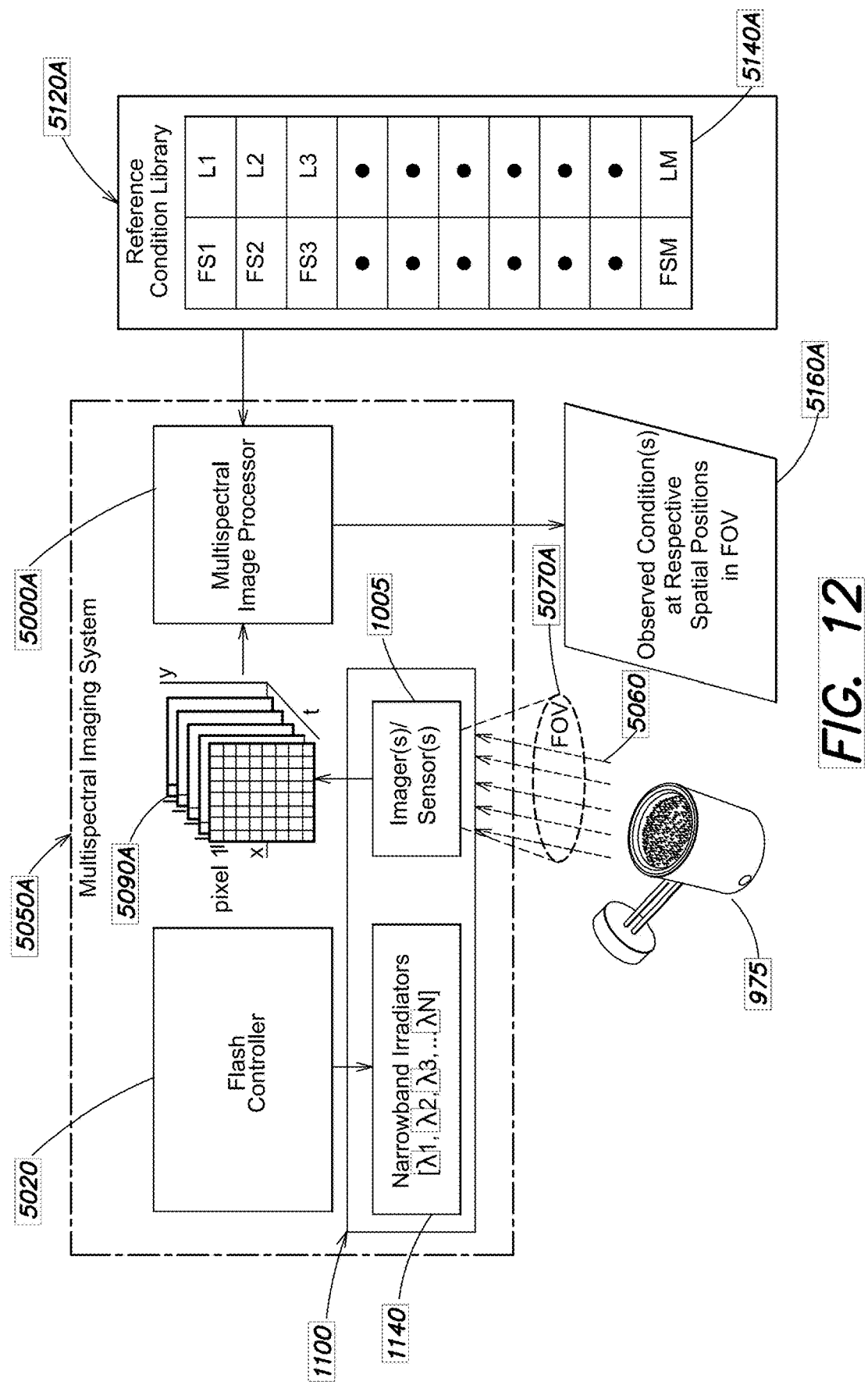
FIG. 12 illustrates thermal image calibration of a multispectral imaging system using a blackbody radiator.

FIG. 12 illustrates calibration of the LWIR thermal camera(s) 1005B using a blackbody radiator 975. A blackbody radiator 975 may be used to calibrate thermal imagery/spectra in the LWIR regime. The blackbody radiator may be an object that is heated to a known temperature. For example, the blackbody radiator may include a resistive heater and a temperature sensor (e.g., a thermistor, a thermocouple). The blackbody radiator may thus be used to calibrate the temperature measured in the thermal imagery.

Similar to the phantom, the blackbody radiator may have various shapes including, but not limited to a sphere, a polyhedron, a plant, a fungus, and an animal (e.g., a mammal, a fish). The blackbody radiator may also be dimensioned to have an overall size that is smaller, comparable, or larger than the plants being imaged.

As another example, thermal images acquired by the LWIR thermal camera(s) may be corrected using the crop water stress index (CWSI). CWSI may be extracted from a thermal image and may assist in compensating variability in the environmental parameters. Air temperature measurements using a more precise temperature sensor are used to calculate CWSI. CWSI is defined as:

$$CWSI = \frac{(T_c - T_a) - (T_{c,max} - T_a)}{(T_{c,min} - T_a) - (T_{c,max} - T_a)}$$

where $T_c$ is the average temperature in the region of interest, Ta is the air temperature measured by the more precise temperature sensor, $T_{c,min}$ is the lowest pixel temperature within the region of interest in the thermal image, and $T_{c,max}$ is the highest pixel temperature within the region of interest in the thermal image. The resulting CWSI values may be used to sense transpiration and/or stomatal conductance.

Figure 13:
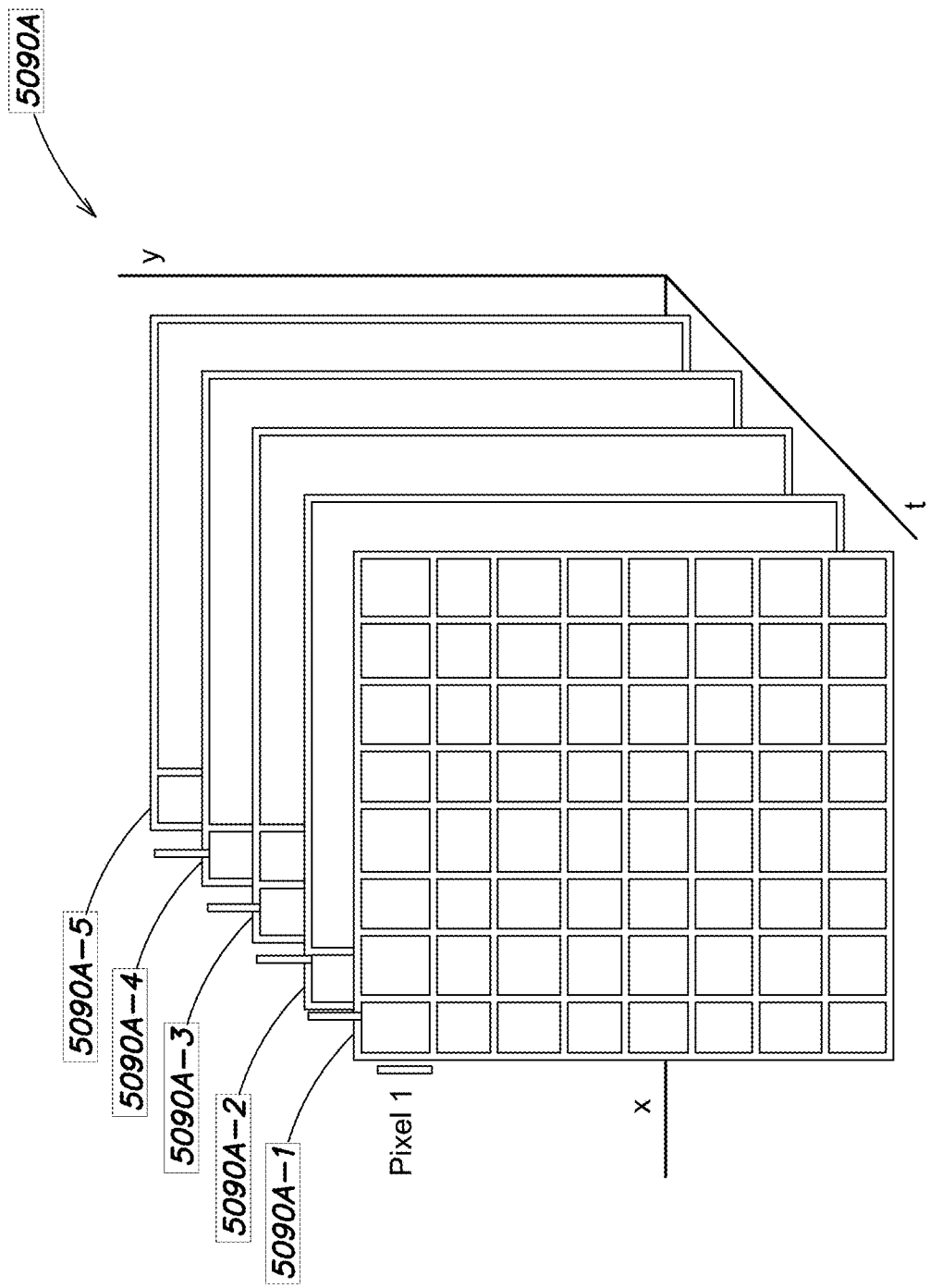
FIG. 13 shows constituent narrowband and thermal images collected by a multispectral imaging system, used to create multispectral imagery.

FIG. 13 shows a set of discrete images 5090A-1-5090A-5 acquired by the multispectral imaging system 5050A. These discrete images 5090A-1-5090A-5 may be overlaid to produce a multispectral image. Multispectral images acquired by the imaging system 5050A may include a plurality of pixels, where each pixel represents a 2D spatial position (e.g., in an x, y plane) in the field of view and corresponds to a measured value or spectrum. For example, the imaging system may acquire four narrowband images corresponding wavelengths measured by the UV-SWIR camera 1005A, as well as a thermal image measured by the LWIR camera 1005B. In this case, each pixel in the resulting multisensory image may correspond to four narrowband spectral image values and a thermal heat map value. FIG. 13 only shows four discrete narrowband images and a LWIR heat map overlaid to make a multispectral image. However, any number of narrowband images could be acquired by the imaging system 5050A, depending on the number of radiation wavelengths of the narrowband irradiators 1140.

The size of pixels in a multispectral image may be defined by the highest resolution camera. Images and/or sensory data acquired by an imaging engine may have a substantially overlapping field of view so that they may be easily overlaid.

Generally, a multispectral image generated by the imaging system 5050A includes a plurality of pixels. Each pixel has a vector of values. The vector of values for a particular pixel may represent the respective reflectance at each narrowband irradiator wavelength. The vector of values for the particular pixel may also represent a temperature corresponding to the LWIR heat map.

The vector of values may provide the basis for a feature set for a machine learning or deep learning algorithm to facilitate identification of conditions of interest 5160A. The values measured at each pixel may be featurized so that they are suitable for input into an algorithm. In other words, the measured pixel values may be represented by a set of structured mathematical representations called features. In this way an algorithm may identify conditions of interest 5160A from real-time measurements, non-destructively and in situ, on a pixel-by-pixel basis. Particular values in a given feature set representing a condition of interest can be labeled ("annotated") and thereby facilitate model training for use in machine learning matching (e.g., with a confidence value) to identify conditions of interest observed in real time measurements of an object (e.g., plant(s)). In the example with four narrowband spectral images and a thermal heat map, each pixel in the resulting multisensory image may correspond to a feature set that includes measured values for four narrowband spectral images and a thermal heat map.

FIG. 14 shows an example feature set using all available irradiation wavelengths ($\lambda_1, \lambda_2, \lambda_3, \ldots \lambda_n$) and temperature measurements from thermal imaging (LWIR temp). For example, an imaging engine with eight narrowband radiation wavelengths 5040, the resulting feature set corresponding to each pixel may include nine elements (eight elements for each narrowband wavelength image and one element for thermal imaging). For a given use-case, any subset of the available features may be picked to define a feature set for a given measurement exercise. In other words, the feature set may have 2, 3, 4, or more elements. Not all measurements may be needed to identify the condition of interest.

FIG. 15 shows a reference condition library 5120A including a plurality of labelled conditions 5140A, which may be used to observe conditions 5160A. The reference condition library 5120A may include a plurality of labeled feature sets corresponding to various reference conditions. A machine learning algorithm may be used to compare and correlate experimental results to the reference condition library 5120A to determine if one or more reference conditions are present on a pixel-by-pixel basis.

Figure 16:
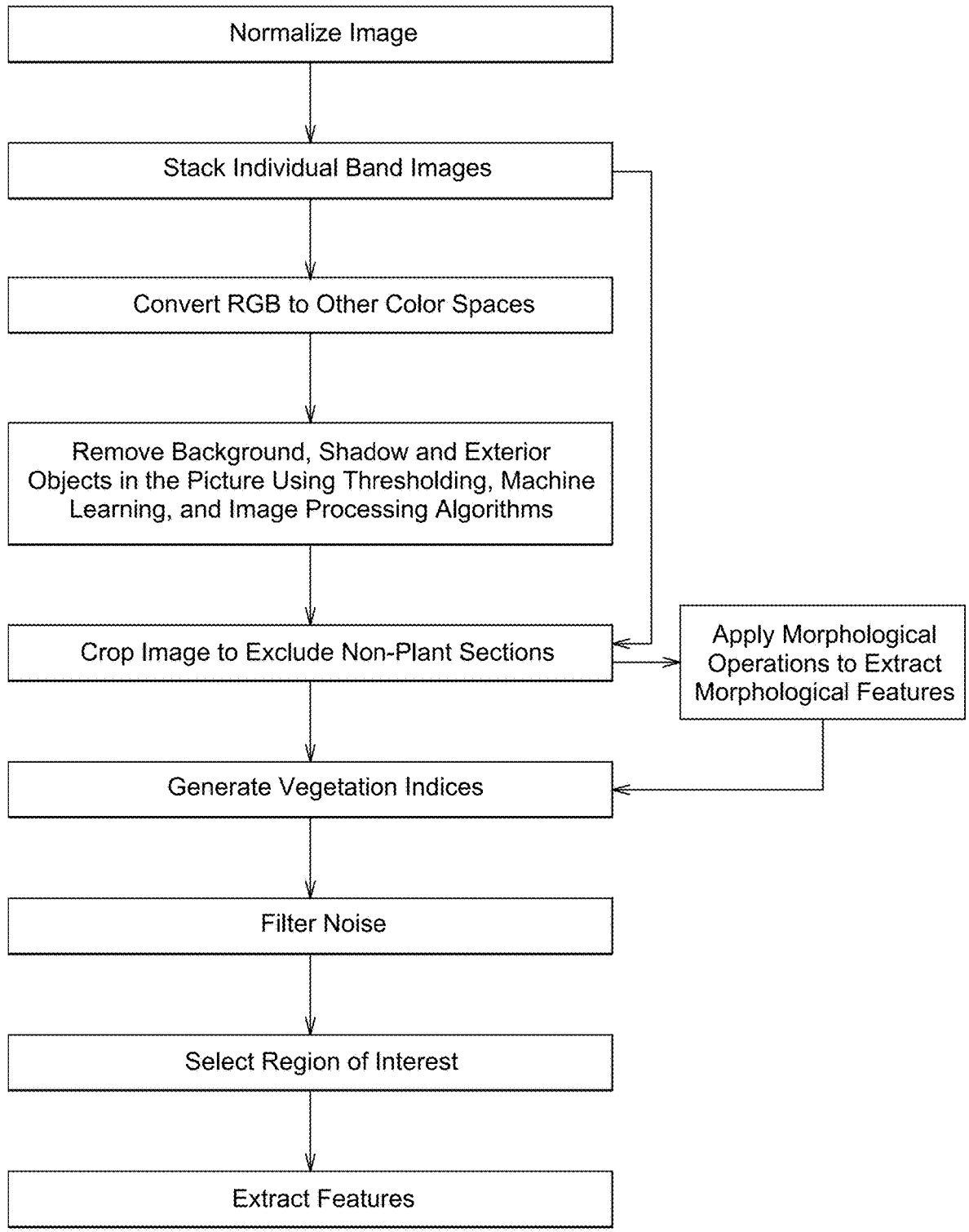
FIG. 16 shows a block diagram of image processing methodology, according to some implementations of the disclosure.

FIG. 16 shows image processing methodology, including radiometric correction, that may be used to prepare a multispectral image for input into a machine learning or deep learning algorithm. The image processor 5000A may normalize imagery and/or sensory data acquired by the imaging system 5050A. For example, reflectance data from narrowband images 5090A may be normalized according to the following equation:

$$\text{Normalized } R_i = \frac{R_i}{\sqrt{R_1^2 + R_2^2 + R_3^2 + \ldots + R_n^2}}$$

where Ri is a reflectance value from a pixel at a particular wavelength, and $R_1, R_2, R_3, \ldots R_n$ are the reflectance values from the pixel at each wavelength in the multisensory image. The image processor 5000A may convert the color spaces of imagery and/or sensory data. Each color space defines color with different attributes that can provide information for different applications. Different color spaces present this information in ways that are more convenient to make some calculations, or images may appear brighter and easier to distinguish. For example, imagery acquired using a RGB color space may be converted to another color space, such as HSV, HIS, or LAB. The image processor 5000A may process images acquired by the imaging system 5050A to remove background, shadow, and/or exterior objects in the images using thresholding, machine learning, and/or image processing algorithms. This process includes linear and non-linear image filtering for smoothing, sharpening, measuring texture, denoising, image compression, and image registration. Morphological operations are performed to change the foreground region via union operations. This process cleans up the results from thresholding. Structuring elements such as masks may also be used for morphology determination. Blobs or connected components may be extracted.

Figure 17:
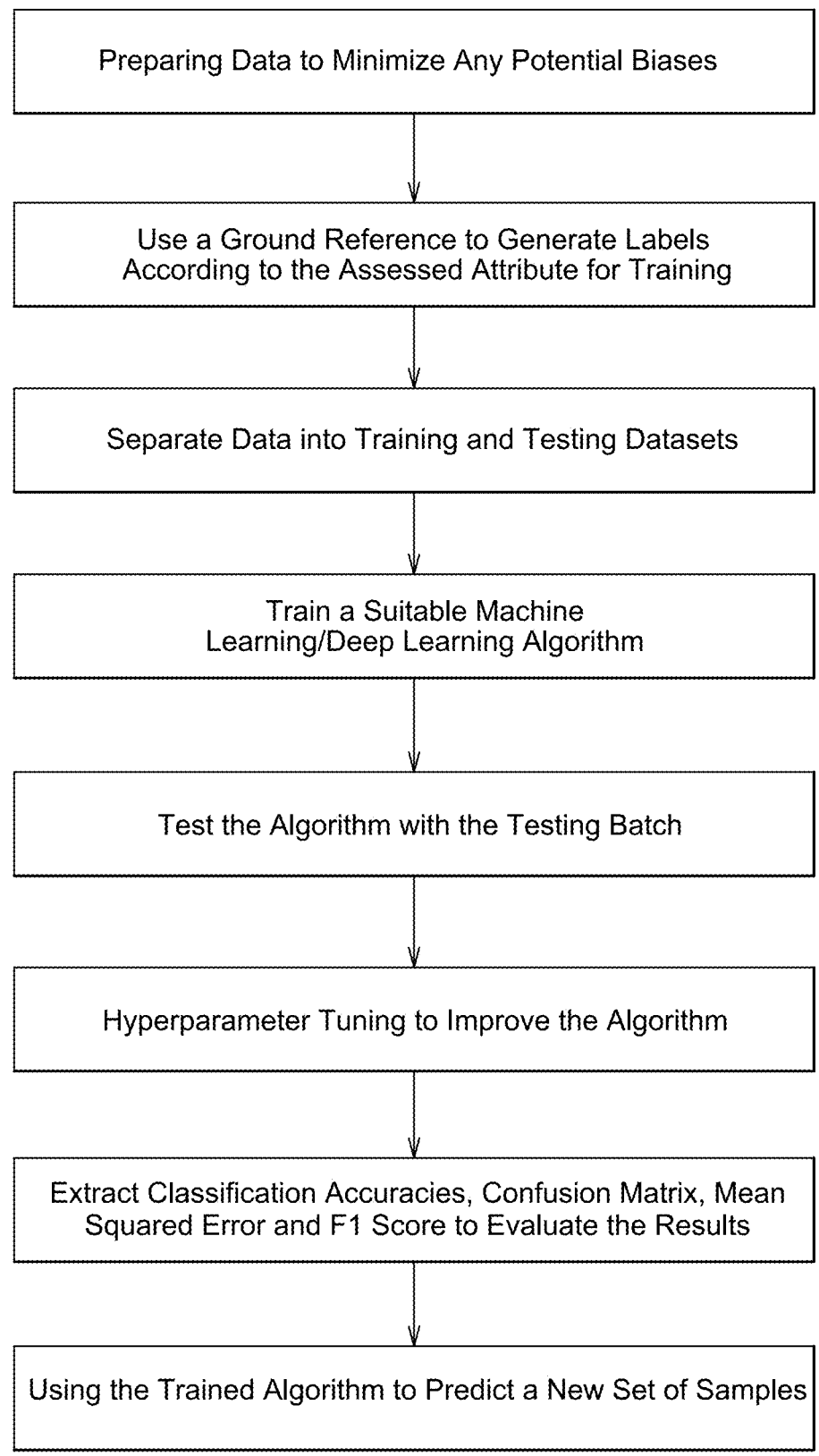
FIG. 17 shows a block diagram of machine learning algorithm methodology, according to some implementations of the disclosure.

FIG. 17 shows additional image processing methodology that may be used to prepare a multispectral image for input into a machine learning or deep learning algorithm. The imaging system 5050A may use labeled feature sets of known conditions to generate labeled conditions 5140A for the reference condition library 5120A. Images and sensory data collected by the imaging system 5050A may be used to populate or refine labeled conditions 5140A in the reference condition library 5120A. Images and sensory data collected by the imaging system 5050A may also be used to train a machine learning or deep learning algorithm. Once trained using data from the imaging system 5050A, the algorithm may more accurately predict conditions of interest in the multispectral images.

In some implementations, the image processor 5000A may determine vegetative indices (VIs) using the narrowband images 5090A. In this way, each pixel in a multispectral image may have one or more feature sets with one or more VI value. For example, the image processor 5000A may generate normalized difference spectral indices (NDSIs) that represent every possible coupled combination of narrowband reflectance wavelengths according to:

$$NDSI[i, j] = \frac{R_i - R_j}{R_i + R_j}$$

where R is the measured reflectance, and i and j refer to specific spectral bands. NDSIs may be novel combinations of spectral bands generated by spectral ratios. Other VIs may be generated, including NDVI, GNDVI, RNDVI, NNIR, MCARI, and RENDVI.

FIG. 18 shows an example feature set using measured values from all available narrowband irradiation wavelengths ($\lambda_1, \lambda_2, \lambda_3, \ldots \lambda_n$), temperature measurements from thermal imaging (LWIR temp), and an NDSI value generated using two or more narrowband images. The reference condition library 5120A may include labeled feature sets with one or more VI in the feature set.

The reference condition library 5120A can include labeled feature sets corresponding to known reflectance or albedo values of objects of interest. The library 5120A may include respective spectra of chemical constituents of interest. The values of respective features in the labeled feature set may be discreet reflectance (or absorbance) values lifted from the known spectra at the particular narrowband wavelengths serving as the features in the feature set (e.g., the wavelengths of the narrowband irradiators 1140). The known spectra may be albedos (reflectance) or absorbance spectra. Known absorbance spectra may be converted to reflectance spectra using conversions known in the art (e.g., Reflectance=(1/Absorbance)). Values from known spectra may also be normalized before use as a labeled feature set.

Figure 19:
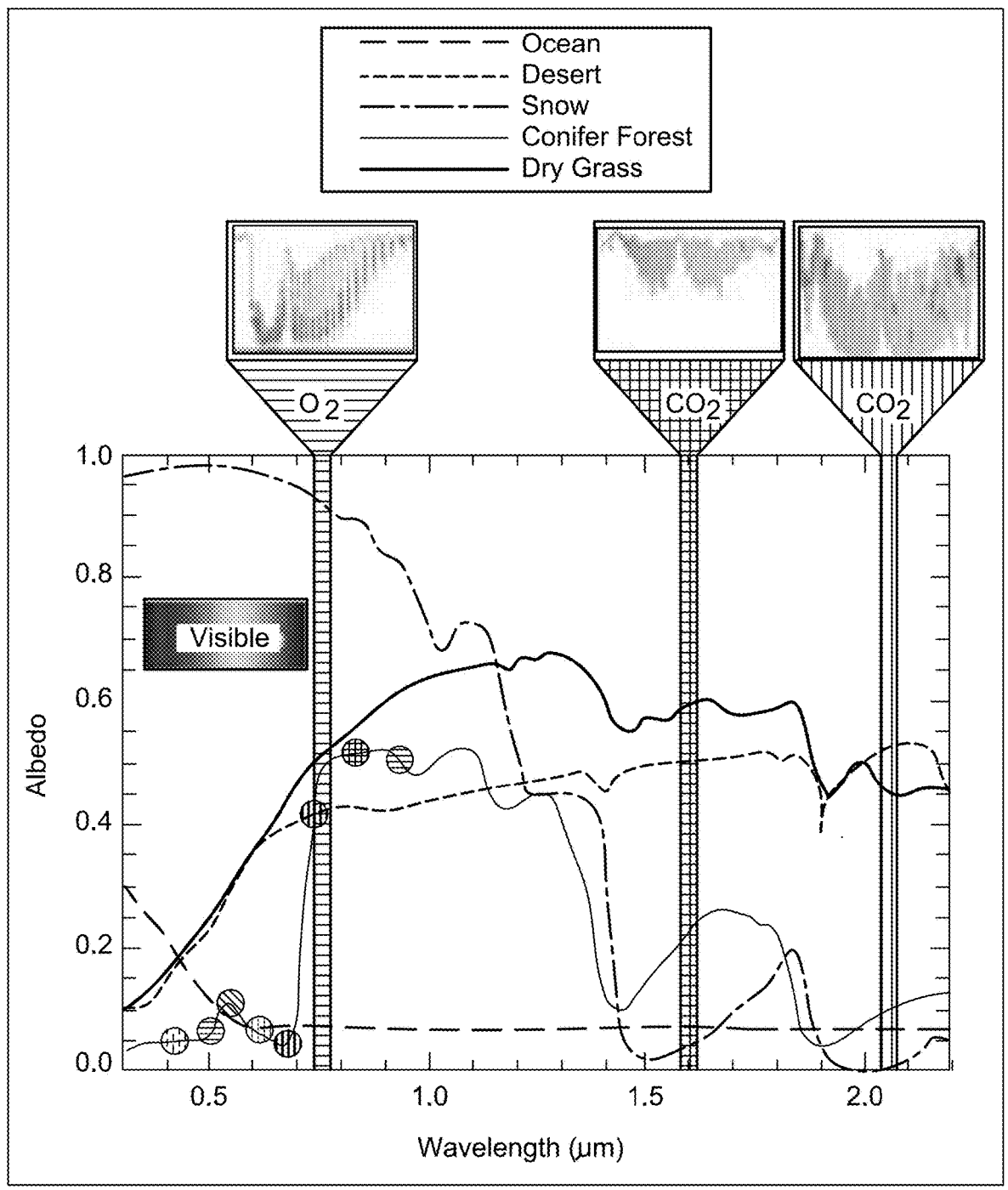
FIG. 19 shows albedo spectra of various environments in the visible to short wavelength infrared (SWIR) regimes.

FIG. 19 shows an example of known albedo spectra that may be discretized to provide a labeled feature set for the reference condition library 5120A. The albedo values at wavelengths or wavelength bands corresponding to the narrowband wavelengths of the irradiators 1140 may be extracted from one of the spectrums in FIG. 19 to create a labeled feature set. For example, a multispectral imaging system with eight monochromatic narrowband irradiator wavelengths (365 nm, 450 nm, 530 nm, 630 nm, 660 nm, 730 nm, 860 nm, and 950 nm) may extract discrete albedo values from a spectrum at each of the same wavelengths. FIG. 19 indicates the extracted albedo values for a reference label called "Conifer Forest" using circles. This labeled feature set for "Conifer Forest" may be used to identify the presence of conifer forests in images or sensory data acquired by the imaging system.

Figure 20:
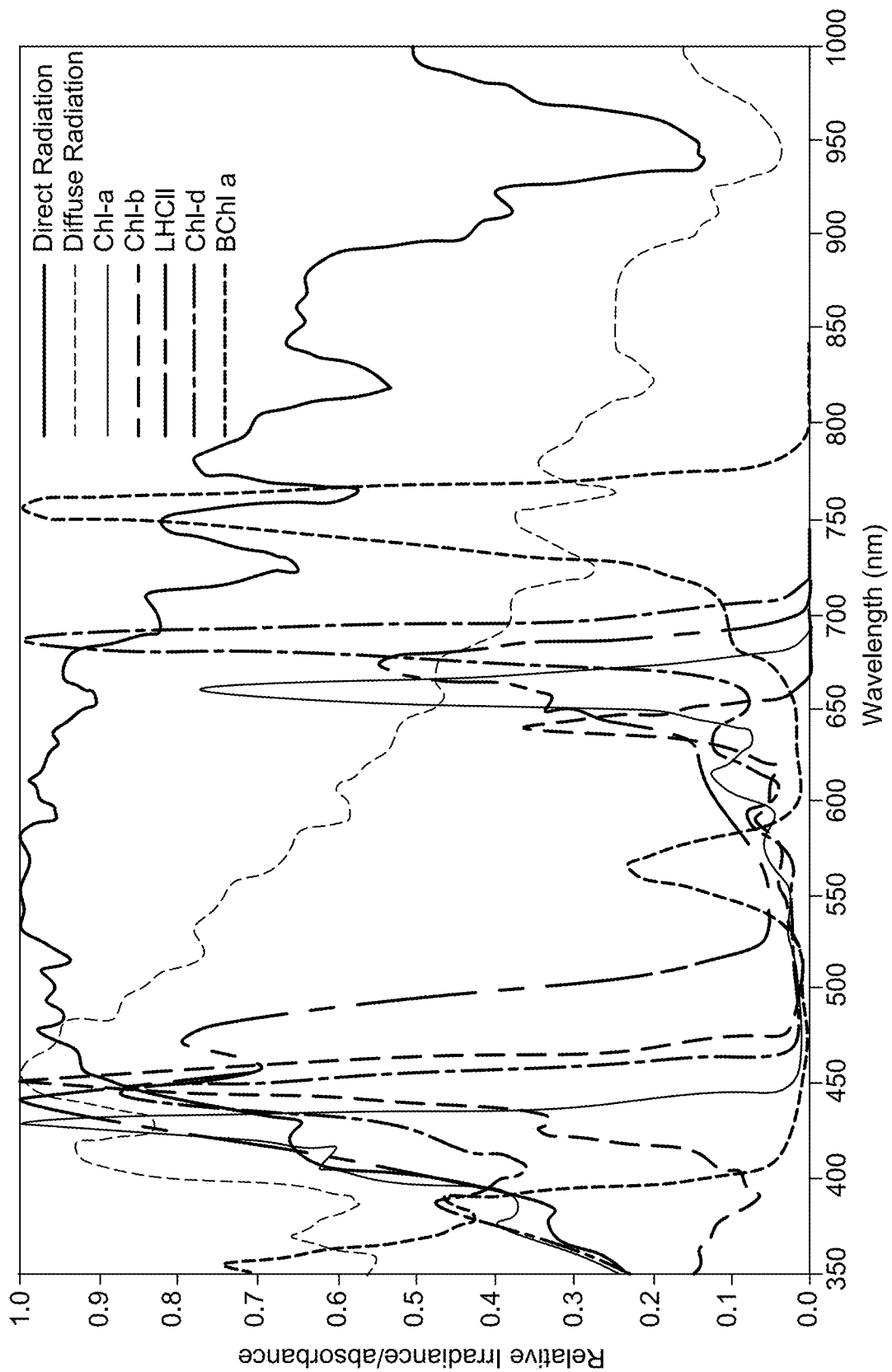
FIG. 20 shows the spectral absorbance of various plant-related compounds.
Figure 21:
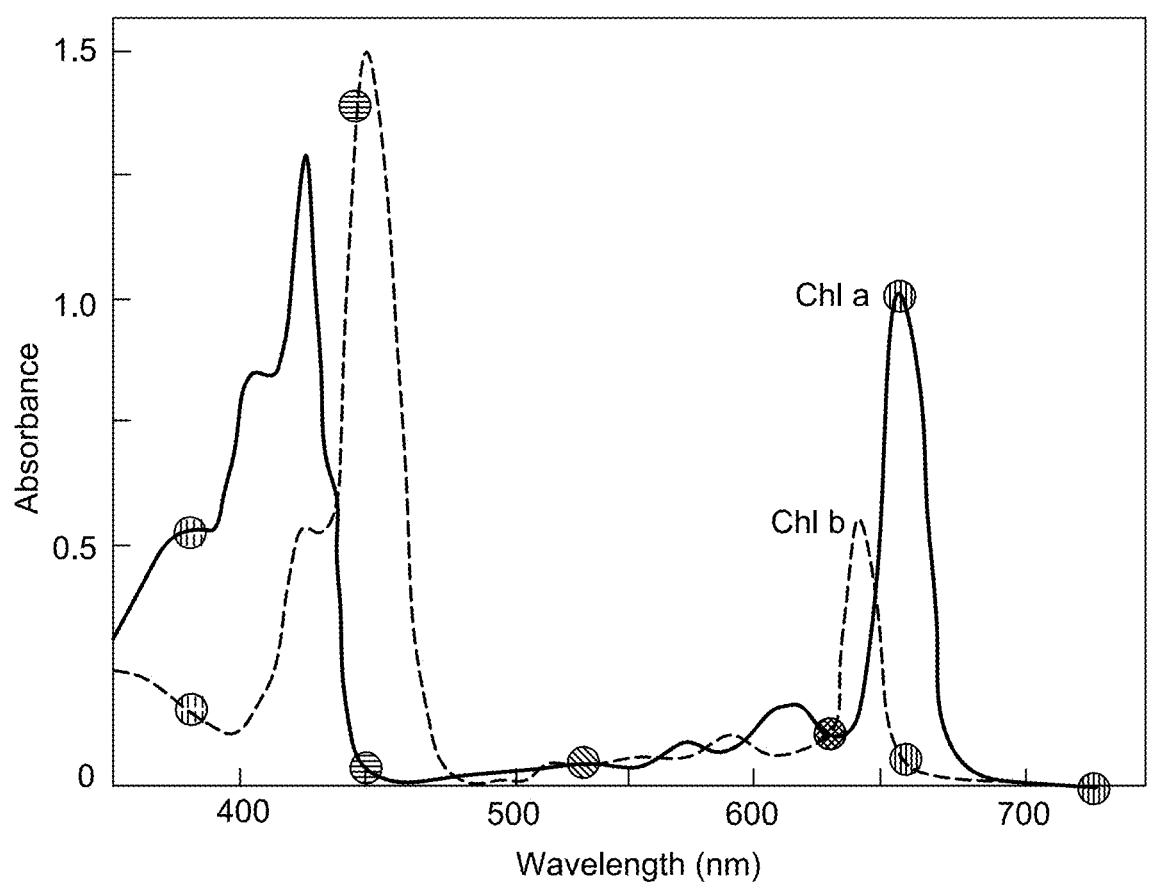
FIG. 21 shows the spectral absorbance of chlorophyll a and chlorophyll b.

The method of extracting discrete values from known spectra to create labelled feature sets may be applied to any known spectra of interest. For example, FIG. 20 shows relative absorbance values for various plant-related compounds, including chlorophyll a (Chl-a), chlorophyll b (Chl-b), light harvesting complex II (LHCII), chlorophyll d (Chl-d), and bacteriochlorophyll a (BChl a). As shown, the various chemical compounds exhibit different absorption peaks, which may be used to identify and distinguish between the compounds. FIG. 21 shows absorbance values for chlorophyll a (Chl a) and chlorophyll b (Chl b). FIG. 21 illustrates the absorbance values that may be extracted from the spectra corresponding to eight narrowband irradiator wavelengths (wavelengths (365 nm, 450 nm, 530 nm, 630 nm, 660 nm, 730 nm, 860 nm, and 950 nm) using circles. The extracted data may be used to create feature sets for the presence of chlorophyll a and chlorophyll b. As shown, the extracted values at the eight wavelengths are easily distinguishable.

The image processor 5000A may detect various conditions of interest using the acquired imagery and/or sensory data and the reference condition library. Spectral and sensory features measured by the imaging system 5050A may represent certain plant properties. These measured features may be used to characterize the plants by comparing them to labeled feature sets. The measured features may be correlated with reference conditions in a reference condition library 5120A. For example, the image processor 5000A may identify conditions such as plant type, growth stage, disease, nutrient deficiencies, nutrient related traits, chemical composition, chlorophyll estimation, and biotic and abiotic stresses. Certain parts of plants (e.g., flowering sites) and/or morphological characteristics may also be identified in an image.

As another example, the image processor 5000A may detect various chemical compounds based on their respective peak absorptance and/or peak reflectance including, but not limited to, mold, mildew, photosynthetic compounds, water, $NO_3$, $NO_2$, $P_4$, $K^+$, $C_2H_4$, $CH_4$, $O_2$, $CO_2$, and thermal radiation (e.g., LWIR radiation). The presence of these compounds may vary between different plant species. For a particular plant species, the amount of these compounds relative to a nominal baseline, as measured by the imaging system 5050A, may provide valuable information on various aspects of the plant's development including, but not limited to, the stage of development, prospective crop yield, appearance, nutritional composition, structural integrity, flowering, and pollination.

The data collected by the imaging system 5050A may be used to monitor the development of plants and/or to provide feedback to adjust other components of the CEH (e.g., the total intensity or spectral intensity of the light emitted by the illuminating light sources) in order to improve the health and growth of the plants. For example, if the imaging system 5050A detects damage to the plants caused by pests, the illuminators may be adjusted to illuminate the plants with more UV light as a form of repellant. In another example, the imaging system 5050A may detect the presence of mildew in the environment. In response, illuminators may increase the amount of UV light at 275 nm as a countermeasure. In another example, the imaging system 5050A may acquire data over time to assess changes to the plant during a typical day/night cycle (e.g., blooming for short day/long day plants). This information may be used to alter when the plant blooms by adjusting the illuminators to illuminate the plants with more/less near infrared light (e.g., 730 nm light). In this manner, plants may be grown at a faster rate. The imaging system 5050A may also characterize the morphology of the plants, which in turn may be modified by illuminating the plants with radiation at different wavelengths (e.g., 730 nm wavelength radiation).

The processor 5000A may also be used to manage data communications (e.g., wired communication via Ethernet cables or wireless communication, including sending control signals to the imagers/sensors 1005 and receiving imagery and sensory data measured by the imagers/sensors 1005 for processing and/or transmission to a remote device (e.g., a remote computer or server). Acquired images and/or sensory data may be stored locally or on a remote server.

Figure 22:
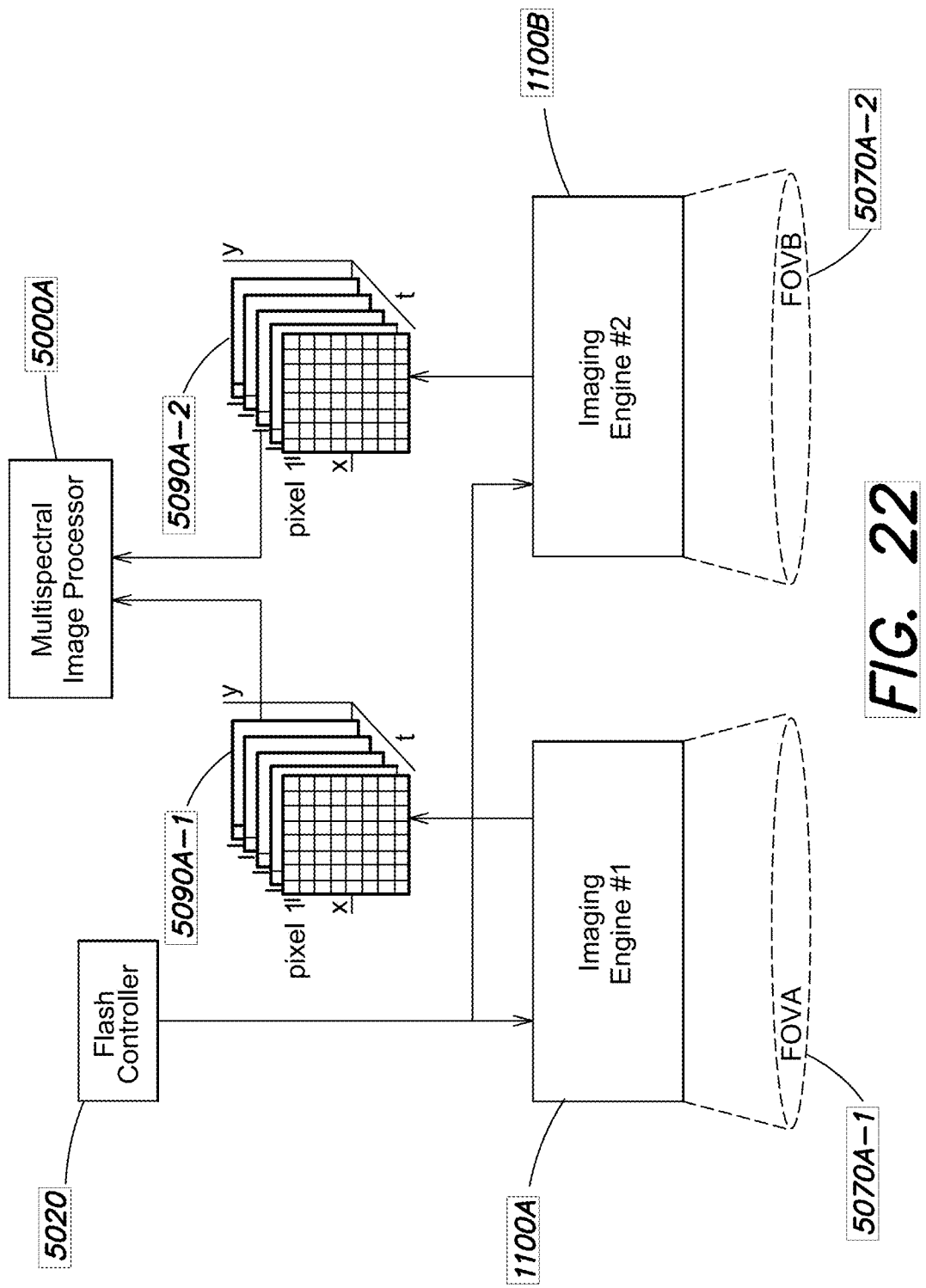
FIG. 22 illustrates a multispectral imaging system according to one inventive implementation.

The imaging system 5050A may include more than one imaging engine 1100 to image/sense a greater portion of the environment. For example, FIG. 22 illustrates an imaging system with two imaging engines 1100A and 1100 B, respectively. Each imaging engine may be controlled by the same or different flash controllers 5020. Each imaging engine may include at least one imager/sensor 1005 that defines each imaging engine's field of view 5070. The two imaging engines may have separate fields of view, 5070A-1 and 5070A-2, respectively. The two imaging engines may have partially overlapping fields of view. In this case, the image processor 5000A may easily overlay and/or stitch together images acquired by each imaging engine. Overlapping fields of view may provide a higher resolution, more continuous multispectral image. Alternatively, the fields of view 5070A-1 and 5070A-2 may not overlap with non-overlapping images 5090A-1 and 5090A-2. In this case, the resulting multispectral image may have a lower resolution and/or be less continuous. However, this configuration may provide larger multispectral images covering a greater portion of the environment.

In some implementations, the various camera(s)/sensor(s) 1005 may acquire imagery 5090 at different fields of view 5070. Thus, the images may be orthographically corrected prior to stitching to ensure the multisensory image does include distortions cause by the different fields of view. Said in another way, the images may be orthographically corrected to ensure each of the images represents a substantially similar orthographic view of the imaged object(s) and/or environment.

Figure 23:
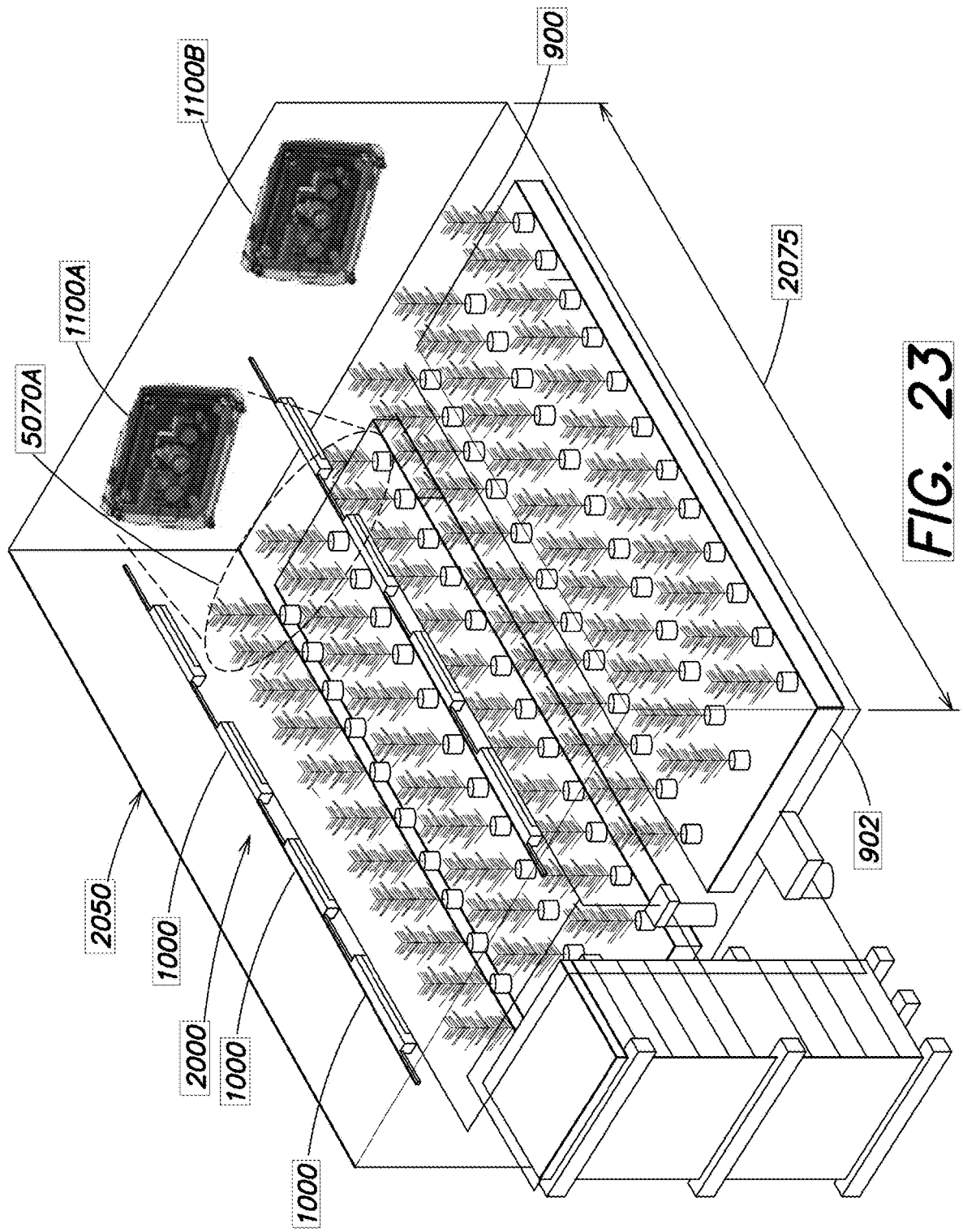
FIG. 23 illustrates a multispectral imaging system in a CEH system.

In some implementations, the one or more imaging engines 1100 may be stand-alone modules or may be integrated with other components of the CEH system. FIG. 23 shows two imaging engines 1100A and 1100B integrated with a CEH system 2000. An imaging engine may be mounted in the CEH system 2000 so that its field of view 5070A includes a plurality of plants 900 on a shelf 902 or other support structure.

One or more imaging engines may be integrated with or disposed on lighting fixtures 1000 providing artificial lighting in a CEH system 2000. In this case, the lighting fixtures 1000 may define a (x,y) coordinate plane that may be used to index the position of each imaging engine and the acquired imagery. Alternatively, an imaging engine may be coupled to a lighting fixture 1000 via a wired connection. For example, an imaging engine may be coupled to the ports of a lighting fixture 1000 via a PoE cable or USB cable. In another example, the imaging engine may be coupled to a remote device (e.g., a computer, a server) that controls one or more illuminators via a separate wired connection. The imaging engine may also be coupled to an illuminator or a remote device via a wireless connection.

In one aspect, a stand-alone imaging engine may provide greater ease in installation and replacement. For example, the imaging engine may be readily connected (or disconnected) from a lighting fixture 1000. The plug-and-play configuration allows the imaging engine to be installed at any desired lighting fixture 1000 in the CEH system 2000. In some implementations, the imaging engine may also be disconnected from a lighting fixture for maintenance or replacement with an updated and/or different imaging engine.

In another aspect, the imaging engine may provide greater flexibility in terms of deployment in an environment. For example, the imaging engine may be installed for a subset of the lighting fixtures 1000 present in the environment depending on the desired coverage of the environment. The imaging engine may also be installed without being constrained to the locations of lighting fixtures in the CEH system. Thus, the coverage provided by the lighting fixture and the imaging engine may be decoupled. Additionally, the imaging engine may be oriented such that the field of view covers the environment from different perspectives (e.g., a side view of the plant stems, a top-down view of the plant leaves). Different perspectives may provide a means for acquiring 3D imagery.

An Exemplary Multisensory Imaging System Using a Distributed Sensor Grid

In some implementations, a multisensory imaging system may provide an array of sensors integrated into the CEH system to collect various types of measurements. The sensors may be arranged spatially within the CEH system to collect measurements from a large portion of the CEH system.

In one exemplary implementation, multiple sensors are distributed in a CEH system as a distributed sensor grid. The distributed sensor grid includes one or more node arrays, where each node array divides at least a portion of the controlled agricultural environment into nodes, e.g., discrete points in space which have a known location (e.g., absolute or relative) in the environment. In various aspects, a given node array of a distributed sensor grid may be one dimensional, two dimensional, or three dimensional (e.g., based at least in part on the distribution of growing areas and/or crops in the controlled agricultural environment). For example, in some implementations, a given node array may include multiple nodes arranged in a substantially linear or curvilinear fashion spaced along a row of plants to provide a one-dimensional node array. Another type of node array may include multiple nodes arranged in a horizontal plane substantially parallel to a floor or a ceiling in the CEH system to provide a two-dimensional node array. Yet another type of node array may include multiple nodes arranged in multiple horizontal planes substantially parallel to the floor or ceiling in the CEH system, wherein the respective horizontal planes of nodes constitute multiple vertical levels corresponding to different zones of interest in the controlled growing environment (e.g., the soil, the plant, the lighting canopy, and the ambient environment).

The distributed sensor grid may act as a compound-eye in the CEH system. Each sensor node may act as a spatially-indexed pixel, and together the pixels may form a compound-eye multisensory image. The dimensionality of the node array determines the dimensionality of the multisensory image. For example, a node array arranged in a substantially linear fashion along a row of plants provides a 1D multisensory image. A node array arranged in a horizontal plane substantially parallel to a floor in the CEH system provides a 2D multisensory image. A node array arranged in multiple horizontal planes substantially parallel to the floor in the CEH system provides a 3D multisensory image.

Figure 24:
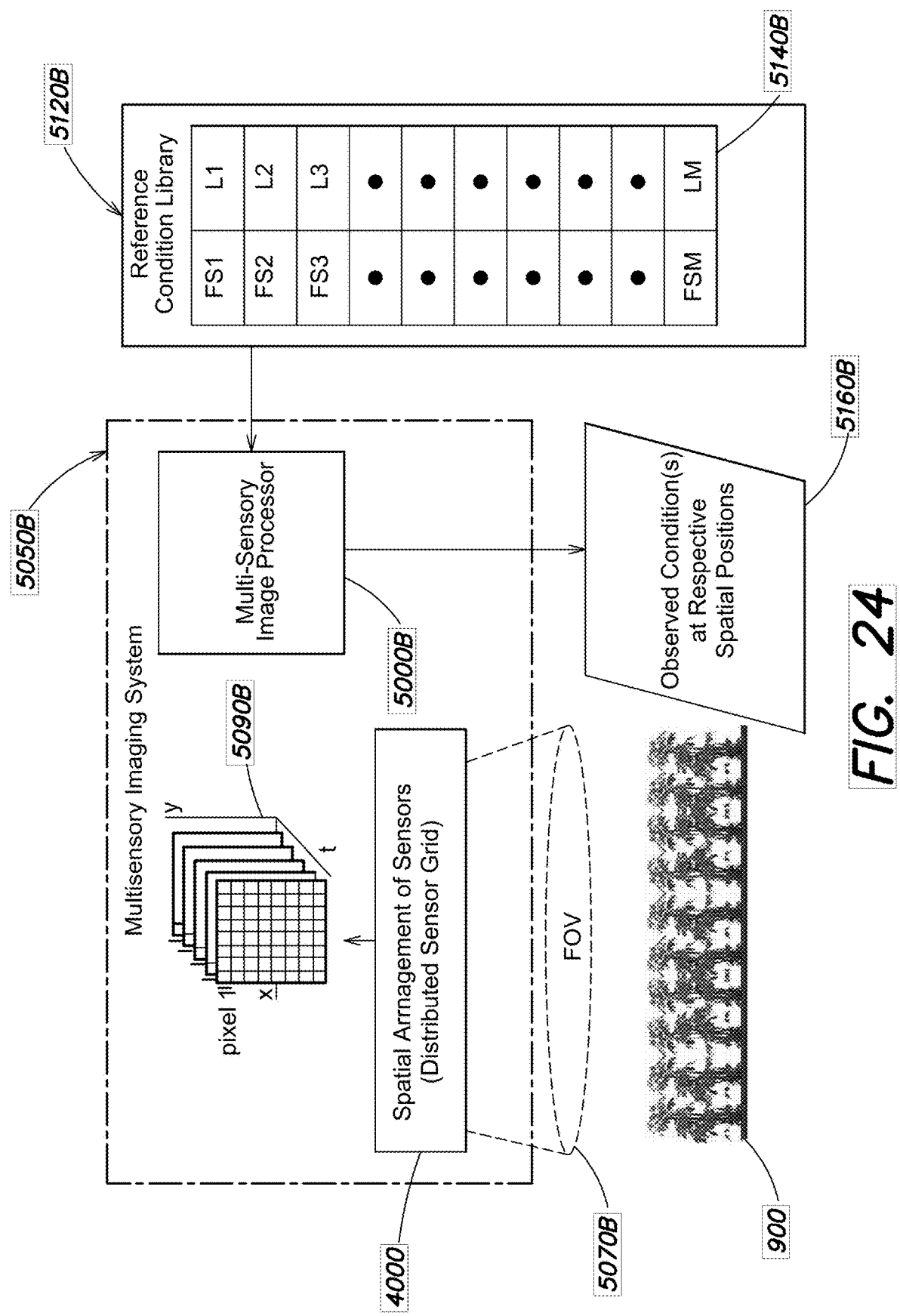
FIG. 24 illustrates a multisensory imaging system according to one inventive implementation.

FIG. 24. shows an exemplary implementation of a multisensory imaging system 5050B with a distributed sensor grid 4000. The multisensory imaging system 5050B may collect various types of sensory data at each node in the distributed sensor grid 4000. The spatial arrangement of the node array defines the field of view 5070B. Various objects of interest may be included in the field of view 5070B, including a zone of interest in a CEH system or a plurality of plants 900. The imaging system 5050B may generally include a multisensory image processor 5000B. The multisensory image processor 5000B may compile sensor data to generate compound-eye multisensory imagery. The processor 5000B may use a reference condition library 5120B to determine conditions of interest 5160B in the multisensory imagery.

Figure 25:
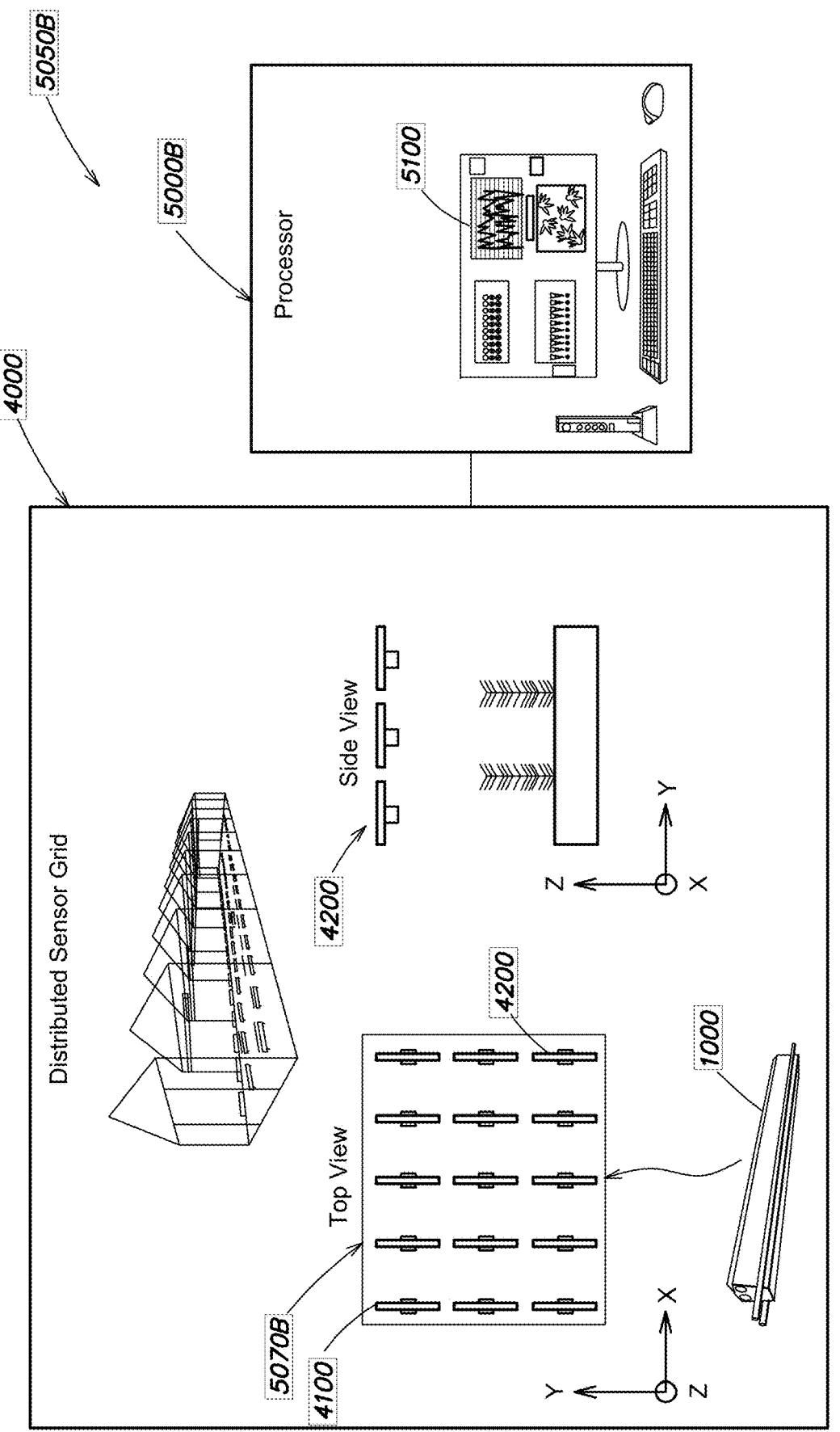
FIG. 25 illustrates a 2D sensor grid according to one inventive implementation.

FIG. 25 shows an exemplary implementation of the multisensory imaging system 5050B in a CEH system. The distributed sensor grid 4000 includes one or more node arrays 4100, and each node array contains multiple nodes 4200 respectively positioned at corresponding coordinate locations (e.g., x, y, and z coordinates) in the controlled agricultural environment. At a given node 4200, the distributed sensor grid further includes one or more sensors 4220 deployed at the node to monitor growth conditions in proximity to the node. In the example illustrated in FIG. 25, the distributed sensor grid is arranged as a two-dimensional node array, in which an arrangement of lighting fixtures 1000 constitutes a horizontal plane of nodes defined by an x-axis and a y-axis of the node array (see "Top View").

Node Array

Each node array 4100 covers at least a portion of an agricultural environment. In some controlled agricultural environments, one node array may be sufficient given a particular number and arrangement of plants in a growing area, while in other environments multiple node arrays may be employed to flexibly configure a distributed sensor grid (in some instances over multiple growing areas in the environment with different layouts and/or different crops). For example, in vertical farming (in which different growing areas are stacked one on top of another in a vertical arrangement), one or more node arrays 4100 can be used for each vertically-stacked growing area in the environment. In another example, an agricultural environment can be divided into separate climate-controlled rooms with each room having one or more node arrays 4100. Each node array 4100 divides the covered portion of the agricultural environment into a grid of nodes 4200, where each node 4200 is a discrete point with a known coordinate location within the node array 4100. As noted above, respective nodes 4200 can include one or more sensors 4220 to monitor growth conditions proximate to a given node (e.g., in a volume of space around the node, which may depend in part on the type(s) of sensor(s) deployed at the node). In some implementations, the number of nodes 4200 in a node array 4100 can depend upon the constraints imposed on or by the agricultural environment.

The coordinate location of each node 4200 can include one or more coordinate components to describe the location of a node 4200 in the agricultural environment. In some implementations, the coordinate location of a node 4200 can correspond to a physical location in the agricultural environment with reference to a spatial origin. For example, the corner of a growing area can be set as the origin of the coordinate system and nodes 4200 can be defined at known and/or defined distances from the origin along one or more axes (e.g., respective X, Y, and Z axes). In some implementations, the coordinate location can correspond to an indexed location related to one or more aspects of the physical arrangement of the agricultural environment (e.g., dimensions and/or shape of one or more growing areas, arrangement of plants in a given growing area, arrangement of control systems in a given growing area).

Figure 26:
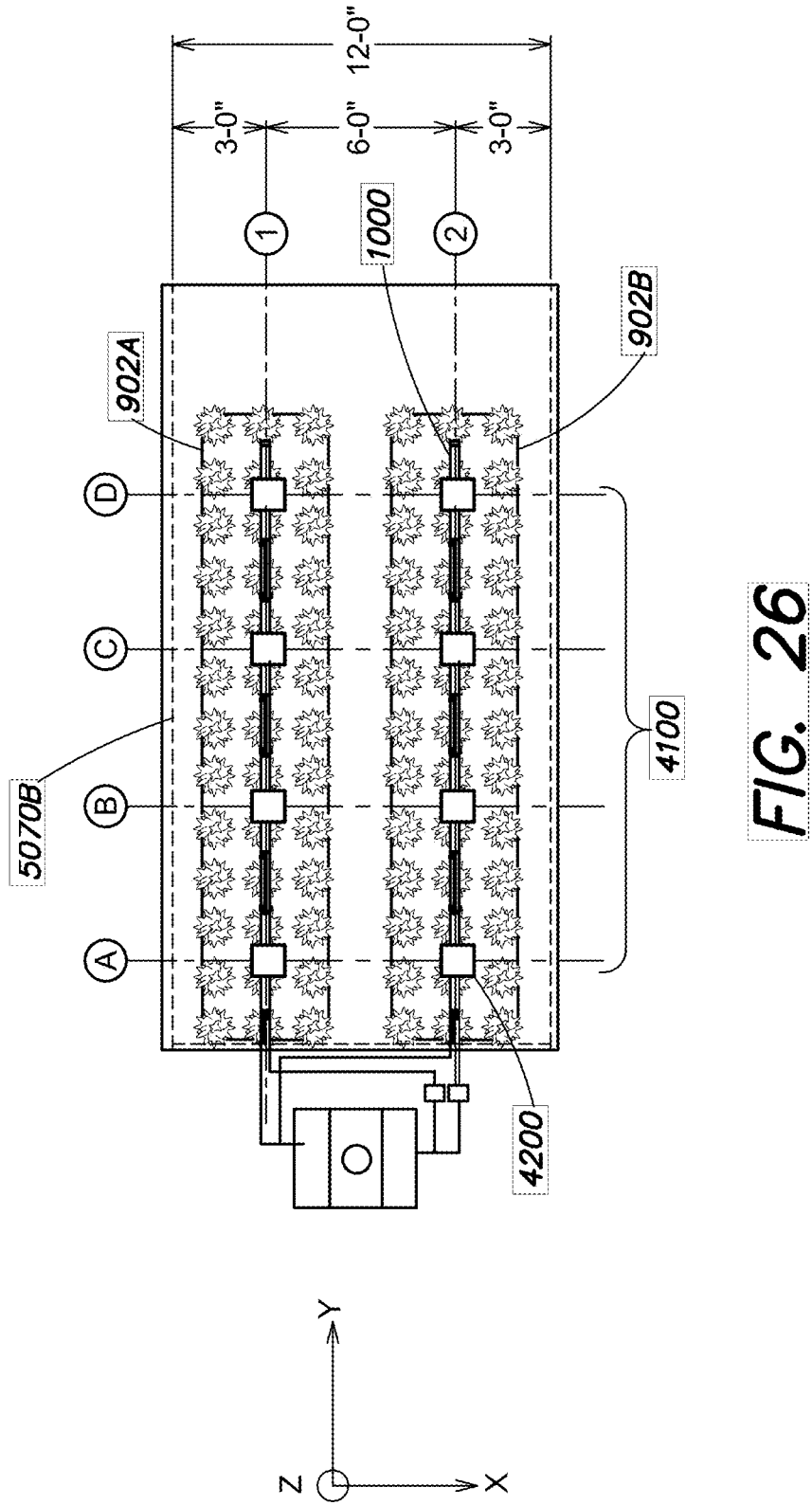
FIG. 26 shows the 2D sensor grid of FIG. 25 in a CEH system according to one inventive implementation.

FIG. 26 shows a top-down view of a 2D node array 4100 of an imaging system 5050B indexed according to x and y coordinates so that each node may act as a pixel. Spatially indexed nodes may act as pixels in compound-eye multisensory imagery. FIG. 26 illustrates an agricultural environment that includes two elongated shelves 902A and 902B disposed next to each other at some spacing in a growing area. Three rows of plants are positioned next to each other on each shelf along the long length of the shelf. Above each shelf, positioned generally over the middle row of the three rows of plants, are four lighting fixtures 1000. In this example, a y-axis for the node array is chosen parallel to the long length of the shelves 902A and 902B (and, accordingly, the x-axis is parallel to the short width of the shelves). The center lines of the shelves themselves along the length (e.g., halfway across the width of a shelf) define indexed positions 1 and 2 along the x-axis, and the four lighting fixtures 1000 disposed above each of the shelves 902A and 902B respectively define indexed positions A, B, C, and D along the y-axis (e.g., the centers of the lighting fixtures may correspond with the indexed positions A through D). As discussed in greater detail below, it should be appreciated that the example node array of FIG. 26 based on two shelves of plants, four lighting fixtures per shelf, and four vertical levels is provided primarily for purposes of illustration, and that other node array configurations are contemplated according to the present disclosure. For example, one can easily envision a 1D sensor array arranged in a similar fashion.

Sensors

One or more sensors 4220 can be deployed at a particular node 4200 to monitor parameters relevant to growth conditions. The sensors 4220 can include, but are not limited to, a visible light sensor, a UV light sensor, an air temperature sensor, a relative humidity sensor, an airflow sensor, a CO2 sensor, an IR temperature sensor, a chemical sensor, a pH sensor, and cameras configured to capture still images or videos of the agricultural environment with various spectral qualities, as described above. In some implementations, multiple sensors 4220 can be packaged into an integrated sensor assembly to simplify wiring and ease of installation. Each node 4200 in a node array 4100 can also include different combinations of sensors 4220 pertinent to the region of the environment the node 4200 is located in. For example, different types of sensors 4220 may be deployed according to the object of interest in an environment.

Figure 27:
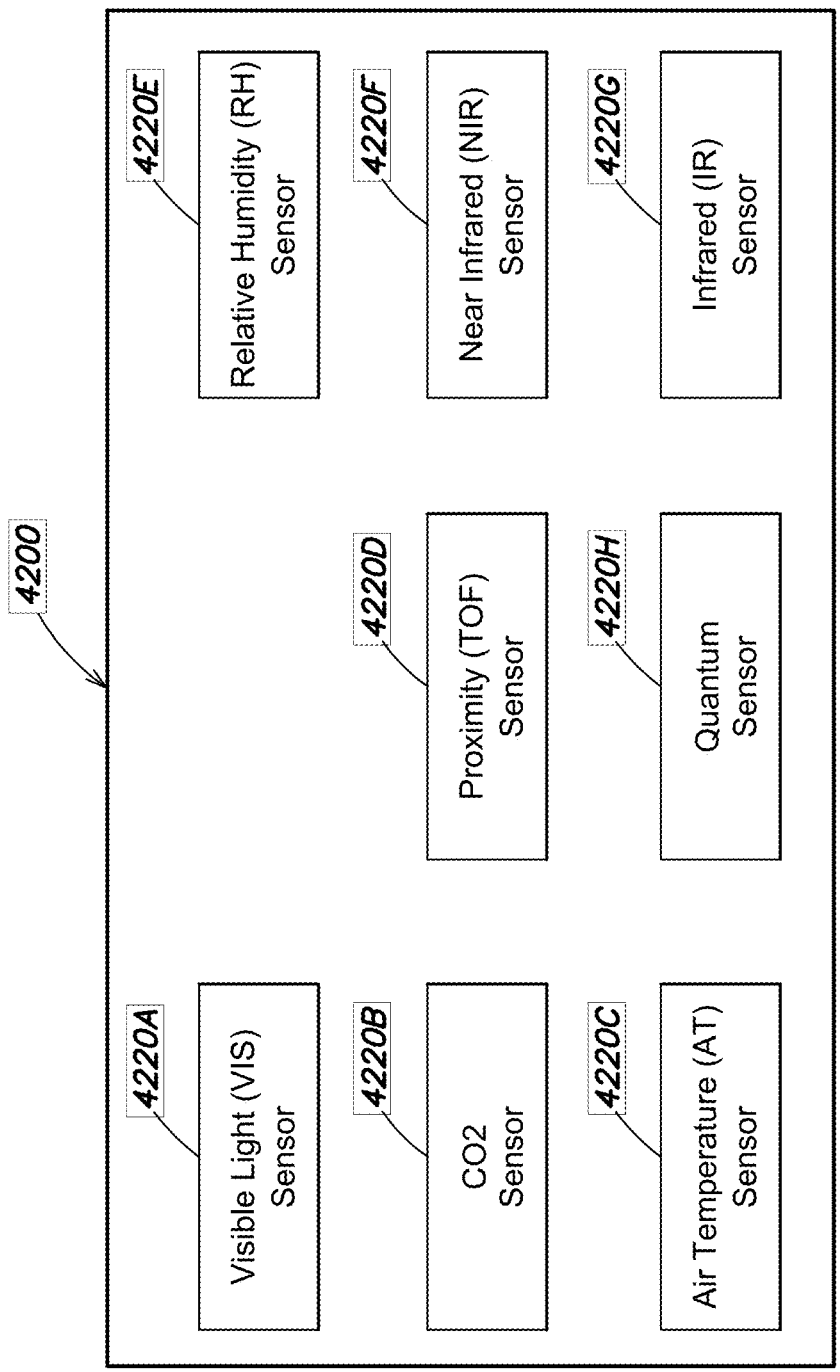
FIG. 27 is a block diagram of several sensors at a sensor node, according to some implementations of the disclosure.

FIG. 27 shows a block diagram of sensors 4220 at a particular node 4200 according to an exemplary implementation. A particular node 4200 may include a visible light sensor 4220A to measure visible radiation, a $CO_2$ sensor 4220B to measure $CO_2$, an air temperature sensor 4220C to measure air temperature, a proximity sensor 4220D to determine a distance, a relative humidity sensor 4220E to measure relative humidity, a near infrared (NIR) sensor 4220F to measure NIR radiation, an infrared sensor 4220G to measure infrared radiation, and a quantum sensor 4220H to measure a photon amplitude. Examples of each of these sensors are listed in a previous section.

Multisensory Imagery

Figure 28:
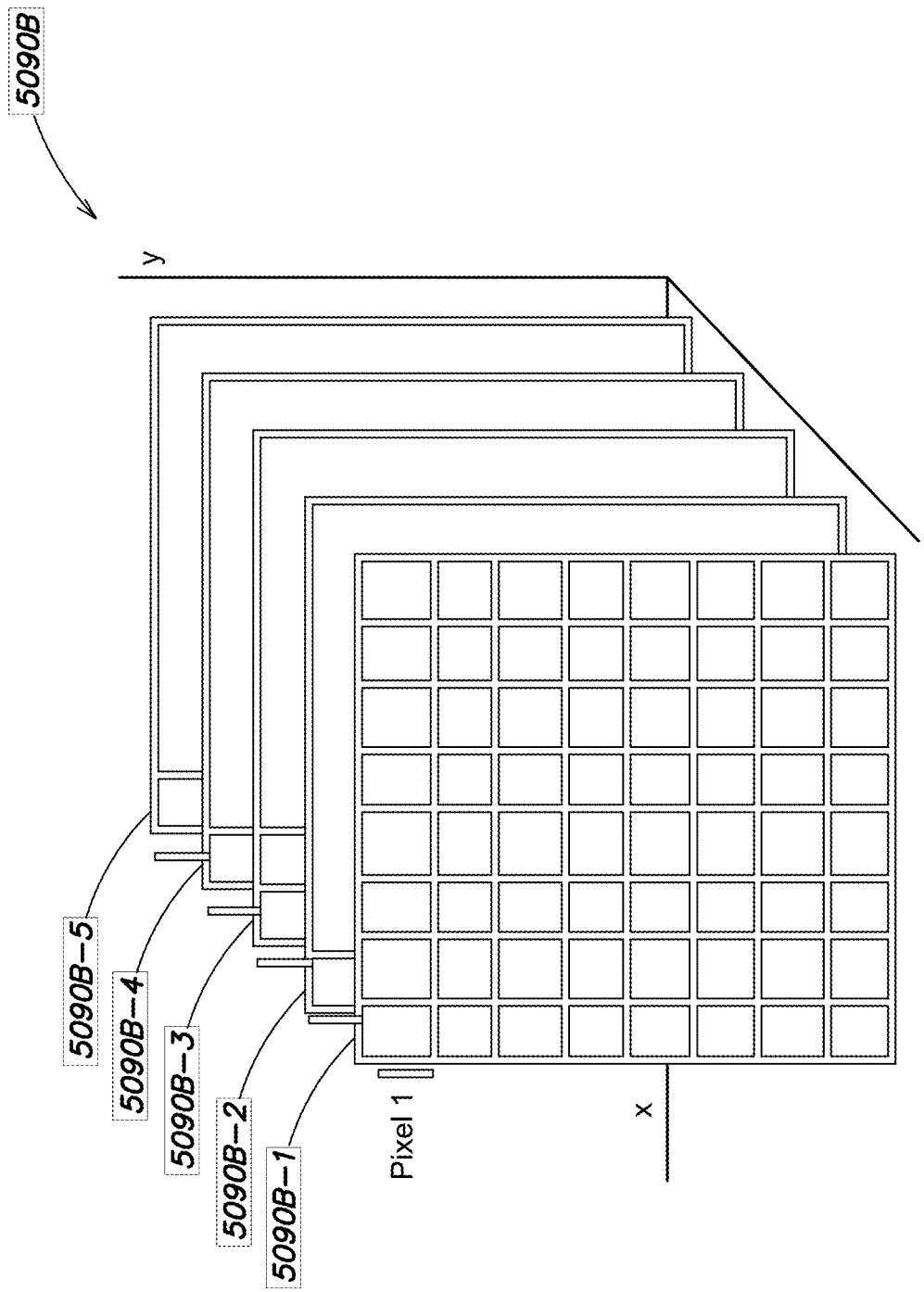
FIG. 28 shows constituent sensory images compiled from sensor information collected by a multisensory imaging system.

FIG. 28 shows an exemplary set of discrete sensory compound-eye images 5090B-1-5090B-5 acquired by the multisensory imaging system 5050B. Each sensor node 4200 has a measured value for each sensor 4220. Each sensor node acts as a spatially-indexed pixel, and together the plurality of pixels form a compound-eye image. FIG. 28 shows an exemplary set of compound-eye images corresponding to measurements from different sensors. Image 5090B-1 corresponds to $CO_2$ measurements. Image 5090B-2 corresponds to relative humidity measurements. Image 5090B-3 corresponds to distance measurements. Image 5090B-4 corresponds to NIR radiation measurements. Image 5090B-5 corresponds to visible radiation measurements. These discrete images 5090B-1-5090B-5 may be overlaid to produce a multisensory image. FIG. 28 shows five discrete images corresponding to five sensed conditions in the space occupied by the set of nodes. However, any number of compound-eye sensory images could be acquired by the imaging system 5050B, depending on the number of different sensors 4220.

Generally, the multisensory image generated by the imaging system 5050B includes a plurality of pixels (nodes). Each pixel has a vector of measured values corresponding to each sensor type. The vector of values may provide the basis for a feature set for a machine learning or deep learning algorithm to facilitate identification of conditions of interest 5160B. The values measured at each pixel may be featurized so that they are suitable for input into an algorithm. In other words, the measured pixel values may be represented by a set of structured mathematical representations called features. In this way an algorithm may identify conditions of interest 5160B from real-time measurements, non-destructively and in situ, on a pixel-by-pixel basis. Particular values in a given feature set representing a condition of interest can be labeled ("annotated") and thereby facilitate model training for use in machine learning matching (e.g., with a confidence value) to identify conditions of interest observed in real time measurements of an object (e.g., plant(s)).

Figure 29:
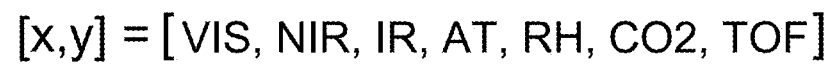

FIG. 29 shows an exemplary 2D image feature set of seven values measured by seven sensors in the multisensory imaging system 5050B. The feature set includes values for measures of visible radiation (VIS), near infrared radiation (NIR), infrared radiation (IR), air temperature (AT), relative humidity (RH), carbon dioxide ($CO_2$), and distance (TOF). For a given use-case, any subset of the available features may be picked to define a feature set for a given measurement exercise. In other words, the feature set may have 2, 3, 4, or more elements. Not all measurements may be needed to identify the condition of interest.

FIG. 30 shows a reference condition library 5120B including a plurality of labeled conditions 5140B, which may be used to observe conditions 5160B. The reference condition library 5120B may include a plurality of labeled feature sets corresponding to various reference conditions. A machine learning algorithm may be used to compare and correlate experimental results to the reference condition library 5120B to determine if one or more reference conditions are present in the 2D image on a pixel-by-pixel basis.

Figure 31:
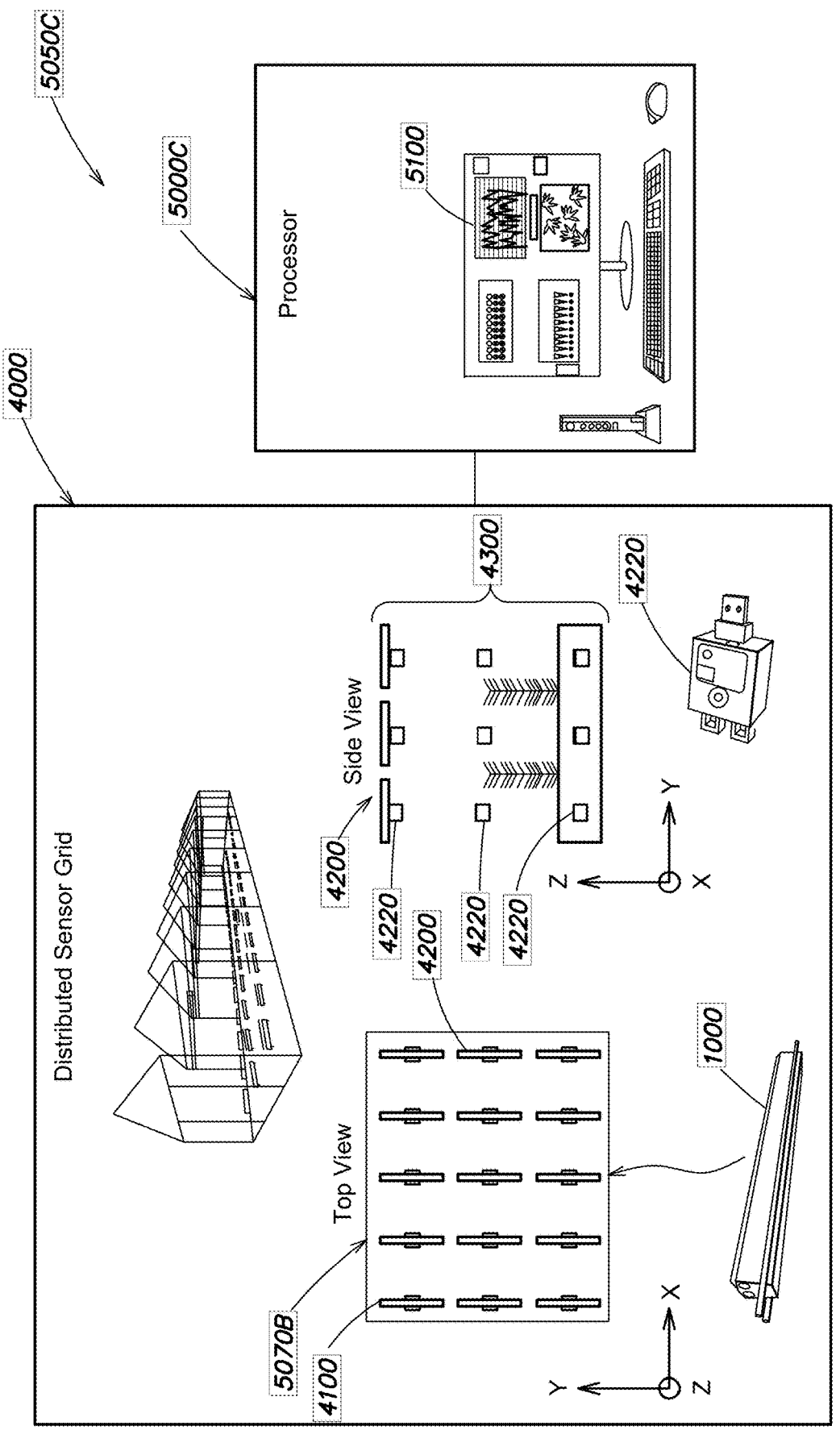
FIG. 31 illustrates a multisensory imaging system's 3D sensor grid according to one inventive implementation.

In the example illustrated in FIG. 31, the distributed sensor grid is arranged as a three-dimensional node array, in which an arrangement of lighting fixtures 1000 constitutes a horizontal plane of nodes defined by an X-axis and a Y-axis of the node array (see "Top View") and the node array also includes multiple vertical levels 4300 along a Z-axis (e.g., respectively corresponding to a soil level, a plant level, and a light canopy level; see "Side View"). One or more sensors 4220 may be placed at multiple nodes or each node of the node array to comprehensively monitor growth conditions in the environment.

Figure 32C:
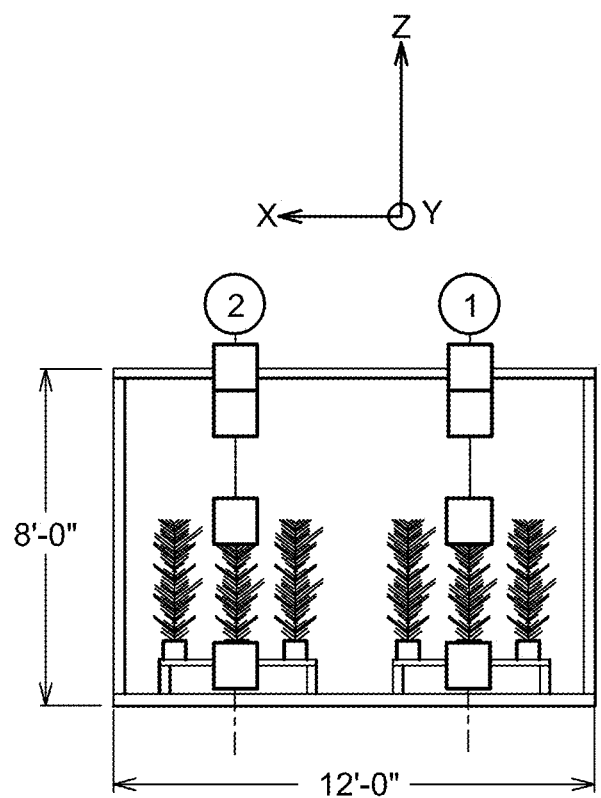
FIG. 32C shows a front view of the multisensory imaging system of FIG. 31.

FIG. 32 shows a top-down view of a 3D node array 4100 of an imaging system 5050B indexed according to x, y, and z coordinates so that each node may act as a pixel in a 3D image. FIG. 32 illustrates an agricultural environment that includes two elongated shelves 902A and 902B disposed next to each other at some spacing in a growing area. Three rows of plants are positioned next to each other on each shelf along the long length of the shelf. Above each shelf, positioned generally over the middle row of the three rows of plants, are four lighting fixtures 1000. In this example, a y-axis for the node array is chosen parallel to the long length of the shelves 902A and 902B (and, accordingly, the x-axis is parallel to the short width of the shelves). The center lines of the shelves themselves along the length (e.g., halfway across the width of a shelf) define indexed positions 1 and 2 along the x-axis, and the four lighting fixtures 1000 disposed above each of the shelves 902A and 902B respectively define indexed positions A, B, C, and D along the y-axis (e.g., the centers of the lighting fixtures may correspond with the indexed positions A through D). The z-axis for the node array is taken along the vertical height of the environment and is divided in the example of FIG. 32 into four indexed positions or "levels" 4300 (respectively labeled as L1, L2, L3 and L4). Thus, in the example of FIG. 32, there are a total of 32 nodes 4200 in the node array 4100 of the distributed sensor grid.

Figure 33:
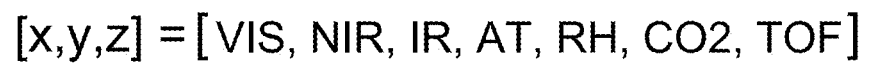

FIG. 33 shows an exemplary 3D image feature set of seven values measured by seven sensors in the multisensory imaging system 5050B. The feature set includes values for measures of visible radiation (VIS), near infrared radiation (NIR), infrared radiation (IR), air temperature (AT), relative humidity (RH), carbon dioxide ($CO_2$), and distance (TOF). For a given use-case, any subset of the available features may be picked to define a feature set for a given measurement exercise. In other words, the feature set may have 2, 3, 4, or more elements. Not all measurements may be needed to identify the condition of interest. The reference condition library 5120B and a machine learning algorithm may be used to determine if one or more reference conditions are present in the 3D image on a pixel-by-pixel basis.

The nodes 4200 in the node array 4100 can also be configured to share power and network connections to simplify the integration of multiple sensors 4220 in the distributed sensor grid 4000. In some implementations a plurality of lighting fixtures 1000 can be used as a connectivity platform for the distributed sensor grid 4000. Sensors 4220 can couple to PoE ports or the USB ports for power and networking using cables or dongles. In some implementations, multiple sensors 4220 located at various levels 4300 can be connected to a single lighting fixture 1000. For example, a soil sensor can be connected via a long USB extension cable dangled from a USB port 1012B (e.g., an exemplary image is shown in FIG. 33S) and a lighting sensor can be connected directly to a PoE port. By connecting the plurality of lighting fixtures 1000 together, the sensors 4220 can also be connected thus forming a distributed array of sensors.

It should be appreciated that the example node array of FIG. 32 is provided primarily for purposes of illustration, and that other node array configurations are contemplated according to the present disclosure. For example, in some implementations in which the lighting fixtures 1000 serve as a connectivity platform for a distributed sensor grid, the number of nodes 4200 supported in a node array 4100 is based at least in part on the number of power and network ports available for connection with sensors 4220 deployed at respective nodes. For example, in the configuration of FIG. 32, each lighting fixture 1000 includes USB ports that may be employed to couple one or more integrated sensor assemblies to each fixture (wherein the assemblies serve as the sensors 4220 deployed at respective nodes; also, lighting fixtures 1000 may be equipped with one or more additional USB ports for this purpose). Each lighting fixture also includes PoE ports, any one or more of which ports may be employed to couple one or more sensors to each fixture.

In some implementations, the number of nodes 4200 can be determined by a user-defined density and/or coverage area in the agricultural environment. For example, an IR temperature sensor 4220G can have a finite field of view. An array of integrated sensor assemblies, each corresponding to a node 4200, can thus be installed and spaced apart such that the respective fields of view of the IR temperature sensors 4220G sufficiently overlap to effectively provide sensing coverage for the plants in the environment.

The distribution of nodes 4200 in the node array 4100 can also vary spatially and quantitatively. In some implementations, the nodes 4200 can be uniformly distributed. For example, a uniform array of lighting fixtures 1000 can be deployed with an integrated sensor assembly connected to USB ports on each lighting fixture 1000, as described above. In some implementations, the nodes 4200 distributed in the node array 4100 can be non-uniform. For example, the number of nodes 4200 may vary according to each level 4300 of a plant system where, for example, more nodes 4200 can be used to monitor soil quality than the ambient environment conditions due to variations in coverage by each type of sensor. In another example, an agricultural environment can include different plant species of varying size. The nodes 4200 can be more closely spaced for smaller-sized plants and sparser for larger-sized plants. Additionally, a node 4200 may not include a sensor 4220. Such empty nodes 4200 can be used to define a non-uniform distribution of sensors 4220 with a uniform distribution of nodes 4200. For example, soil quality sensors can occupy every node 4200 at the bottom level 4300 and ambient environment sensors can occupy every other node 4200 at the top level 4300 with empty nodes 4200 in between.

As described above, the node array 4100 can include multiple levels 4300 (e.g., along a z-axis) that correspond to various zones of interest in the controlled growing environment. Zones of interest in a plant system may include a soil level, a plant level, a light canopy level, and an ambient environment level. The soil level can provide data on soil conditions, such as pH value and chemical composition. The plant level can provide data on the leaf temperature or CO2 concentrations near the plant. The light canopy level can provide data on the illumination source, e.g., PPFD, air temperature, relative humidity, or heat dissipation or electrical power for the lighting fixture 1000. The ambient environment level can provide data on air circulation or the temperature of the walls or ceiling of the agricultural environment.

Control Systems

Distributed sensors in the agricultural environment can also be coupled to one or more control systems such that conditions determined by the multisensory imaging system 5050B may be used to adjust the operating parameters of one or more control systems. The control systems can include, but are not limited to, lighting, heating, air flow, hydronics, and humidity conditioning systems. For many agricultural environments, the control systems may be configured to affect growing conditions from a single or few locations in the environment. For example, HVAC systems affecting air flow may be dispersed intermittently along the wall or ceiling in an environment, thus affecting multiple nodes 4200 when operating parameters are changed. In another example, a lighting fixture 1000 can affect growing conditions at nodes 4200 located directly below and near the lighting fixture 1000. Thus, data acquired by one or more sensors 4220 can be used to adjust the control systems such that growing conditions across multiple nodes 4200 are improved or maintained.

Human Machine Interface

In some implementations, the distributed sensor grid 4000 can be connected to an image processor 5000B, as shown in FIG. 25. The processor 5000B can be a computer or a server, which processes and stores various data from the sensors 4220 in the distributed sensor grid 4000. The processor 5000 may also include a human-machine interface (HMI) 5100, an exemplary implementation of which is shown on a computer in FIG. 32, that allows users to monitor and control various aspects of the agricultural environment. For example, users may access various data obtained by the sensors 4220, view and display various data, and control one or more control systems, e.g., lighting, heating, air flow, hydronics, and humidity conditioning systems.

In some implementations, the HMI 5100 may enable users to select one or more nodes 4200 from an array 4100 in the distributed sensor grid 4000 and display the data collected by these nodes 4200 or conditions 5160B determined by the processor 5000B. To facilitate selection of nodes 4200, the HMI 5100 may include a representation of the agricultural environment. For example, FIG. 32 shows various top and side views of different arrangements of plants. The representation of the agricultural environment may be overlaid with data recorded by various sensors disposed in the distributed sensor grid 4000. The data shown may include, but is not limited to, the operating parameters of various control systems (e.g., power draw from lighting fixtures 1000, pump power in a hydronics system) and environmental parameters (e.g., air temperature, leaf temperature, air flow rate, relative humidity, PPFD, pH level). The HMI 5100 may also allow users to select different node arrays 4100 (e.g., separate growing areas or rooms in an environment), views of the environment (e.g., top view, side view, perspective view), and control systems coupled to the sensors 4220 (e.g., various lighting fixtures 1000). Data can also be updated in real-time, selected from list of recorded times, or displayed as an average over a period of time.

The HMI 5100 may allow users to display historical data or conditions 5160B determined by the processor 5000B as a function of time. For instance, the environment temperature, relative humidity, electrical power, temperature of a lighting fixture 1000, carbon dioxide concentration, entering water temperature (EWT), leaving water temperature (LWT), and system on a chip (SoC) temperature over a period of several days. Data can be recorded continuously in real-time or incrementally over set time increments (e.g., every 30 minutes, 60 minutes, and 3 hours).

The HMI 5100 may also allow users to adjust control systems (e.g., adjusting the output of a lighting fixture 1000 to simulate a sunrise and sunset). In some implementations, the processor 5000 may automate, at least in part, various controllable conditions based on data from one or more sensors 4420 and user-defined criteria (e.g., set temperature, relative humidity, CO2 concentrations).

As described above, one or more cameras may be coupled to the distributed sensor grid 4000 to record still images or video of a portion of the agricultural environment to allow users to remotely inspect the environment. In some implementations, the selection of a camera can be based on the proximity and field of view of a camera in relation to the nodes 4200 or a control system, e.g., a lighting fixture 1000, selected by a user. Images or video can be acquired on command by a user or recorded on a preset schedule.

An Exemplary Multi-Resolution Multisensory Imaging System

Figure 34A:
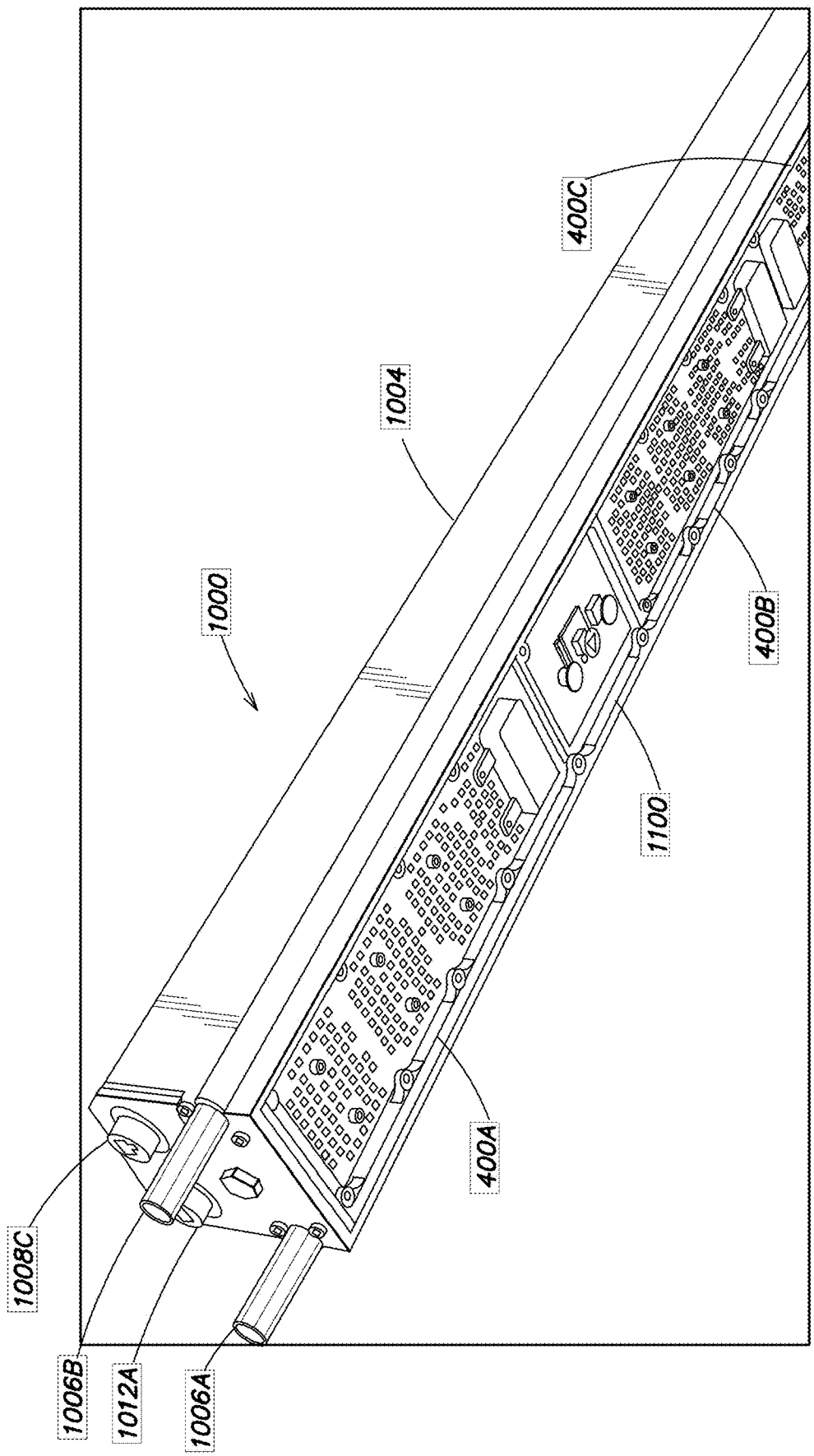
FIG. 34A shows a multisensory imaging system according to one inventive implementation.
Figure 34B:
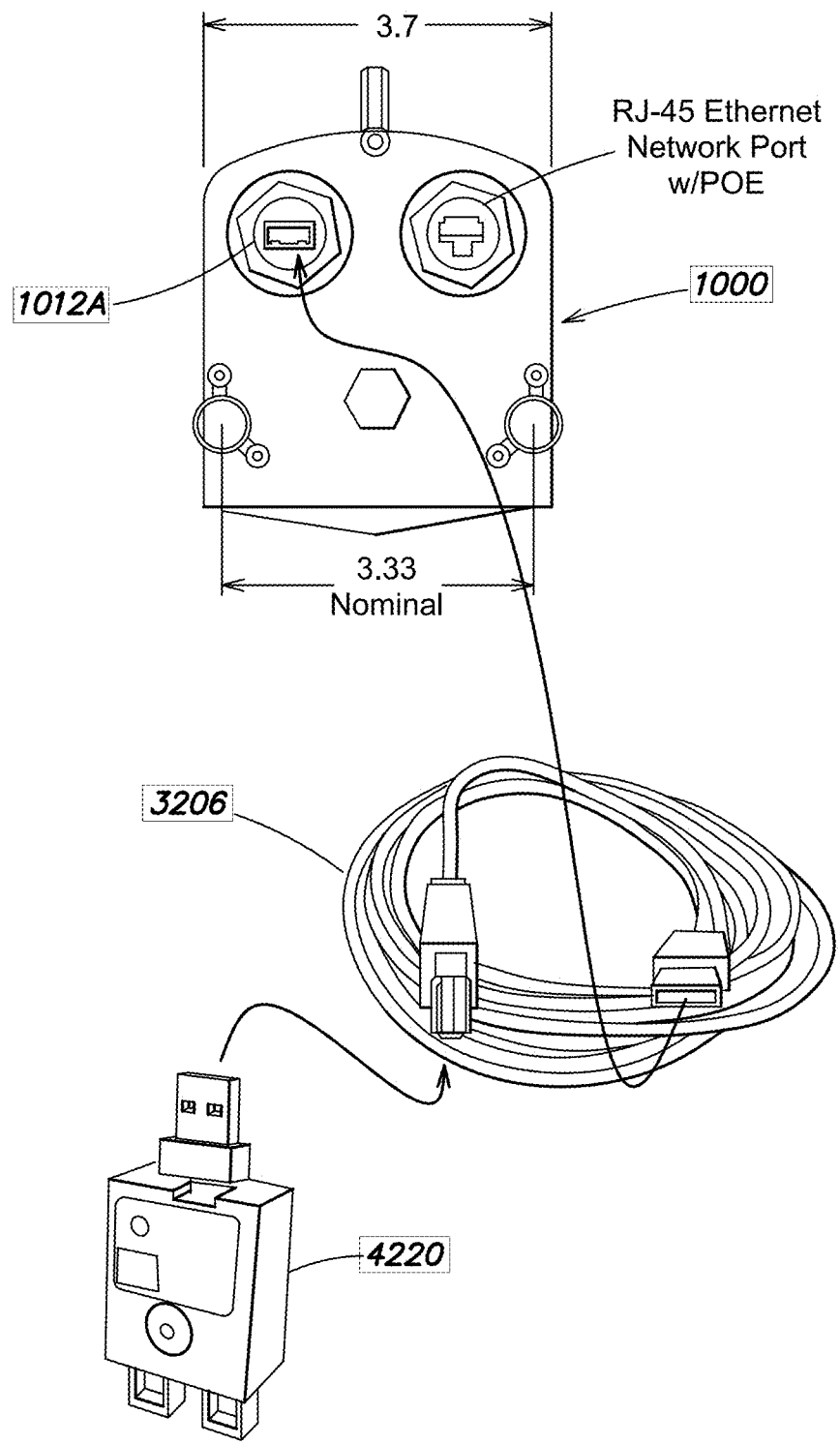
FIG. 34B shows another view of the multisensory imaging system in FIG. 34A.

FIGS. 34A and 34B show an exemplary implementation of a multi-resolution multisensory imaging system's sensor assembly integrated into a lighting fixture 1000 in a CEH system. The sensor assembly includes an imaging engine 1100 as described above in the section on an exemplary multispectral imaging system 5050A, as well as distributed point sensors 4220 as described in the section on an exemplary multisensory imaging system 5050B.

FIG. 34A shows a lighting fixture 1000 equipped with cameras/sensors 1005 as introduced in the discussion above, in which the cameras/sensors are integrated as a module serving as a multispectral imaging engine 1100 (also referred to herein as the "imaging engine 1100"). As shown in the figures, in one example implementation the imaging engine 1100 may be directly mounted to the frame 1004 between the LED light sources 400A and 400B. The lighting fixture 1000 may also include onboard cooling (e.g., cooling pipes 1006A and 1006B) and various communication ports (PoE ports 1008A-1008C, USB ports 1012A) for data transfer between the lighting fixture 1000 and another device (e.g., another lighting fixture 1000, a remote device, an accessory). In some implementations, the imaging engine 1100 may be electrically coupled to other components of the lighting fixture 1000 (e.g., control circuitry boards) to receive power and/or to transfer data to/from the imaging engine 1100.

FIG. 34B shows a sensor 4220 coupled to a side or end USB port 1012A of the lighting fixture 1000 shown in FIG. 34A via one or more cable-type USB couplers/extenders 3206, according to some implementations of the disclosure. The sensor node 4220 may be coupled to one end of a USB cable extender 3206, and the other end of the cable extender 3206 may be coupled to the USB port 1012A of the lighting fixture. Various lengths of cable extenders may be employed for the extender 3206 so as to position the sensor assembly 3100 at different distances below the lighting fixture 1000. The cable extender 3206 may be used alone, or together with one or more other cable extenders, one or more gooseneck-type extenders 3202, one or more adjustable angle-type extenders 3204, one or more other types of extenders, or combinations of the foregoing.

In some implementations, multiple sensors 4220 located at various levels 4300 can be connected to a single lighting fixture 1000. For example, a soil sensor can be connected via a long USB extension cable dangled from a USB port 1012B (e.g., an exemplary image is shown in FIG. 33S) and a lighting sensor can be connected directly to a PoE port. By connecting the plurality of lighting fixtures 1000 together, the sensors 4220 can also be connected thus forming a distributed array of sensors.

Figure 35:
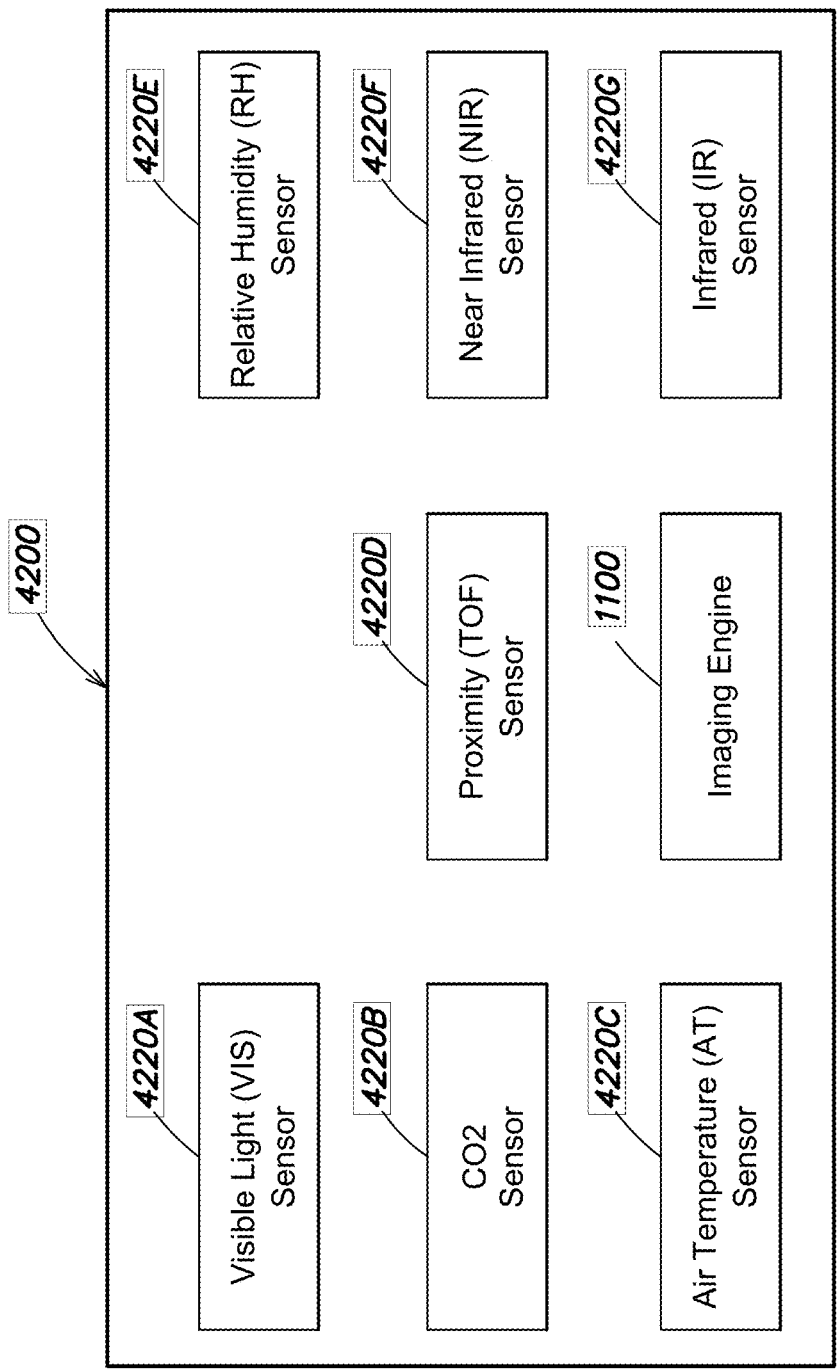
FIG. 35 is a block diagram of an imaging engine and several sensors at a sensor node, according to some implementations of the disclosure.

FIG. 35 shows an exemplary sensor array in a multi-resolution multisensory imaging system. The multisensory imaging system may include an imaging engine 1100 to acquire multispectral imagery, a visible light sensor 4220A to measure visible radiation, a $CO_2$ sensor 4220B to measure $CO_2$, an air temperature sensor 4220C to measure air temperature, a proximity sensor 4220D to determine a distance, a relative humidity sensor 4220E to measure relative humidity, a near infrared (NIR) sensor 4220F to measure NIR radiation, and an infrared sensor 4220G to measure infrared radiation. Examples of each of these sensors are listed in a previous section.

In some implementations, the imaging system 1100 may utilize the LED source 400 in the lighting fixture 1000 as an illumination source for acquiring imagery/spectra instead of the LED elements 1142. As described above, the LED source 400 includes one or more LED elements that emit radiation at known wavelengths. In some implementations, each LED element in the LED source 400 may be independently activated similar to the LED elements 1142. Thus, in some implementations, the imaging system 1100 may not include an onboard illumination source instead relying upon other illumination sources in the environment (e.g., the LED source 400).

Figure 36:
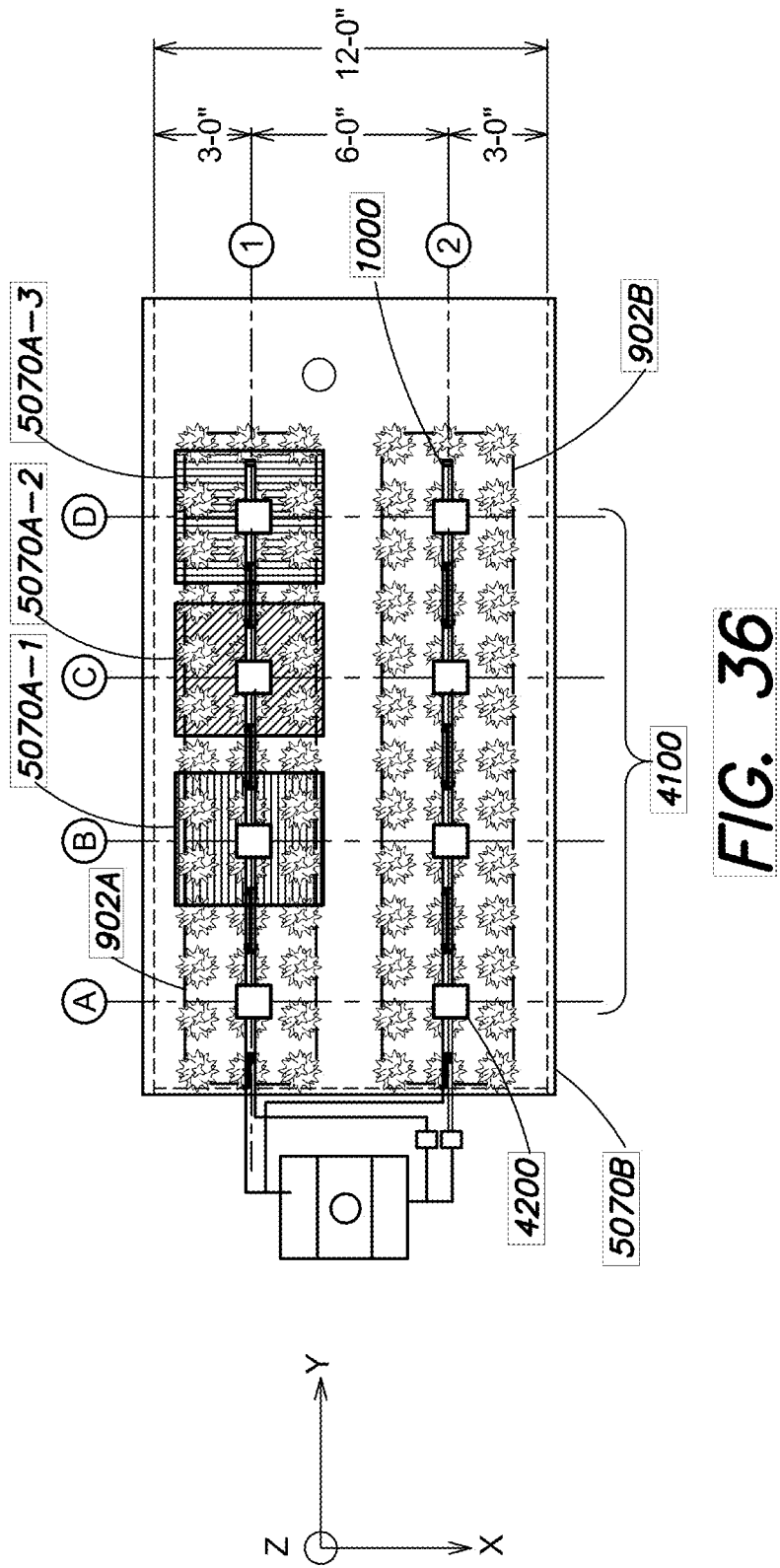
FIG. 36 is a top view of the multisensory imaging system of FIG. 34.

FIG. 36 illustrates the multi-resolution nature of this exemplary multisensory imaging system. In this example, each sensor node 4200 includes the sensor array described in FIG. 35, including an imaging engine 1100 and several point sensors 4220. Each imaging engine 1100 in the system defines a micro field of view 5070A-1-5070A-3. Multispectral images are acquired for each micro field of view 5070A-1-5070A-3. In addition, the point sensors 4220 at each sensor node 4200 act as a pixel in a macro field of view 5070B. Multisensory compound-eye images are generated using sensor measurements at each sensor node 4200.

A feature set of values at each pixel generated by the multisensory imaging system may include sensory data from point sensors 4220 and multispectral imaging data from the imaging engine 1100. The reference condition library 5120 and a machine learning algorithm may be used to determine if one or more reference conditions are present in the multisensory image on a pixel-by-pixel basis.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions, and arrangement of respective elements of the exemplary implementations without departing from the scope of the present disclosure. The use of a numerical range does not preclude equivalents that fall outside the range that fulfill the same function, in the same way, to produce the same result.

The above-described embodiments can be implemented in multiple ways. For example, embodiments may be implemented using hardware, software, or a combination thereof. When implemented in software, the software code can be executed on a suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in a suitable form, including a local area network or a wide area network, such as an enterprise network, an intelligent network (IN) or the Internet. Such networks may be based on a suitable technology, may operate according to a suitable protocol, and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Some implementations may specifically employ one or more of a particular operating system or platform and a particular programming language and/or scripting tool to facilitate execution.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A multispectral imaging apparatus, comprising:
at least one irradiation source including a plurality of narrowband irradiators in a first range of wavelengths from the ultraviolet (UV) regime to the short wavelength infrared (SWIR) regime;

at least one first camera to acquire UV-SWIR imagery in a first field of view and in the first range of wavelengths;
at least one second camera to acquire LWIR imagery in the first field of view and in the long wavelength infrared (LWIR) regime; and
at least one controller to control the at least one irradiation source and the at least one first camera, wherein the at least one second camera continually acquires the LWIR imagery while the at least one controller periodically activates the at least one first camera in combination with the at least one irradiation source to acquire the UV-SWIR imagery,
wherein the plurality of narrowband irradiators of the at least one irradiation source comprises a plurality of essentially monochromatic LEDs, wherein respective LEDs of at least some of the plurality of essentially monochromatic LEDs have different emission wavelengths in a range of from 275 nanometers (nm) to 2060 nanometers (nm); and
wherein the at least one controller is configured to, during operation of the multispectral imaging apparatus:
A) activate a first LED element of the plurality of essentially monochromatic LEDs to emit first radiation at a first wavelength;
B) during A), control the at least one first camera to acquire first UV-SWIR imagery;
C) deactivate the first LED element;
D) activate a second LED element of the plurality of essentially monochromatic LEDs to emit second radiation at a second wavelength;
E) during D), control the at least one first camera to acquire second UV-SWIR imagery; and
F) deactivate the second LED element.

2. The multispectral imaging apparatus of claim 1, wherein the different emission wavelengths of the respective LEDs of the at least some of the plurality of essentially monochromatic LEDs comprise at least two of 275 nm, 365 nm, 440 nm, 450 nm, 475 nm, 500 nm, 530 nm, 620 nm, 630 nm, 660 nm, 696 nm, 730 nm, 760 nm, 850 nm, 860 nm, 940 nm, 950 nm, 1450 nm, 1610 nm, or 2060 nm.

3. The multispectral imaging apparatus of claim 1, wherein the different emission wavelengths of the respective LEDs of the at least some of the plurality of essentially monochromatic LEDs comprise 365 nm, 450 nm, 530 nm, 630 nm, 660 nm, 730 nm, 860 nm, and 950 nm.

4. The multispectral imaging apparatus of claim 1, wherein the at least one first camera to acquire the UV-SWIR imagery is a pan-tilt-zoom (PTZ) camera.

5. The multispectral imaging apparatus of claim 1, further comprising a time-of-flight proximity sensor.

6. The multispectral imaging apparatus of claim 1, wherein the at least one controller is configured to:
G) during operation of the multispectral imaging apparatus, repeat D), E), and F) by successively substituting each additional LED element of the plurality of essentially monochromatic LEDs for the second LED element in D), E), and F).

7. A building structure to provide an enclosed environment for controlled environment horticulture (CEH), the enclosed environment including at least one growing area, the building structure comprising:
the multispectral imaging apparatus of claim 6 disposed in the building structure such that the first field of view includes at least a portion of the at least one growing area of the enclosed environment.

8. The building structure of claim 7, wherein the building structure has a length scale less than 100 meters.

9. The building structure of claim 7, wherein the building structure is a greenhouse, an enclosed grow room, or a cover for a portion of a field.

10. The building structure of claim 7, wherein during operation of the multispectral imaging apparatus, the at least one controller is configured to perform A), B), C), D), E), F), and G) when the at least one growing area of the enclosed environment is a dark environment.

11. The building structure of claim 10, further comprising an artificial lighting system to provide photosynthetically active radiation (PAR) in the at least one growing area, wherein:
the at least one controller of the multispectral imaging apparatus is configured to turn off the artificial lighting system while the at least one controller performs A), B), C), D), E), F), and G).

12. The building structure of claim 11, wherein:
the artificial lighting system includes at least one port; and
the multispectral imaging apparatus is communicatively coupled to the at least one port of the artificial lighting system.

13. The multispectral imaging apparatus of claim 1, further comprising an image processor to overlay the UV-SWIR imagery acquired by the at least one first camera in the first field of view and the LWIR imagery acquired by the at least one second camera in the first field of view to generate at least one multispectral image (5090A) that includes the UV-SWIR imagery and the LWIR imagery.

14. A multispectral imaging apparatus, comprising:
at least one irradiation source including a plurality of narrowband irradiators in a first range of wavelengths from the ultraviolet (UV) regime to the short wavelength infrared (SWIR) regime;
at least one first camera to acquire UV-SWIR imagery in a first field of view and in the first range of wavelengths;
at least one second camera to acquire LWIR imagery in the first field of view and in the long wavelength infrared (LWIR) regime;
at least one controller to control the at least one irradiation source and the at least one first camera, wherein the at least one second camera continually acquires the LWIR imagery while the at least one controller periodically activates the at least one first camera in combination with the at least one irradiation source to acquire the UV-SWIR imagery; and
an image processor to overlay the UV-SWIR imagery acquired by the at least one first camera in the first field of view and the LWIR imagery acquired by the at least one second camera in the first field of view to generate at least one multispectral image that includes the UV-SWIR imagery and the LWIR imagery, wherein:
the plurality of narrowband irradiators of the at least one irradiation source comprises a plurality of essentially monochromatic LEDs, wherein respective LEDs of at least some of the plurality of essentially monochromatic LEDs have different emission wavelengths in a range of from 275 nanometers (nm) to 2060 nanometers (nm);
the UV-SWIR imagery includes a plurality of object images, at respective wavelengths of the different emission wavelengths, recording an albedo of a first object in the first field of view during irradiation of the first object by the different emission wavelengths; and the image processor overlays the plurality of object images of the UV-SWIR imagery to generate the multispectral image.

15. The multispectral imaging apparatus of claim 14, wherein the at least one first camera to acquire the UV-SWIR imagery is a pan-tilt-zoom (PTZ) camera.

16. The multispectral imaging apparatus of claim 14, further comprising a time-of-flight proximity sensor, coupled to the image processor, to determine at least one distance between the multispectral imaging apparatus and the first object.

17. The multispectral imaging apparatus of claim 16, wherein the image processor includes distance information, based on the at least one distance determined by the time-of-flight proximity sensor, in the multispectral image.

18. The multispectral imaging apparatus of claim 14, wherein the image processor is configured to process the plurality of object images recording the albedo of the first object at the respective wavelengths of the different emission wavelengths to detect and/or quantify one or more chemical compounds or constituents present in the first object, based at least in part on one or more peaks of absorptance or reflectance present in the plurality of object images.

19. The multispectral imaging apparatus of claim 18, wherein the one or more chemical compounds or constituents include at least one of mold, mildew, a photosynthetic compound, water, $NO_3$, $NO_2$, $P_4$, K+, $C_2H_4$, $CH_4$, $O_2$ or $CO_2$.

20. The multispectral imaging apparatus of claim 18, wherein:
the image processor is configured to process the LWIR imagery to provide a heat map indicating one or more temperatures of the first object; and
the multispectral image generated by the image processor includes the heat map.

21. The multispectral imaging apparatus of claim 20, wherein:
the UV-SWIR imagery includes a plurality of UV-SWIR calibration images, at the respective wavelengths of the different emission wavelengths, of a phantom in the first field of view during irradiation of the phantom by the different emission wavelengths, the phantom having known optical properties; and
the image processor is configured to process the plurality of object images based on the plurality of UV-SWIR calibration images to provide a plurality of calibrated object images.

22. The multispectral imaging apparatus of claim 21, wherein the phantom includes a reflectance reference target.

23. The multispectral imaging apparatus of claim 21, wherein:
the plurality of UV-SWIR calibration images are of the phantom in the first field of view during irradiation of the phantom by the different emission wavelengths and at least one of ambient light or artificial light.

24. The multispectral imaging apparatus of claim 20, wherein:
the LWIR imagery includes at least one LWIR calibration image of a blackbody radiator in the first field of view; and
the image processor is configured to process the at least one LWIR calibration image to provide the heat map indicating the one or more temperatures of the first object.

25. The multispectral imaging apparatus of claim 14, further comprising at least one integrated sensor assembly, coupled to the image processor, to provide sensor data, the at least one integrated sensor assembly comprising a plurality of sensors including:
an air temperature sensor;
a visible light sensor;
a near infrared (NIR) sensor;
a relative humidity sensor;
a carbon dioxide (CO2) sensor; and/or
an infrared (IR) sensor.

26. The multispectral imaging apparatus of claim 25, wherein the image processor includes sensor information, based on at least some of the sensor data provided by the at least one integrated sensor assembly, in the multispectral image.

27. An imaging system comprising:
a first multispectral imaging apparatus to acquire first UV-SWIR imagery and first LWIR imagery in the first field of view; and
a second multispectral imaging apparatus to acquire second UV-SWIR imagery and second LWIR imagery in a second field of view different from the first field of view,
wherein each of the first multispectral imaging apparatus and the second multispectral imaging apparatus comprises:
at least one irradiation source including a plurality of narrowband irradiators in a first range of wavelengths from the ultraviolet (UV) regime to the short wavelength infrared (SWIR) regime;
at least one first camera to acquire UV-SWIR imagery in a first field of view and in the first range of wavelengths;
at least one second camera to acquire LWIR imagery in the first field of view and in the long wavelength infrared (LWIR) regime; and
at least one controller to control the at least one irradiation source and the at least one first camera, wherein the at least one second camera continually acquires the LWIR imagery while the at least one controller periodically activates the at least one first camera in combination with the at least one irradiation source to acquire the UV-SWIR imagery.

28. The imaging system of claim 27, further comprising an image processor coupled to the first multispectral imaging apparatus and the second multispectral imaging apparatus to orthographically correct the first and second UV-SWIR imagery and the first and second LWIR imagery to reduce image distortion and provide orthographically corrected first and second UV-SWIR imagery and orthographically corrected first and second LWIR imagery, the image processor further being configured to stitch together the orthographically corrected first and second UV-SWIR imagery and the orthographically corrected first and second LWIR imagery to provide a multispectral image covering at least the first field of view and the second field of view.

29. A multispectral imaging method, comprising:
A) acquiring LWIR imagery in a first field of view and in a long wavelength infrared (LWIR) regime; and
B) during A), periodically activating at least one first camera in combination with at least one irradiation source to acquire UV-SWIR imagery in the first field of view,
wherein the at least one irradiation source includes a plurality of narrowband irradiators in a first range of wavelengths from the ultraviolet (UV) regime to the short wavelength infrared (SWIR) regime, wherein the plurality of narrowband irradiators of the at least one irradiation source comprises a plurality of essentially monochromatic LEDs, wherein respective LEDs of at least some of the plurality of essentially monochromatic LEDs have different emission wavelengths in a range of from 275 nanometers (nm) to 2060 nanometers (nm), and wherein B) comprises:
- B1) activating a first LED element of the plurality of essentially monochromatic LEDs to emit first radiation at a first wavelength;
- B2) during B1), controlling the at least one first camera to acquire first UV-SWIR imagery;
- B3) deactivating the first LED element;
- B4) activating a second LED element of the plurality of essentially monochromatic LEDs to emit second radiation at a second wavelength;
- B5) during B4), controlling the at least one first camera to acquire second UV-SWIR imagery; and
- B6) deactivating the second LED element.

30. The multispectral imaging method of claim 29, wherein the different emission wavelengths of the respective LEDs of the at least some of the plurality of essentially monochromatic LEDs comprise at least two of 275 nm, 365 nm, 440 nm, 450 nm, 475 nm, 500 nm, 530 nm, 620 nm, 630 nm, 660 nm, 696 nm, 730 nm, 760 nm, 850 nm, 860 nm, 940 nm, 950 nm, 1450 nm, 1610 nm, or 2060 nm.

31. The multispectral imaging method of claim 29, wherein the different emission wavelengths of the respective LEDs of the at least some of the plurality of essentially monochromatic LEDs comprise 365 nm, 450 nm, 530 nm, 630 nm, 660 nm, 730 nm, 860 nm, and 950 nm.

32. The multispectral imaging method of claim 29, further comprising:
- B7) repeating B4), B5), and B6) by successively substituting each additional LED element of the plurality of essentially monochromatic LEDs for the second LED element in B4), B5), and B6).

33. The multispectral imaging method of claim 32, further comprising:
performing B1), B2), B3), B4), B5), B6), and B7) in a dark environment.

34. The multispectral imaging method of claim 29, further comprising:
- C) overlaying the UV-SWIR imagery acquired by the at least one first camera in the first field of view and the LWIR imagery in the first field of view to generate at least one multispectral image that includes the UV-SWIR imagery and the LWIR imagery.

35. A multispectral imaging method, comprising:
- (A) acquiring LWIR imagery in a first field of view and in a long wavelength infrared (LWIR) regime;
- B) during A), periodically activating at least one first camera in combination with at least one irradiation source to acquire UV-SWIR imagery in the first field of view, wherein the at least one irradiation source includes a plurality of narrowband irradiators in a first range of wavelengths from the ultraviolet (UV) regime to the short wavelength infrared (SWIR) regime; and
- C) overlaying the UV-SWIR imagery acquired by the at least one first camera in the first field of view and the LWIR imagery in the first field of view to generate at least one multispectral image that includes the UV-SWIR imagery and the LWIR imagery, wherein:

the plurality of narrowband irradiators of the at least one irradiation source comprises a plurality of essentially monochromatic LEDs, wherein respective LEDs of at least some of the plurality of essentially monochromatic LEDs have different emission wavelengths in a range of from 275 nanometers (nm) to 2060 nanometers (nm);

the UV-SWIR imagery includes a plurality of object images, at respective wavelengths of the different emission wavelengths, recording an albedo of a first object in the first field of view during irradiation of the first object by the different emission wavelengths; and
- C) comprises overlaying the plurality of object images of the UV-SWIR imagery to generate the multispectral image.

36. The multispectral imaging method of claim 35, further comprising:
- D) processing the plurality of object images recording the albedo of the first object at the respective wavelengths of the different emission wavelengths to detect and/or quantify one or more chemical compounds or constituents present in the first object, based at least in part on one or more peaks of absorptance or reflectance present in the plurality of object images.

37. The multispectral imaging method of claim 36, wherein the one or more chemical compounds or constituents include at least one of mold, mildew, a photosynthetic compound, water, $NO_3$, $NO_2$, $P_4$, K+, $C_2H_4$, $CH_4$, $O_2$ or $CO_2$.

38. The multispectral imaging method of claim 36, further comprising:
- E) processing the LWIR imagery to provide a heat map indicating one or more temperatures of the first object; and
- F) including the heat map in the multispectral image.

39. The multispectral imaging method of claim 38, wherein:
the UV-SWIR imagery includes a plurality of UV-SWIR calibration images, at the respective wavelengths of the different emission wavelengths, of a phantom in the first field of view during irradiation of the phantom by the different emission wavelengths, the phantom having known optical properties; and
the method further comprises:
- G) processing the plurality of object images based on the plurality of UV-SWIR calibration images to provide a plurality of calibrated object images.

40. The multispectral imaging method of claim 39, wherein the phantom includes a reflectance reference target.

41. The multispectral imaging method of claim 39, wherein:
the plurality of UV-SWIR calibration images are of the phantom in the first field of view during irradiation of the phantom by the different emission wavelengths and at least one of ambient light or artificial light.

42. The multispectral imaging method of claim 38, wherein:
the LWIR imagery includes at least one LWIR calibration image of a blackbody radiator in the first field of view; and
the method further comprises:
- H) processing the at least one LWIR calibration image to provide the heat map indicating the one or more temperatures of the first object.

* * * * *